United States Patent [19]
Spenik et al.

[11] Patent Number: 5,251,313
[45] Date of Patent: Oct. 5, 1993

[54] METHOD OF BIT RATE ADAPTION USING THE ECMA 102 PROTOCOL

[75] Inventors: John W. Spenik, Fairfax, Va.; Robert E. Renner; Greig R. Detering, both of Phoenix, Ariz.

[73] Assignee: AG Communication Systems Corporation, Phoenix, Ariz.

[21] Appl. No.: 615,661

[22] Filed: Nov. 19, 1990

[51] Int. Cl.$^5$ ............................................. G06F 3/00
[52] U.S. Cl. ...................................... 395/500; 370/84; 375/7; 395/800; 364/239; 364/239.1; 364/238.6; 364/DIG. 1
[58] Field of Search ................. 395/500, 800; 370/84; 375/7

[56] References Cited

U.S. PATENT DOCUMENTS

| | | | |
|---|---|---|---|
| 4,048,440 | 9/1977 | Peck et al. | 375/117 |
| 4,463,443 | 7/1984 | Frankel et al. | 395/250 |
| 4,493,021 | 1/1985 | Agrawal et al. | 395/200 |
| 4,569,062 | 2/1986 | Dellande et al. | 370/48 |
| 4,680,781 | 7/1987 | Amundson et al. | 375/8 |
| 4,756,007 | 6/1988 | Qureshi et al. | 375/37 |
| 4,953,180 | 8/1990 | Fieschi et al. | 375/7 |
| 4,987,570 | 1/1991 | Almond et al. | 370/84 |
| 5,007,047 | 4/1991 | Sridhar et al. | 370/32.1 |
| 5,062,105 | 10/1991 | McKnight et al. | 370/84 |

Primary Examiner—Robert B. Harrell
Assistant Examiner—Meng-Ai T. An
Attorney, Agent, or Firm—Anthony J. Baca

[57] ABSTRACT

A method of bit rate adaption between a user data rate and an adapter data rate using the ECMA 102 protocol. The user data is received from a user terminal at a user data rate, the rate adapted data is transmitted at an adapted data rate, and the adapted data rate is greater than the user data rate. The user data is either in a asynchronous or a synchronous format and contains a start element and at least one stop element. The method involves the steps of: (1) converting the user data into an intermediate data; (2) storing the intermediate data in a receive buffer; (3) only if the user data is in an asynchronous data format, adding stop elements to the intermediate data; (4) transferring the intermediate data in the receive buffer to an intermediate buffer; (5) constructing a frame using data from the intermediate buffer; (6) storing the frame in a transmit buffer, and; (7) transmitting the frame where the step of transmitting changes the frame into the rate adapted data.

14 Claims, 50 Drawing Sheets

METHOD OF BIT RATE ADAPTION USING THE ECMA 102 PROTOCOL

MICROFICHE APPENDIX

A source code listing of a preferred embodiment of the invention is appended in the form of 145 pages recorded on microfiche.

CROSS-REFERENCE TO RELATED APPLICATIONS

The present application is related to the following co-pending U.S. patent applications Ser. Nos. all being assigned to the same assignee, entitled:

"A SIMULTANEOUS VOICE AND DATA SYSTEM USING THE EXISTING TWO-WIRE INTERFACE", Ser. No. 07/615,679, filed on Nov. 19, 1990;

"A NETWORK INDEPENDENT CLOCKING CIRCUIT WHICH ALLOWS A SYNCHRONOUS MASTER TO BE CONNECTED TO A CIRCUIT SWITCHED DATA ADAPTER", Ser. No. 07/615,524, filed on Nov. 19, 1990;

"A CIRCUIT AND METHOD OF HANDLING ASYNCHRONOUS OVERSPEED", Ser. No. 07/615,525, filed on Nov. 19, 1990; and "A METHOD OF IMPLEMENTING ECMA 102 RATE DE-ADAPTION", Ser. No. 07/617,848, filed on Nov. 19, 1990.

FIELD OF THE INVENTION

The present invention relates in general to data communication systems, and more particularly a method of implementing the ECMA 102 rate adaption protocol.

BACKGROUND OF THE INVENTION

Prior to the present invention, high speed data protocols were proprietary and could not communicate with each other. Because of rapidly changing protocols, it was not cost effective to commit a protocol to hardware. This forced the protocols to be relatively simple because a processor could not perform intense computations in real time.

The ECMA 102 protocol is based upon CCITT Rec. I.463 (V.110). The ECMA protocol is a computationally intense protocol, requiring high speed bit manipulation. As with any protocol, the ECMA protocol is an evolving protocol and subject to change and improvements. This makes a hardware solution risky.

It therefore becomes the object of the present invention to implement the ECMA protocol in such a manner as to be cost effective and easily updated.

SUMMARY OF THE INVENTION

In order to accomplish the object of the present invention there is provided a method of adapting user data to rate adapted data where the user data is received from a user terminal at a user data rate, the rate adapted data is transmitted at a adapted data rate, and the adapted data rate is greater than the user data rate. The user data is either in a asynchronous or a synchronous format and contains a start element and at least one stop element. The method involves the steps of:

(1) Change the user data from a serial format to a parallel format;

(2) Remove the stop element(s) from the user data thereby changing the user data into a intermediate data;

(3) If the user data is in the asynchronous format then:
  (i) Calculate a number of stop elements that must be added to the intermediate data, and;
  (ii) Add the calculated number of stop elements to the intermediate data;

(4) Read the intermediate data from the intermediate buffer;

(5) If the user data rate is less than or equal to a third data rate then use the intermediate data to retrieve the frame from a first table;

(6) If the user data rate is equal to a fourth data rate then:
  (i) Use the intermediate data to retrieve a one half-frame from a second table; and
  (ii) Repeat the steps of (4) and (6)(i), thereby generating the frame;

(7) If the user data rate is equal to a fifth data rate then:
  (i) Use the intermediate data to retrieve a one-fourth frame from a third table; and
  (ii) Repeating previous steps of (4) and (7)(i), three times, thereby generating the frame;

(8) If the user data rate is greater than or equal to a sixth data rate then:
  (i) Use the intermediate data to retrieve a one-eighth frame; and
  (ii) repeat previous steps of (4) and (8)(i), seven times, thereby generating the frame.

(9) Transmitting the frame by allowing only a subset of the adapted data rate to be occupied by the frame.

DESCRIPTION OF THE DRAWINGS

A better understanding of the invention may be had from the consideration of the following detailed description taken in conjunction with the accompanying drawings, in which:

FIGS. 11B-J are flow diagrams for the individual low speed state transitions.

DESCRIPTION OF THE PREFERRED EMBODIMENT

Introduction

The present invention provides a method of implementing the ECMA 102 rate adaption protocol. Because the method is performed by a processor, here a Digital Signal Processor (DSP), the protocol can be easily changed by changing the firmware. The ECMA rate adaption allows a User's terminal to connect to a circuit switched data path; the data path having a data rate of 64 kbps. Through the use of this protocol, the User's baud rate may be anywhere from 50 baud to the full 64,000 baud. Also the User's terminal may be either asynchronous or synchronous. Asynchronous rates are limited to 19,200 baud and less.

Figure 1:
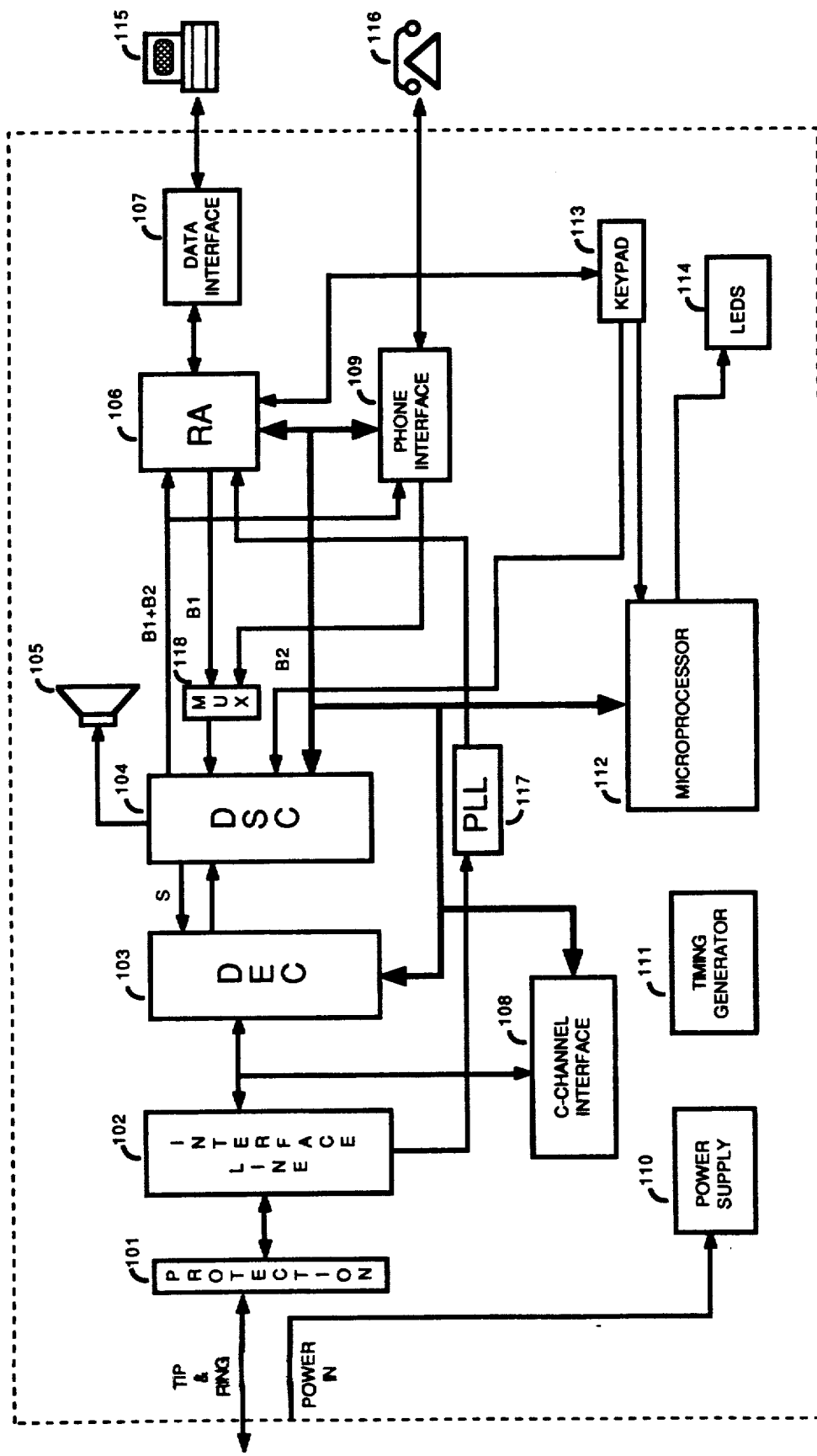
FIG. 1 is a block diagram of the Data Adapter in accordance with the present invention.
Figure 2A:
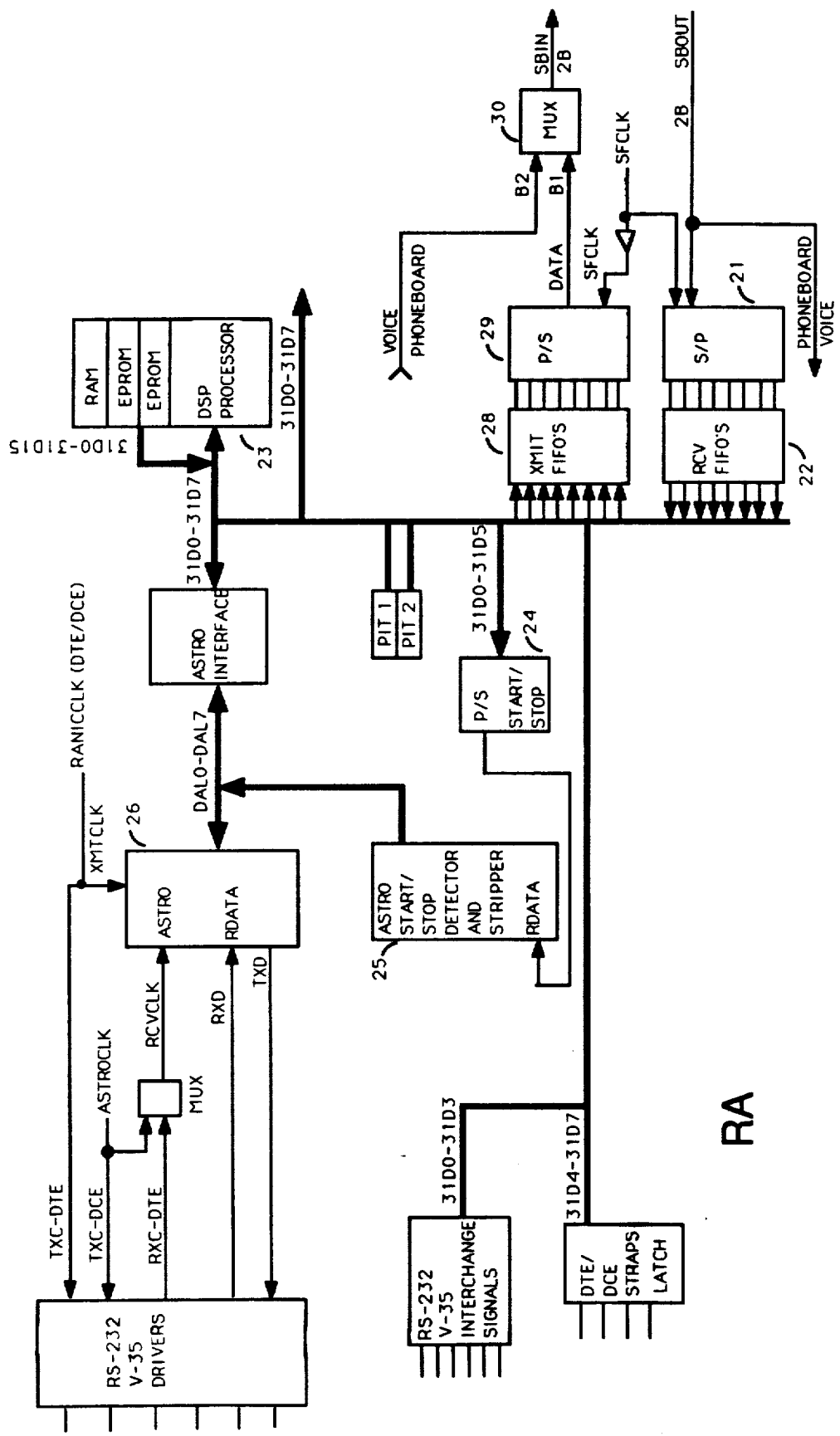
FIG. 2 is a more detailed block diagram of the Data Adapter of FIG. 1.
Figure 2B:
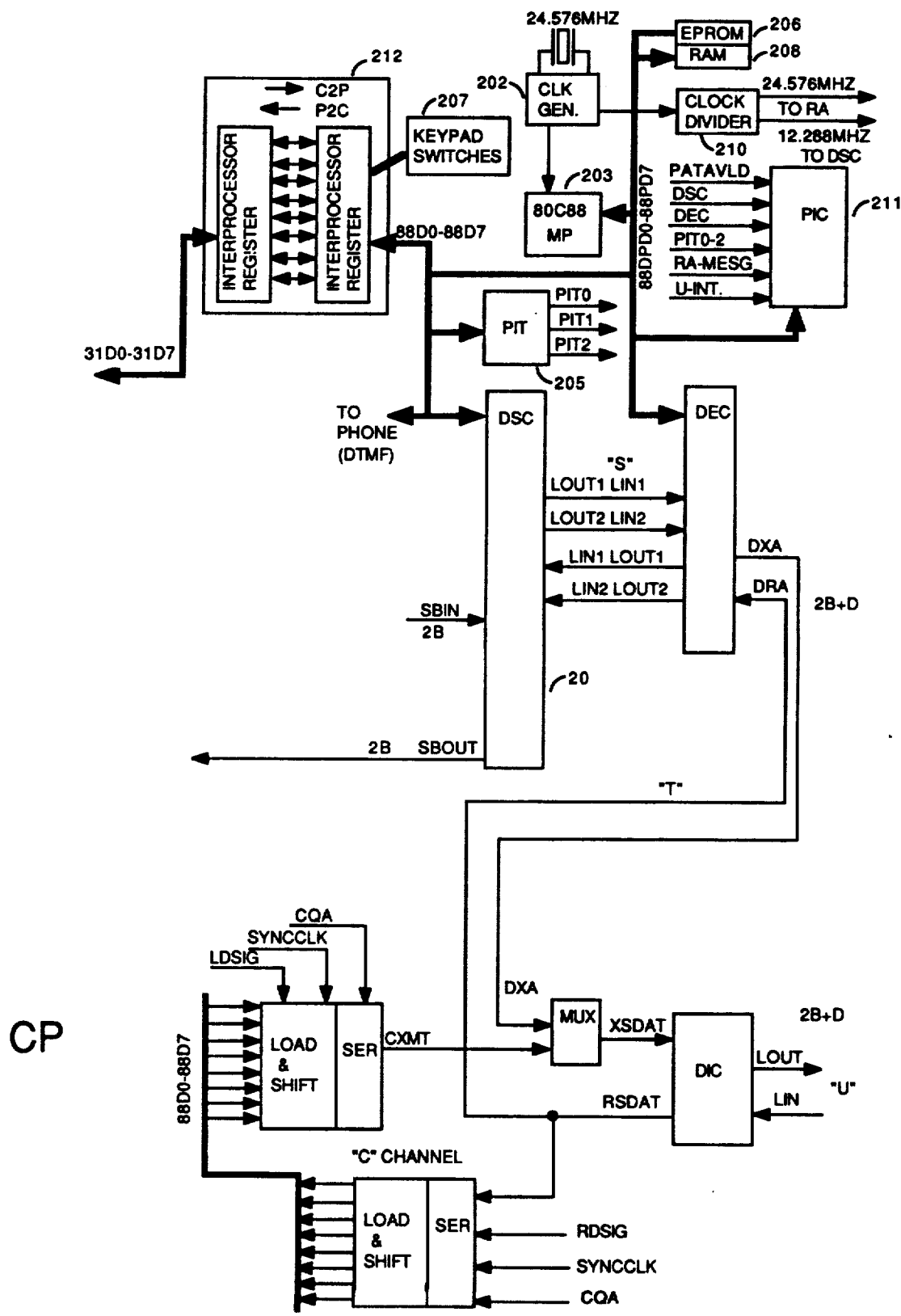

Turning now to FIG. 1 a general description of the hardware will be given before the software is described. A more detailed description of the hardware is given in co-application "A SIMULTANEOUS VOICE AND DATA SYSTEM USING THE EXISTING TWO-WIRE INTERFACE", Ser. No. 07/615,679, filed on Nov. 19, 1990.

Data from DAT INTERFACE 107 is passed to RA 106 where the data is "Rate Adapted", in accordance to the European Computer Manufacturers Association (ECMA) standard, onto one of the 64 kbps channels (B-Channel). The voice signal is converted to a 64 kbps Pulse Coded Modulation (PCM) signal by PHONE INTERFACE 109 and occupies a second 64 kbps channel. Both 64 kbps channels are multiplexed along with data from MICROPROCESSOR 112 for the 16 kbps channel by MUX 118 and then shifted into Digital Subscriber Controller (DSC) 104. These three channels are converted to an analog signal suitable for transmission over a four-wire interface, one such format is the Integrated Services Digital Network (ISDN) S interface signal. The analog signal from the DSC is received by Digital Exchange Controller (DEC) 103 and converted back to a digital Time Division Multiplexed (TDM) signal. At this point, a 64 kbps control channel from C-CHANNEL INTERFACE 108 is multiplexed into the TDM data stream. The C-CHANNEL is used to control and determine status of LINE INTERFACE 102.

The digital TDM data stream from DEC 103 and an 8 kbps auxiliary channel-the 8 kbps auxiliary channel is part of this control channel-are converted into an appropriate signal for transmission over a twisted-pair line. The signal from LINE INTERFACE 102 is transmitted through a PROTECTION circuit 101 to the Central Office (CO), where an identical line interface receives the signal and reconstructs the digital data.

Information received from the CO is processed in the reverse order of that stated above.

Functionally, the DA consists of two separate circuits: The Call Processing Computer (MP) and the Rate Adapter (RA). The former operates under control of MICROPROCESSOR 112; the later operates under a digital signal processor. The two intelligent processors communicate with each other via a bi-directional 8-bit registers. The MP is described in co-application: "A SIMULTANEOUS VOICE AND DATA SYSTEM USING THE EXISTING TWO-WIRE INTERFACE", Ser. No. 07/615,679 filed on Nov. 19, 1990.

Rate Adapter Block

Figures 1, 11A:
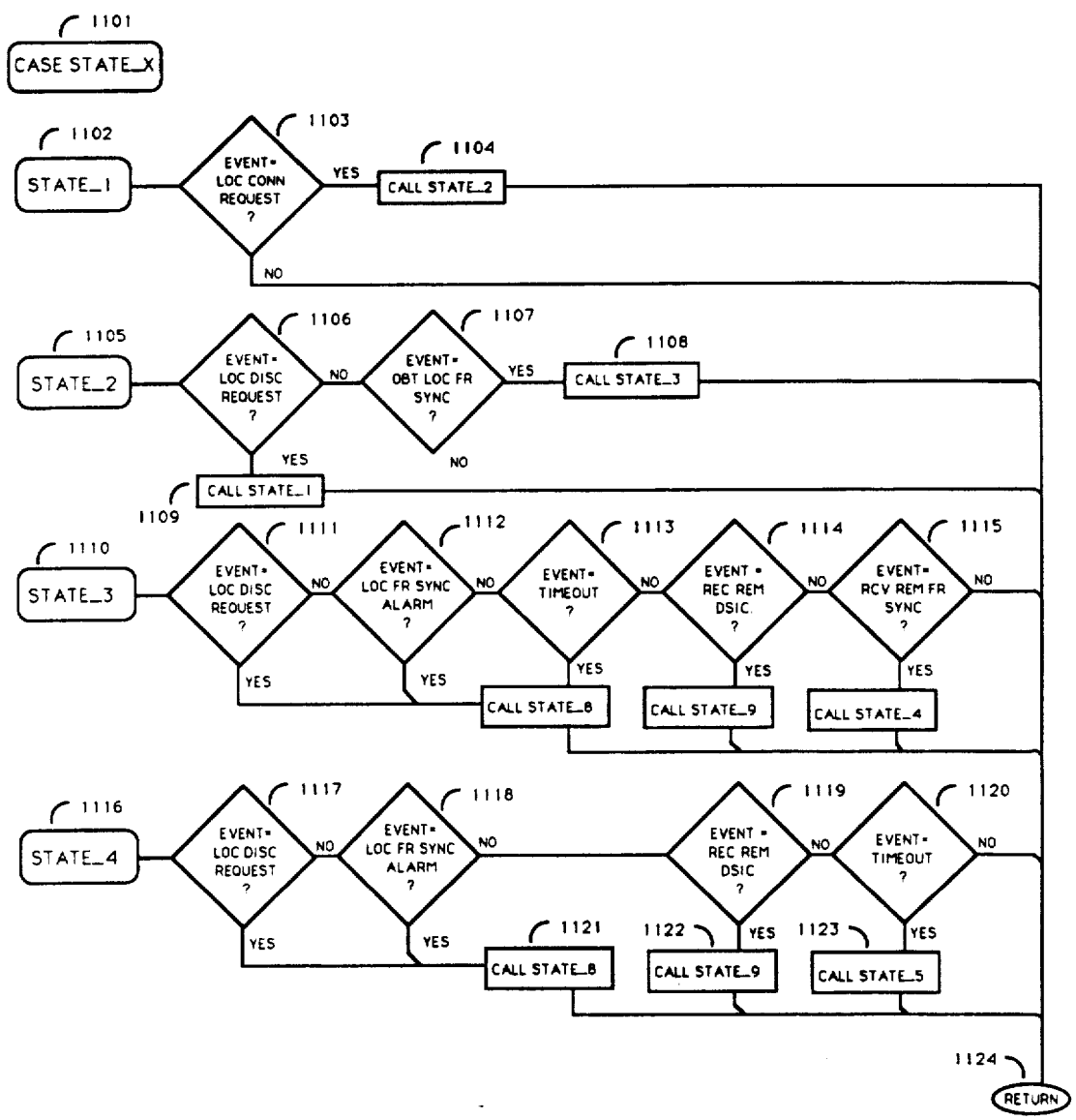
FIG. 11A is a flow diagram for the LOW SPEED STATE TRANSITION procedure.
Figures 2, 11A:
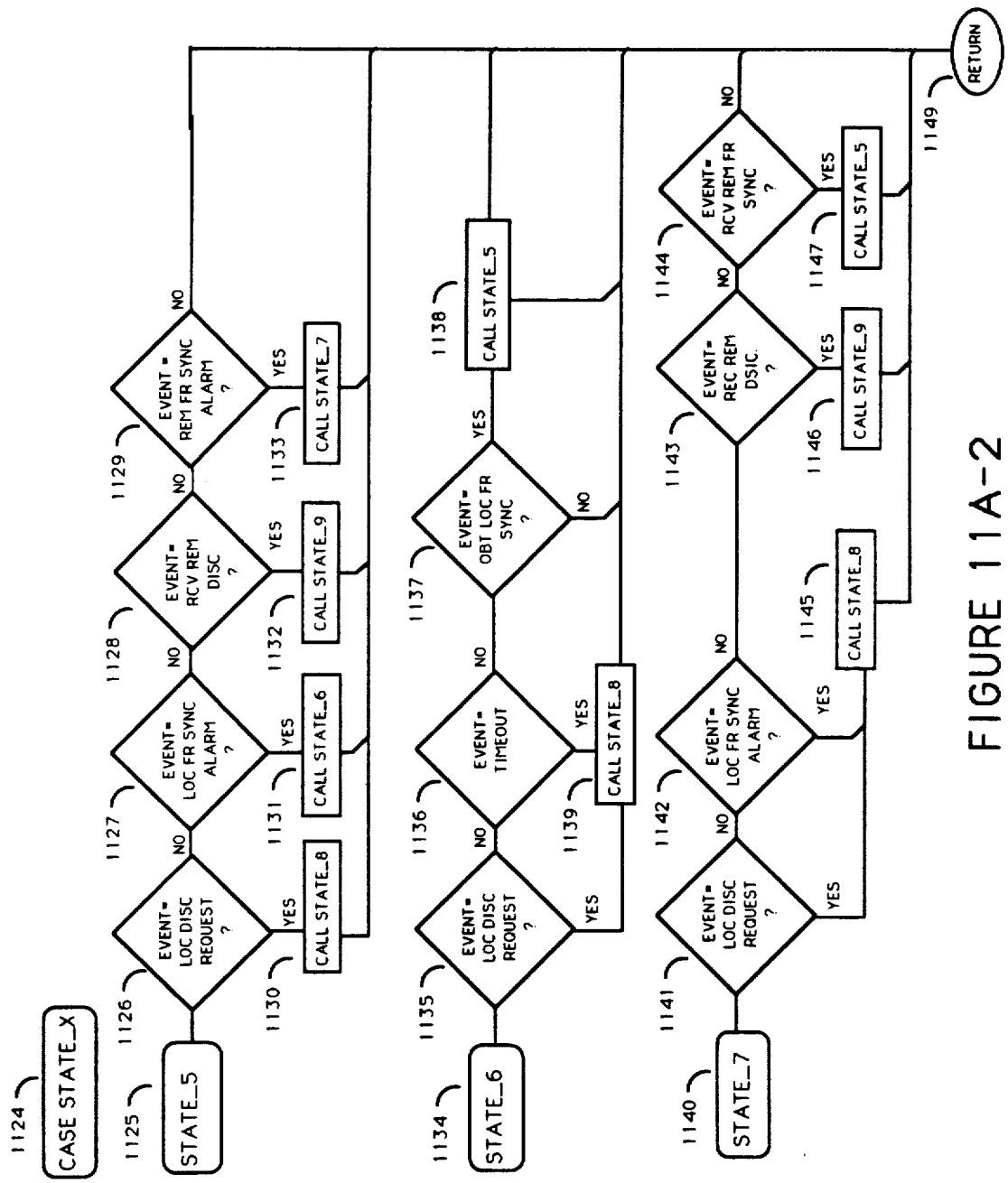
Figures 3, 11A:
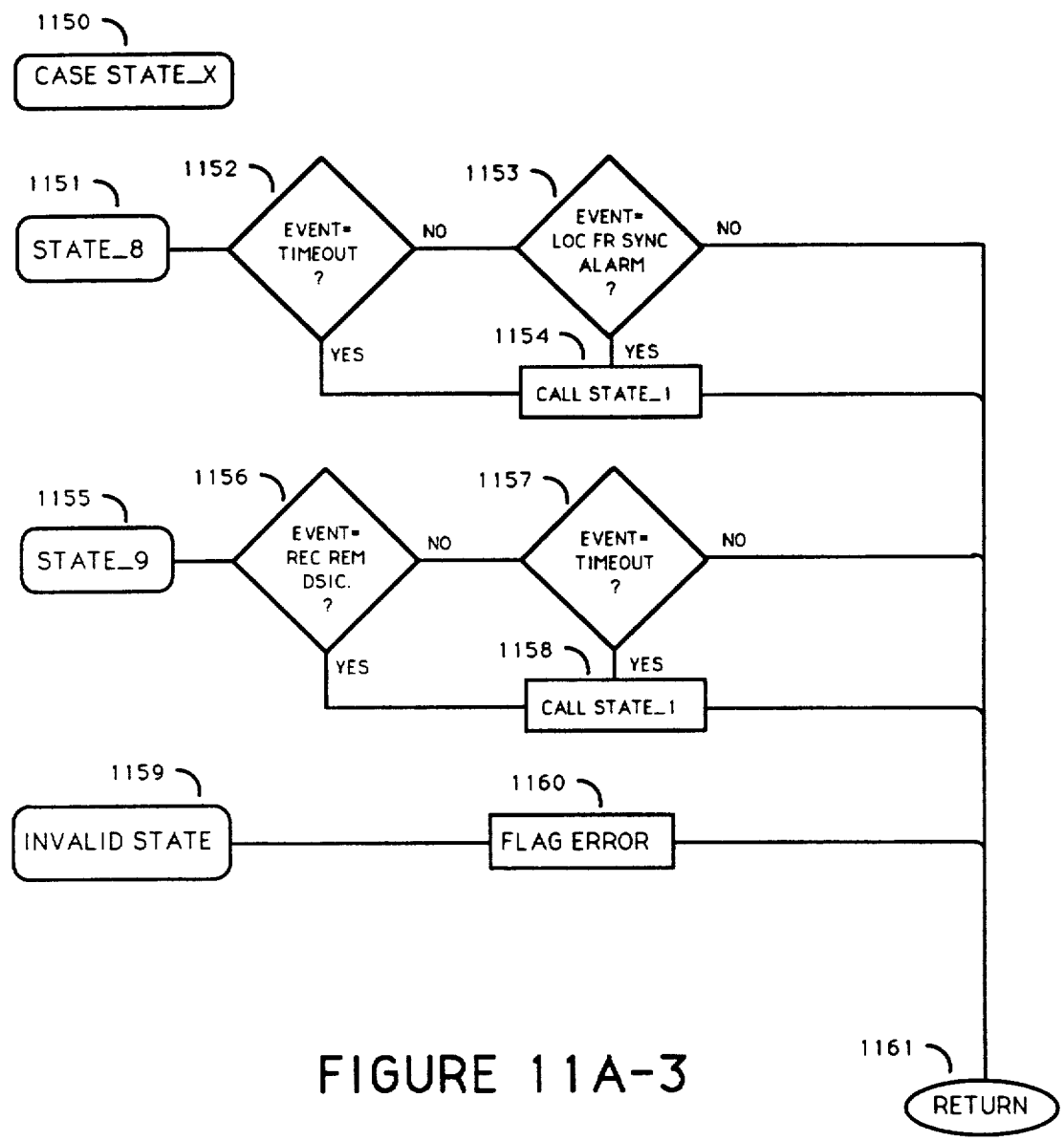
Figure 11B:
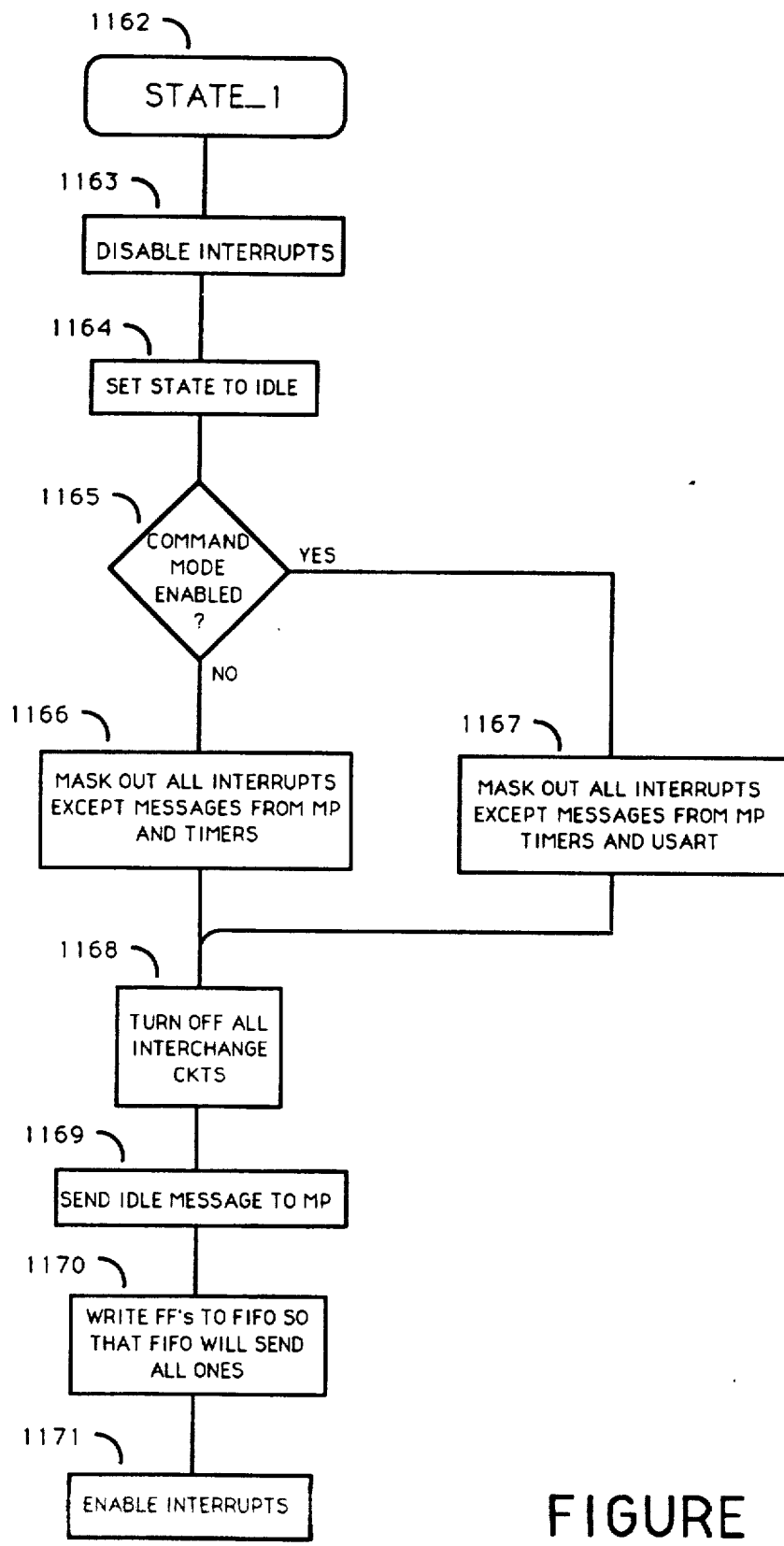
Figure 11C:
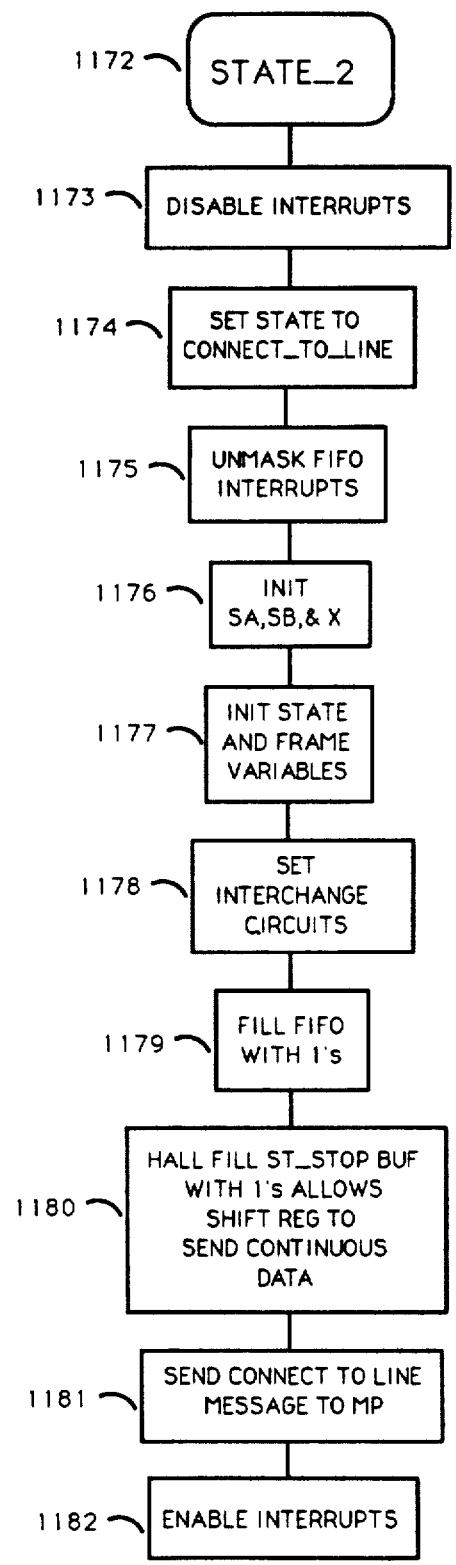
Figure 11D:
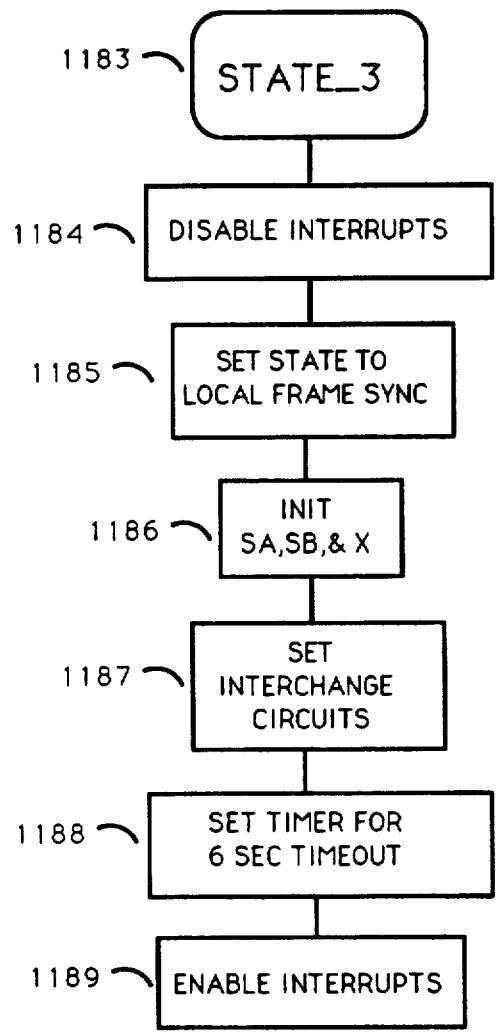
Figure 11E:
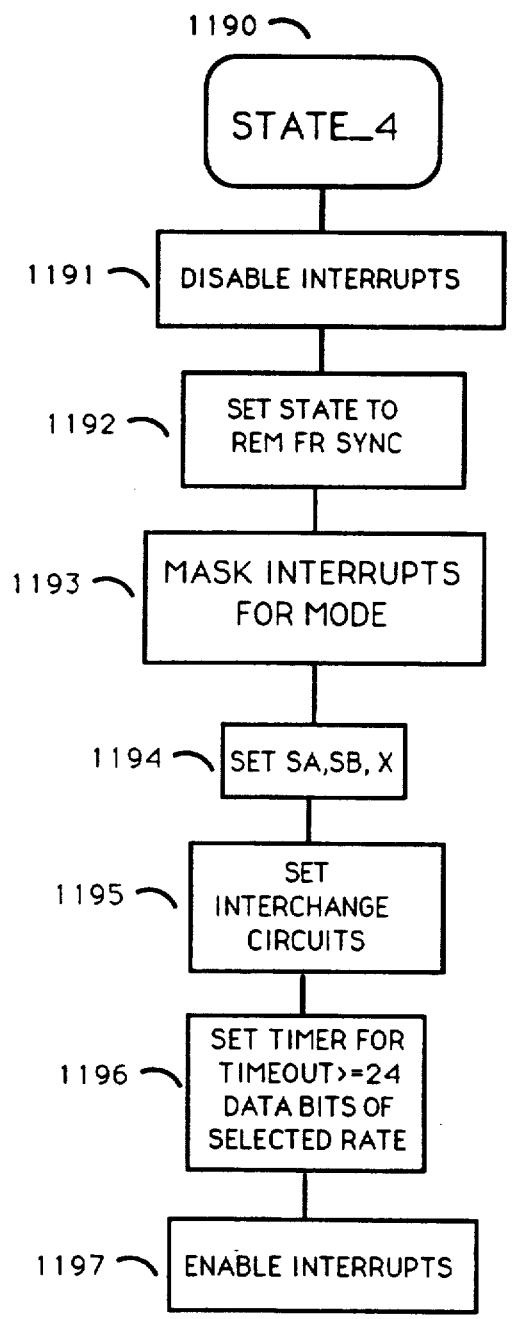
Figure 11F:
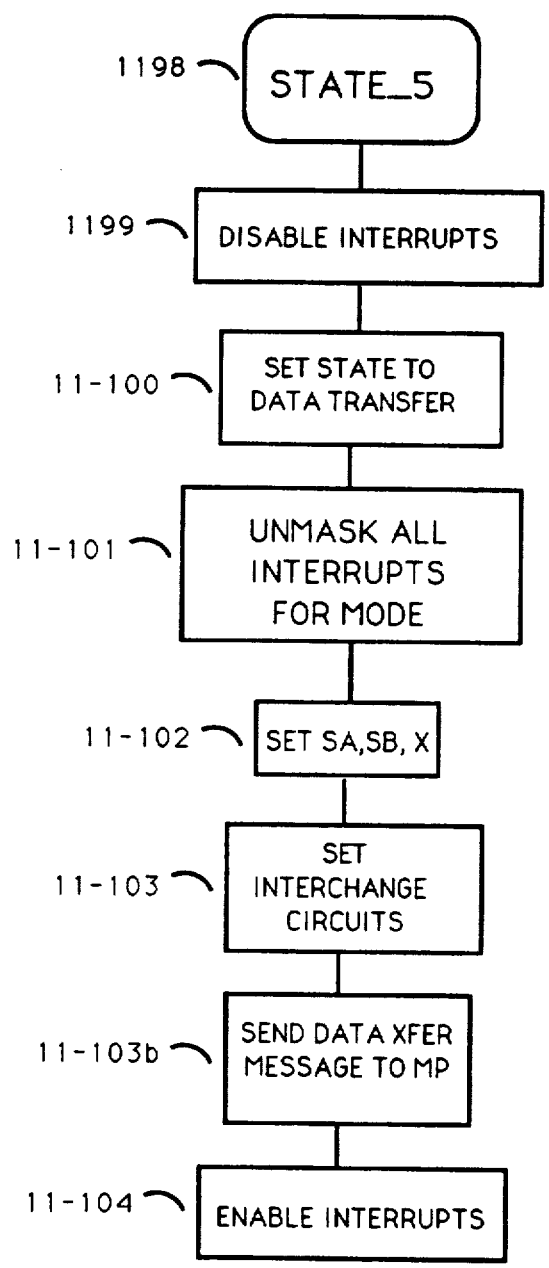
Figure 11G:
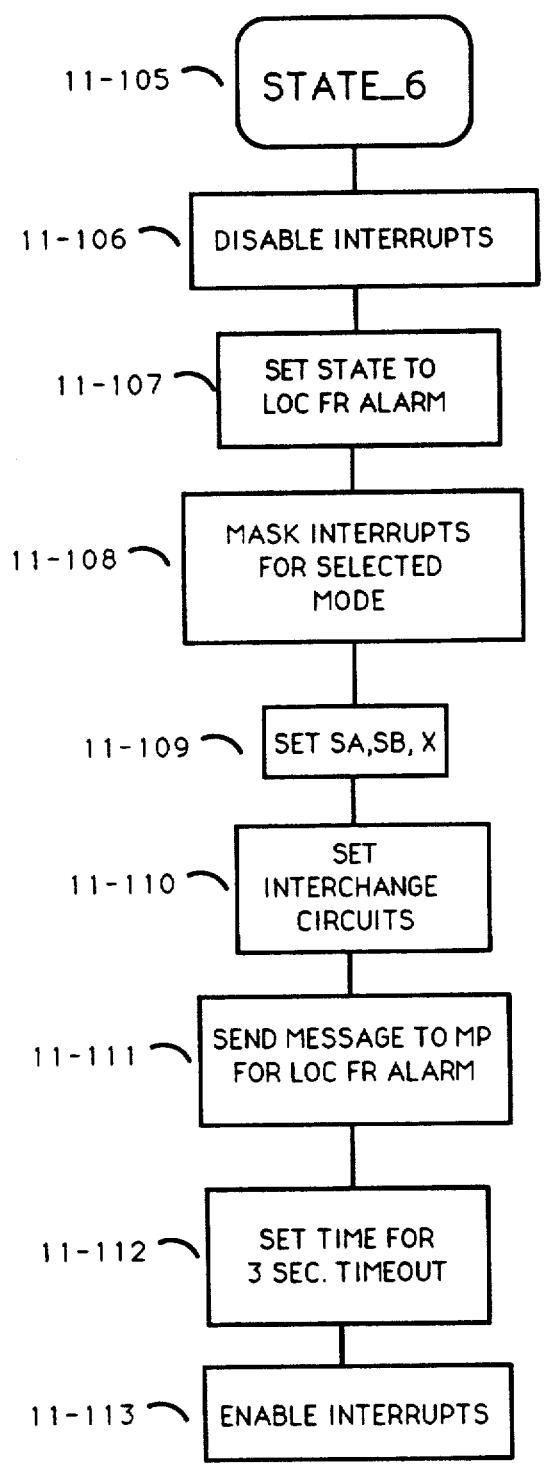
Figure 11H:
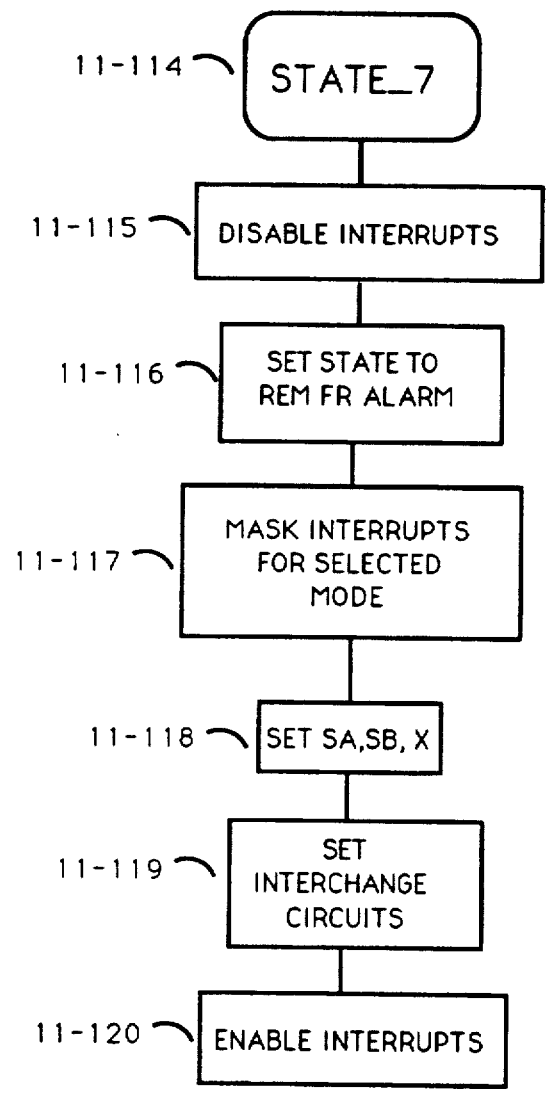
Figure 111:
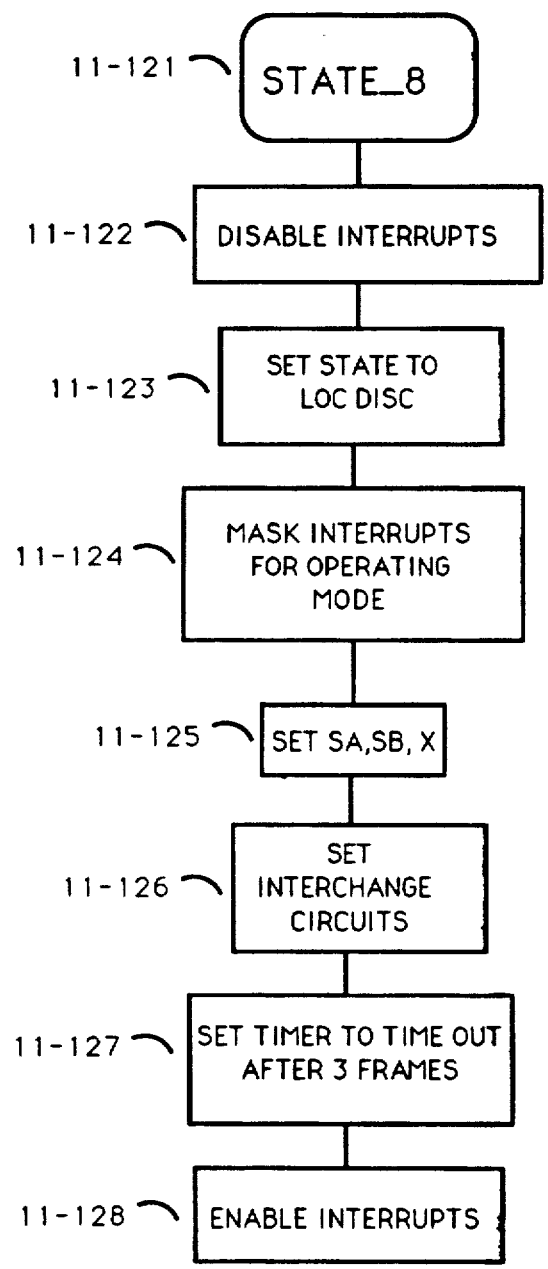
Figure 11J:
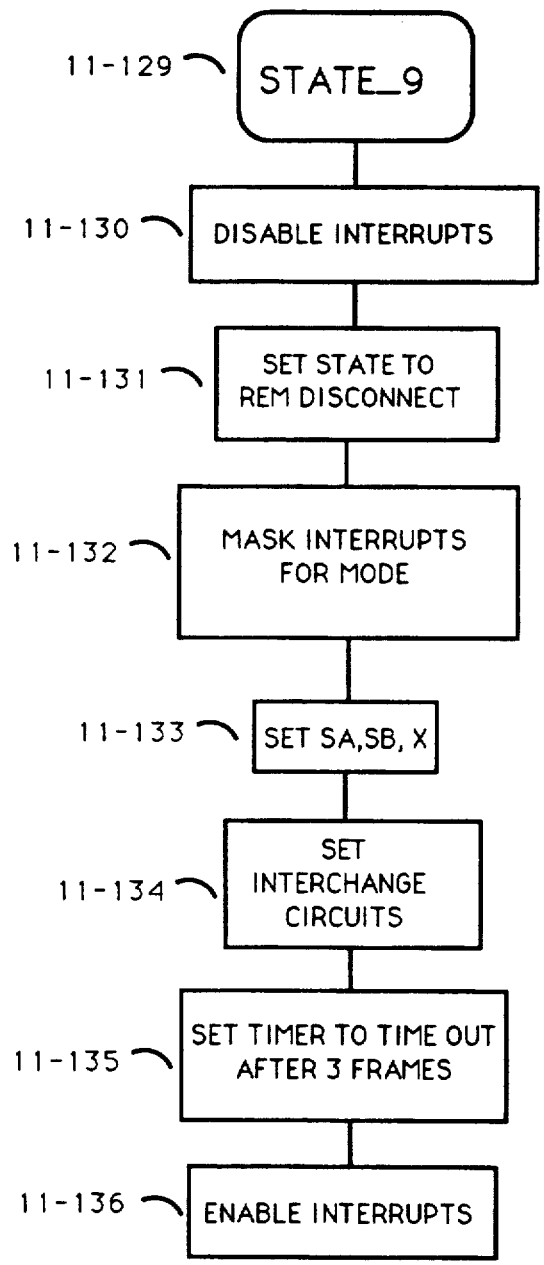

FIG. 2 shows the Rate Adapter RA section in more detail. A high level description of data flow in the RA will be given now. Data from the far end enters the RA from DSC 20 as explained above. This data is first converted from serial to parallel data by SERIAL-TO-PARALLEL CONVERTER 21. The parallel data is then loaded into RECEIVE FIFO 22. DSP 23 reads the data from RECEIVE FIFO 22 and "De-Adapts" the data based on ECMA-102 (to be described in more detail later). If an asynchronous rate is being used, DSP 23 writes the data into PARALLEL-TO-SERIAL CONVERTER 24. Data from PARALLEL-TO-SERIAL CONVERTER 24 is shifted into ASTRO#2 25 where the start and stop bits are removed. Once ASTRO#2 25 has reconstructed a data byte, DSP 23 is interrupted; the DSP then reads the data byte from ASTRO#2 25. The data is written to ASTRO#1 26 if ASTRO#1 26 is ready for more data. If ASTRO#1 26 is not ready, the data byte is stored in RAM until ASTRO#1 is ready. Synchronous rates do not undergo the bit striping through ASTRO#2.

In the other direction, data is first received by ASTRO#1 26 where the start and stop bits are removed. The DSP 23 reads the data from ASTRO#1 26 and "Adapts" it based on ECMA-102. This rate adapted data is then written into TRANSMIT FIFO 28. At the appropriate time, the data is transferred from TRANSMIT FIFO 28 into PARALLEL-TO-SERIAL CONVERTER 29. One, two, four, or eight bits are shifted out of PARALLEL-TO-SERIAL CONVERTER 29 into DSC 20 each frame.

Interprocessor Register

MICROPROCESSOR 203 communicates with DSP 23 of the RA section through INTERPROCESSOR REGISTER 212. INTERPROCESSOR REGISTER 212 is a by-directional eight bit register mapped into the I/O space of both MICROPROCESSOR 203 and DSP 23. Seven bits are used to convey information and the eighth bit is used as an interrupt signal. Therefore, for example, when MICROPROCESSOR 203 sends a message to DSP 23, it writes a data byte into INTERPROCESSOR REGISTER 212 with the eighth bit set to a logic one. The logic one generates an interrupt to the DSP who then reads the message. Messages from the DSP to the MICROPROCESSOR are transferred in the same manner. Some of the messages transferred between MICROPROCESSOR 203 (MP) and DSP (RA) are shown in TABLE 1.

TABLE 1

| Interprocessor Messages | |
|---|---|
| MP to RA | D7 ... D0 |
| Reset | 1001 0000 |
| Perform Self Check | 1001 0001 |
| Set Operating Mode (i.e. read DIP switches) | 1001 0010 |
| Set Interchange Circuit Outputs (0 ... 15) | 1110 xxxx |
| Read Interchange Circuit Inputs | 1100 0000 |
| Connect to Line | 1100 0001 |
| Disconnect from Line | 1100 0010 |
| Report Operating State | 1100 0100 |
| Echo Back Command(s) | 1010 1010 |
| | 1101 0101 |
| RA to MP | |
| Reset Complete (0 ... 1) {0 = Fail, 1 = Success} | 1001 000x |
| Self Check Complete (0 ... 1) {0 = Fail, 1 = Success} | 1001 001x |
| Accept | 1001 0100 |
| Reject | 1001 0101 |
| Interchange Circuit Leads Status (0 ... 15) | 1110 xxxx |
| Operating State (1 ... 9) | 1100 xxxx |
| Echo Back Command(s) | 1010 1010 |
| | 1101 0101 |

A short description on the above messages:

RESET: This is a command by the MP for the RA to perform a complete reset. This routine will mask all interrupts and return with an indication to jump to the reset routine.

PERFORM SELF CHECK: This is similar to the above command.

SET OPERATING MODE: This is a command to read the DIP switches to determine the operating mode. If the mode changes, this may cause a reset.

SET INTERCHANGE CIRCUIT OUTPUT LEADS: This command informs the RA to take the information included in the message and set the appropriate interchange leads. A "0" corresponds to the ON condition and a "1" to the OFF condition. Which leads are set is dependent upon the DCE/DTE operating mode and shown below:

| | Interchange Circuit Outputs | |
|---|---|---|
| Bit # | DCE Mode | DTE Mode |
| 0 | 106 | 105 |
| 1 | 107 | 108.2 |
| 2 | 109 | x |
| 3 | 125 | x |

READ INTERCHANGE CIRCUIT INPUT LEADS: This command informs the RA to read the interchange lead inputs and report back with their state. This routine will read the particular leads shown below, enqueue a message back to the MP with the results, and set the C2P Message Flag. MP will monitor the flag for eventual transmission of the message.

| | Interchange Circuit Outputs | |
|---|---|---|
| Bit # | DCE Mode | DTE Mode |
| 0 | 105 | 106 |
| 1 | 108.2 | 107 |
| 2 | x | 109 |
| 3 | x | 125 |

CONNECT TO LINE: This command instructs the RA to connect to the B-Channel. This routine will set the Local Connect Request Event flag which will be checked by MP.

DISCONNECT FROM LINE: This is the reverse of the above command.

REPORT OPERATING STATE: This command informs the RA to read the operating state and report back with the state.

ECHO BACK: These commands are used by the MP to check for stuck bits in the interprocessor registers. The MP will send one of the two commands, and the RA will respond with the identical bit pattern response message.

This list is not meant to be exhaustive; additional messages are needed to convey digit information, call progress messages, baud rate, etc. . . This type of information is generally application specific and can be implemented as required for each individual application.

Rate Adapter Circuit (RA)

The RA performs the necessary Rate Adaption/De-adaption based on the ECMA-102 standard. A brief description of the ECMA-102 standard will be given before a detailed discussion about the present invention. It is assumed that the reader has either a copy of the ECMA standard or a working knowledge of it, and therefore, this section is not meant to be a tutorial.

Figure 3:
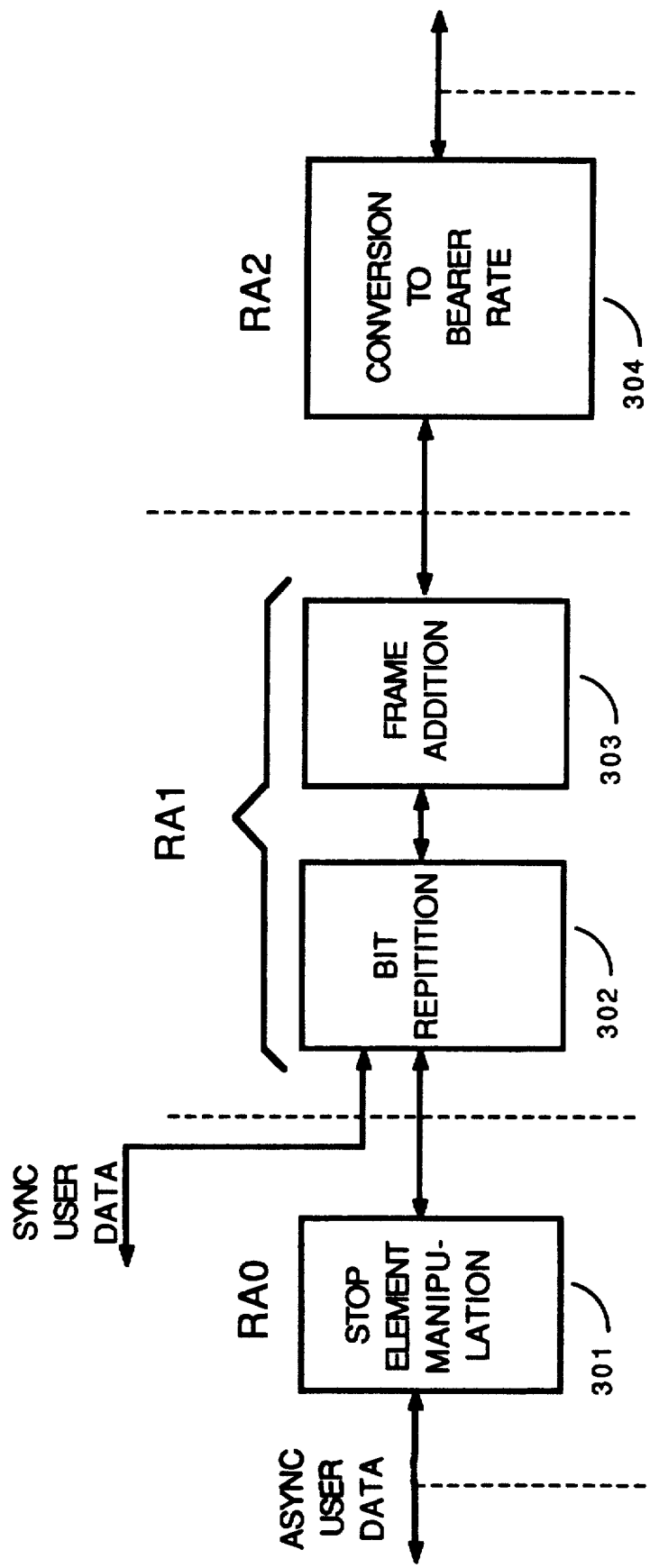
FIG. 3 is a block diagram of the rate adaption/de-adaption process.

Referring to FIG. 3, where the basic process of rate adaption/de-adaption is shown, the process is logically divided into three steps. The RA0 function is only used with asynchronous User data and generally converts this asynchronous data to synchronous data. Incoming asynchronous data is padded by the addition of stop bits to fit the nearest channel defined by:

$$Data\ rate = 2^n \times 600\ bps,\ where\ n = 0 \ldots 5$$

Thus, a 2400 baud user data stream would fit into a 2400 synchronous data rate (n=2). For a 7200 baud user data stream to fit into a 9600 synchronous data rate (n=4), additional stop bits are added to fill in the time. The resultant synchronous data is fed to RA1. Synchronous User data does not undergo the RA0 step because it is already synchronous.

The RA1 function takes either the output of RA0 or User synchronous data (Herein: also called an RA0 rate), and preforms a bit repetition and framing function to fill an intermediate data channel of 8, 16, or 32 kbps. An 80-bit frame is used, as shown in TABLE 5. The adaptation of the 600, 1200, and 2400 bps RA0 rates to the 8 kbps intermediate rate, including bit repetition are shown in TABLES 6, 7, and 8 respectively. The adaptation of 7200 and 14400 bps RA0 rates to the 16 and 32 kbps intermediate rates respectively are shown in TABLE 9. While, the adaptation of 4800, 9600 and 19200 bps RA0 rates to the 8, 16, and 32 kbps intermediate rates, respectively, are shown in TABLE 10. Adaptation of 48 kbps uses TABLE 12, 56 kbps uses TABLE 11, and 64 kbps uses TABLE 13. The definition of the S and X bits are shown in TABLE 15, and the definition of the E bits are given in TABLE 14.

The third step of the rate adaption (RA2) converts either the output of the previous step (RA1) or high speed synchronous user data (48, 56, or 64 kbps) to the bearer rate of 64 kbps. This is accomplished by using anywhere from one to all eight data bits available in the 64 kbps channel.

The de-adaption works in the reverse order.

Overall Software Architect

The main function of the Rate Adapter software is to convert the user data rate to the 64 kbps data rate for proper transmission, and, perform the reverse function for data received from the far end. It must also control the handshaking between the two ends of the data path for entering and exiting the data transfer state. The software is also responsible for the interchange circuits which serve as the interface between the DA and either the terminal or Data Processing Equipment (DPE). Finally the software interfaces to the Microprocessor (MP) to receive maintenance and operational commands and to respond with status information.

The Rate Adaptation task is accomplished in three or less steps, depending on the type of data, (RA0, RA1, and RA2) as discussed above. The software is divided into three functional areas:
Control;
Adaption; and
De-Adaption.

The Control module is further divided into:
Initialization;
Executive Loop (both high and low speed); and
Interrupts.

The CONTROL module is responsible for performing the initialization, self test, and background control functions of the RA. It gains control upon power-up and waits for a SELF-CHECK message from the MP. Upon receipt of the message, CONTROL performs a self check and sends the results to the MP. It then waits for a SET OPERATING MODE message. When this message is received, CONTROL reads the configuration settings, initializes the hardware, and enters the EXECUTIVE loop. The EXECUTIVE loop is executed until the unit is reset by hardware or a message from the MP.

The ADAPTION module performs the following Bit Rate Adaptation functions:

RA0 - Stop Element Manipulation (Asynchronous Data Only). The start and stop bits of the data characters coming from the terminal are removed by the ASTRO#1. In this step, ADAPT reinserts the start bit and adds as many stop bits as needed into the bit stream until the next character is ready. The output from the RA0 step is a multiple of 600 bps.

RA1 - Bit Repetition and Frame Addition (Low-speed Sync and Async). First, data bits are replicated the appropriate number of times to bring the data rate up to 4800, 9600, or 19200 bps. Then the data is built into a frame together with control bits. Some of these control bits are a direct result of the interchange circuit inputs. The resultant frame is sent with a bit rate of 8, 16, or 32 kbps.

RA2 - Conversion to Bearer Rate (Low-speed Sync and Async). This step is performed in hardware by clocking the data out at 1, 2, or 4 clocks for every 8 clocks in.

The DE-ADAPTION module performs the inverse functions of ADAPT and is responsible for removing data bits from the transmitted frame protocol. Depending on the mode of operation the extracted data is stored in buffers to be used by the START-STOP detector (async) or sent to the ASTRO#1 for transmission (sync). It also checks that framing sync is maintained and extracts the control bits (SA, SB, and X) from the transmitted frames. Also, if frame sync is not maintained or the control bits are set in the correct pattern then events will be generated to change the state of the RA.

Each of the above modules are described in greater detail in the following sections.

Control

As stated above the CONTROL module is responsible for performing the initialization, self test, and background control functions of the RA. It gains control upon power-up and waits for a SELF-CHECK message from the MP. Upon receipt of the message, CONTROL performs a self check and sends the results to the MP. It then waits for a SET OPERATING MODE message. When this message is received, CONTROL reads the configuration settings, initializes the hardware, and enters the EXECUTIVE loop. The EXECUTIVE loop is executed until the unit is reset by hardware or a message from the MP.

Initialization

Figure 6:
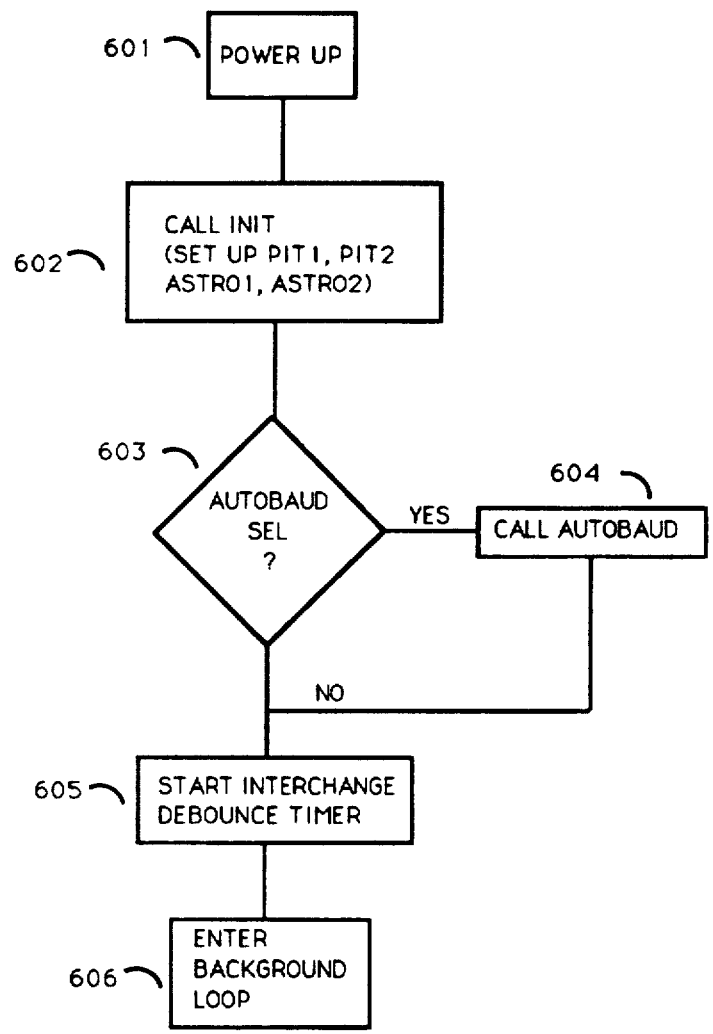
FIG. 6 is a flow diagram for the START-UP procedure.
Figure 7:
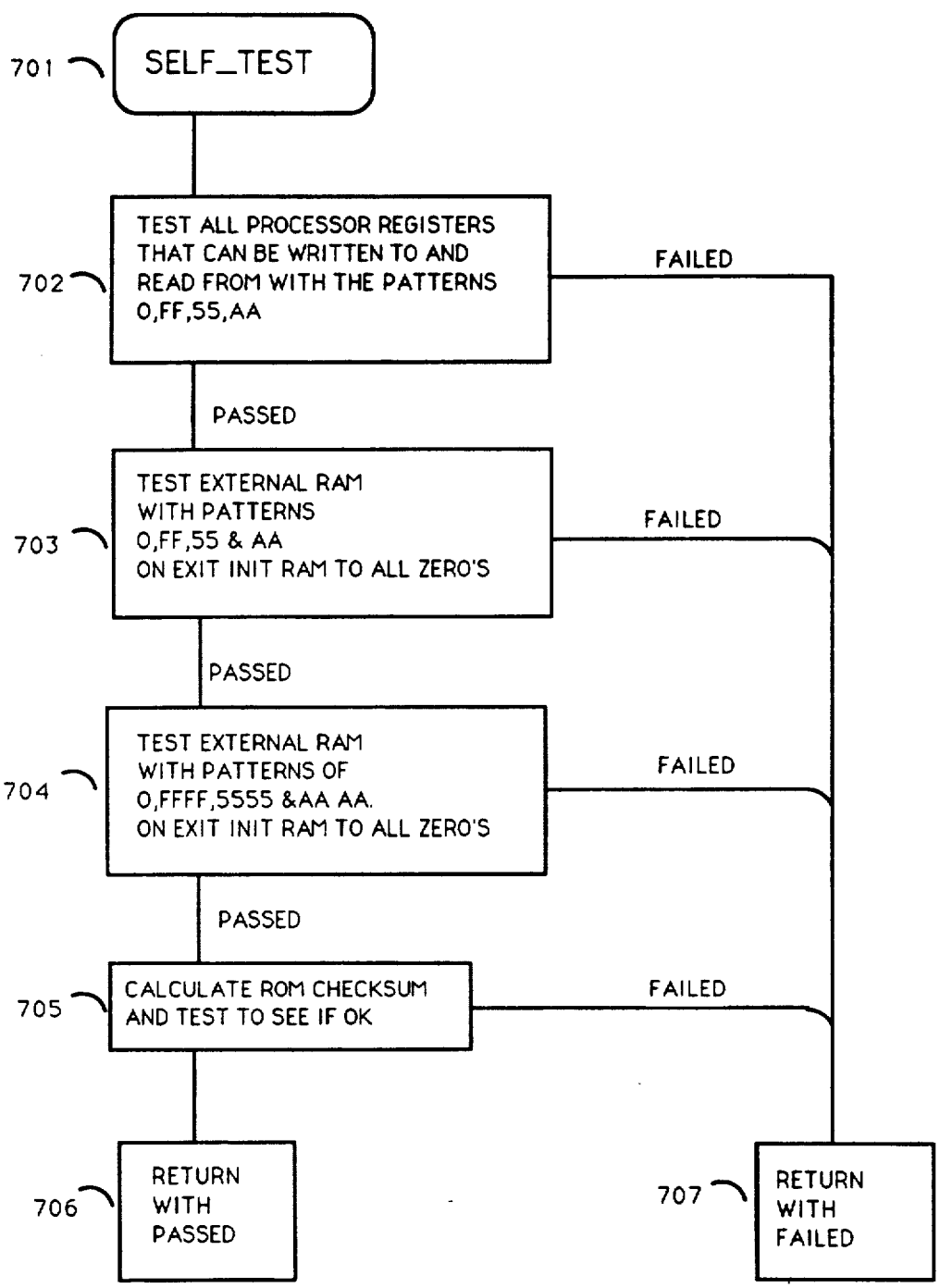
FIG. 7 is a flow diagram for the SELF-TEST procedure.
Figure 8:
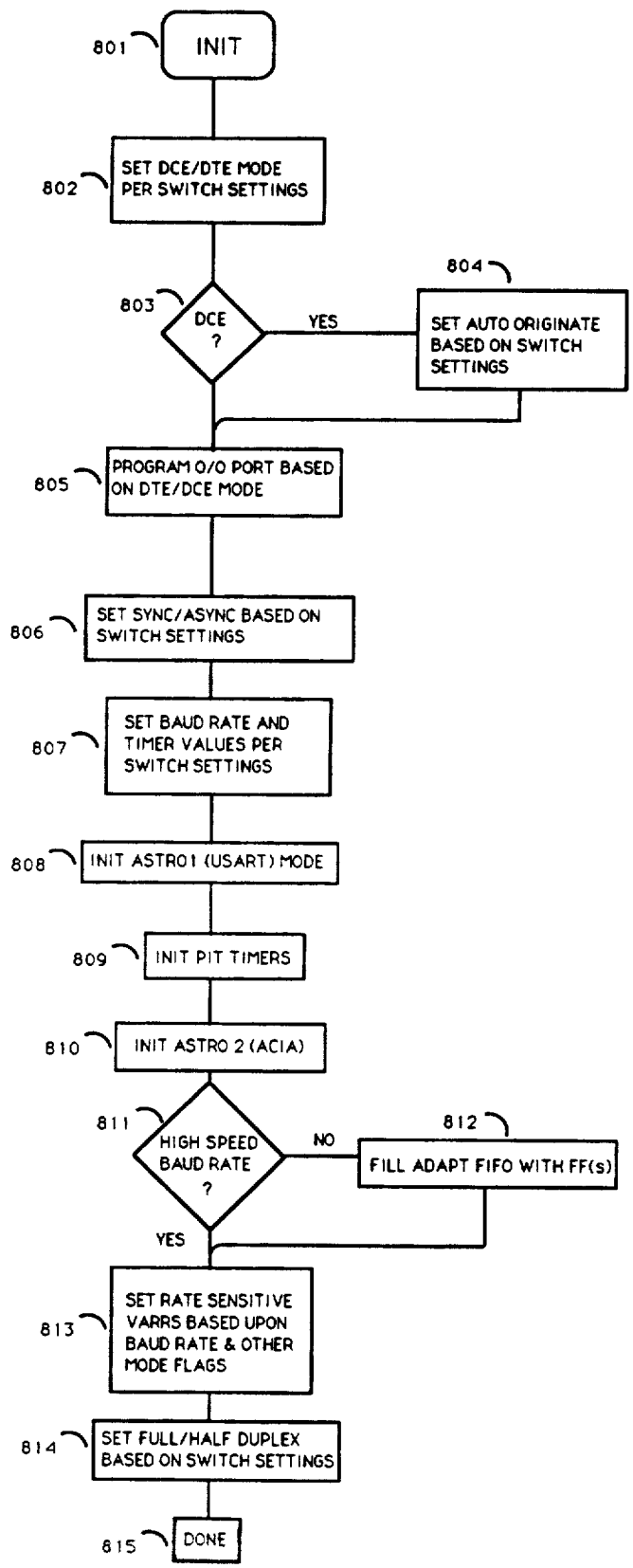
FIG. 8 is a flow diagram for the INITIALIZATION procedure.

Referring to FIGS. 6, 7, and 8 where flowcharts for the Initialization routines are shown. Upon power up, the RA enter the START-UP procedure, FIG. 6. After performing some basic functions such as stack and interrupt vector initialization, the RA calls INIT. Looking at FIG. 8, the configuration switches are read and the hardware is programmed to match the selected mode. Operating flags are also set to match the selected mode. Referring back to FIG. 6, after the INIT procedure has completed, the RA next calls an autobaud routine if so selected.

The autobaud routine gives the RA the ability to recognize, through a pre-defined ASCII character sequence received from an asynchronous data terminal equipment (DTE), the baud rate, and character sized of the DTE. Next, the DEBOUNCE timer (10 msec) is started. Finally the appropriate background loop is entered; for high speed (48, 56, or 64 kbps) the EXECHI (FIG. 9) loop is entered; for low speed (<48 kbps) the EXEC (FIG. 10) is entered.

Executive High

Figure 5:
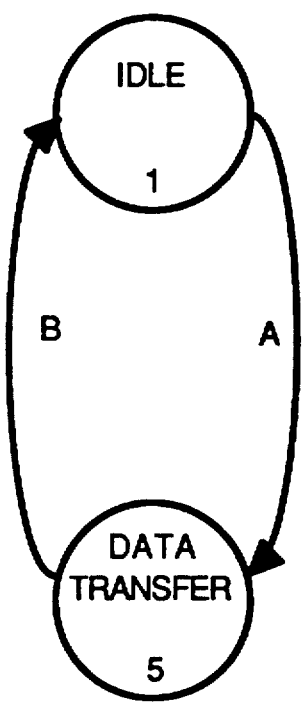
FIG. 5 is a state diagram of the rate adaption process for high speed.
Figure 9A:
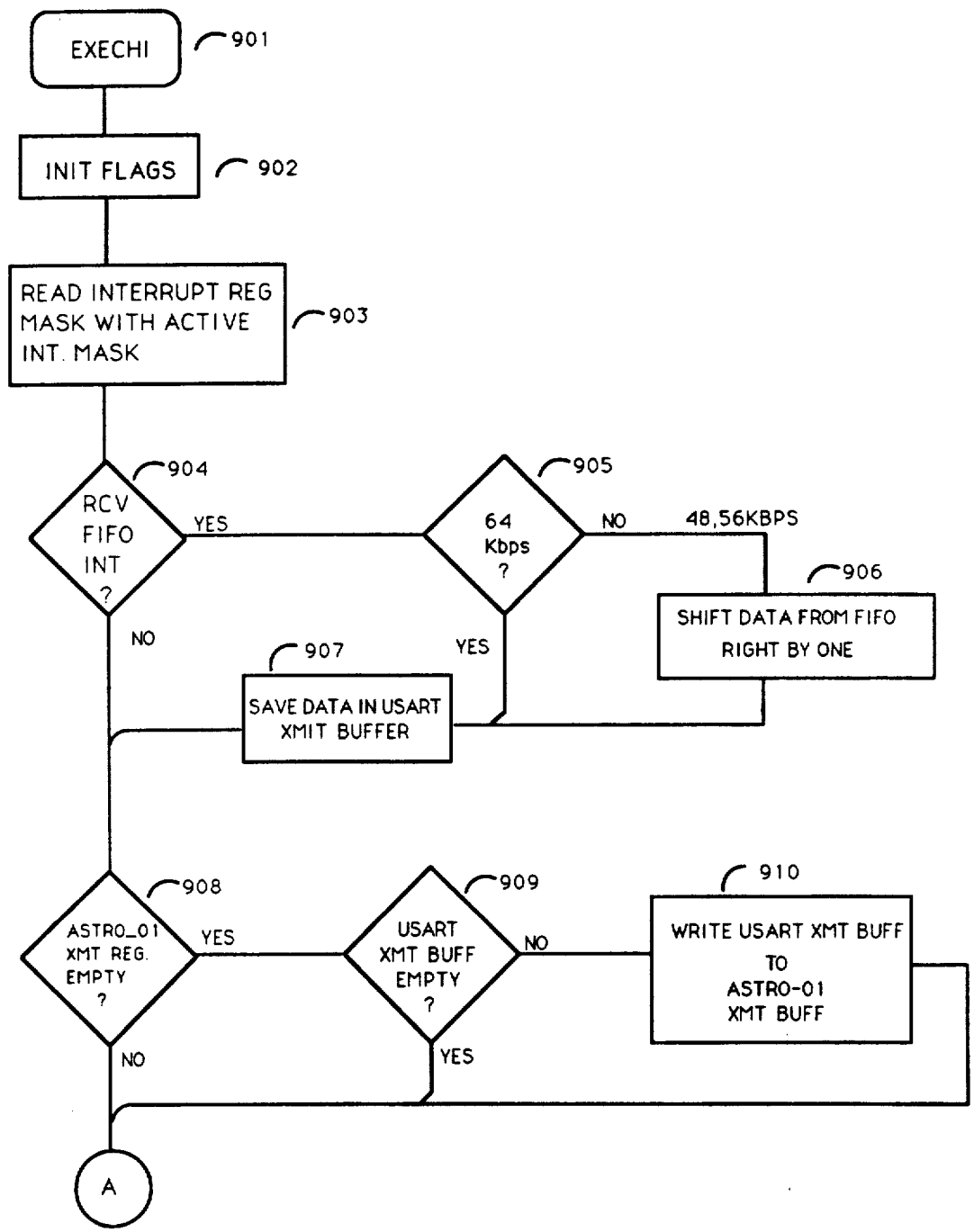
FIG. 9 is a flow diagram for the EXECUTIVE (HIGH SPEED) procedure.
Figure 9B:
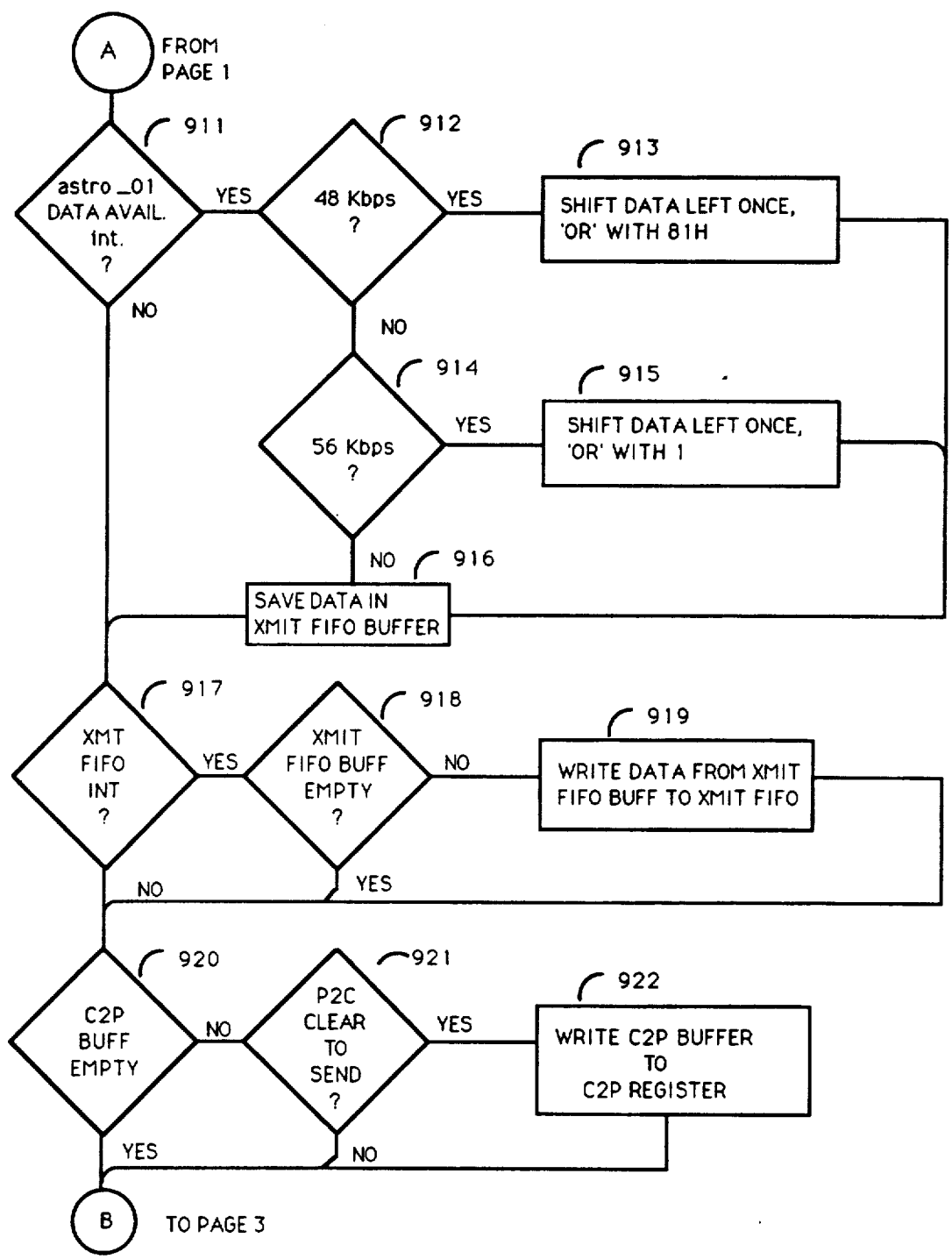
Figure 9C:
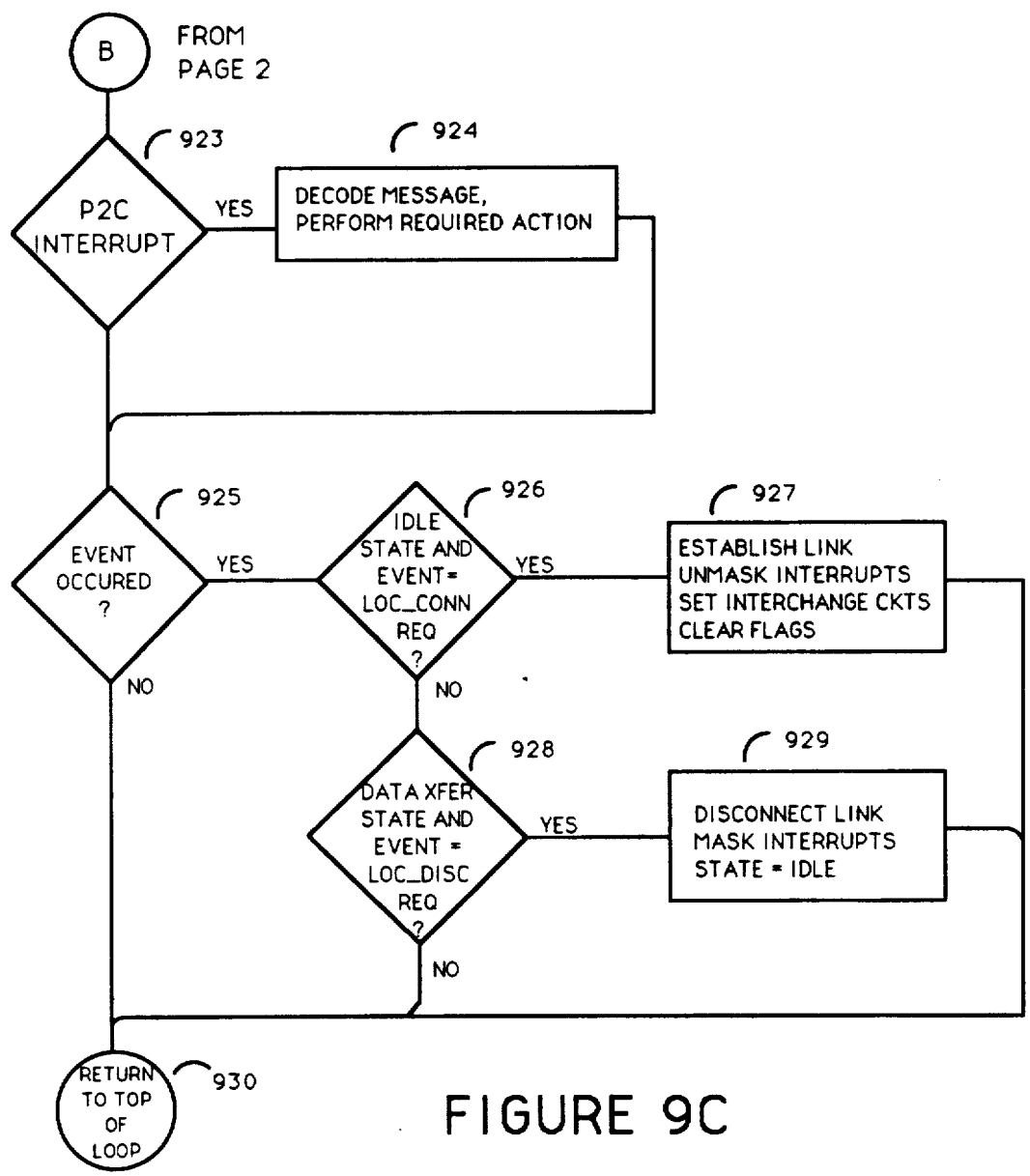

Referring to FIG. 9, the EXECHI procedure is the main or background loop when the RA is operating in the high speed synchronous mode. It polls the FIFOs and ASTRO#1 status lines for activity. In the present implementation, to allow it to handle the speed of the disabled. The flow of the high speed loop is much simpler than the low speed loop because there are only two states, IDLE and DATA_XFER (See, FIG. 5). The program flow is as follows:

---

If the RCV FIFO (22 of FIG. 2) has data, put
  it in the USART XMIT BUFFER (RAM);
If the USART XMIT BUFFER has data and the
  ASTRO#1 (26 of FIG. 2) is free to
  transmit, take the data from the buffer
  and write it to the ASTRO;
If the XMIT FIFO (28 of FIG. 2) wants data -continued > and data is in the XFIFO BUFFER (RAM),
> take the data from the buffer and write
> it to the XMIT FIFO;
> If ASTRO#1 (26 of FIG. 2) has received data
> from the user, read the data, modify it
> based on the data rate, then put it in
> the XFIFO BUFFER;
> If there are any messages to send to MP (203
> of FIG. 2) and the RA is free to send
> the data, take a message from the buffer
> and send it to the MP;
> If there are any messages from MP, then read
> the message and process it;
> If any events have occurred then process
> them;
> Return to the top of the loop.

With the aid of TABLES 11, 12, and 13, the high speed conversion can be explained. When the speed is set to 64 kbps there is no conversion process. For a data rate of 56 kbps, the ASTRO#1 is programmed for seven data bits, no parity. Data received from the far end is in the format of TABLE 11, the received data is shifted right one bit position, thus removing the "1". These remaining seven bits (plus a "DON'T CARE") are eventually loaded into the ASTRO. As stated above, the ASTRO#1 is programmed such that only the first seven bits will be shifted out, losing the "DON'T CARE" bit. The same procedure is used for the 48 kbps data rate, but here the ASTRO#1 is programmed to only transmit six data bit with no parity.

Looking now at near end data at a 48 kbps data rate, the ASTRO#1 will signal once it has received six data bits. The six data bits are shifted left once putting them into the proper position as shown in TABLE 12. The shifted data byte is then OR(ed) with 81H to set the first and last bits. Finally the data is stored into a buffer. Data at the 56 kbps is handled in a similar manner.

Executive Low

Figure 10:
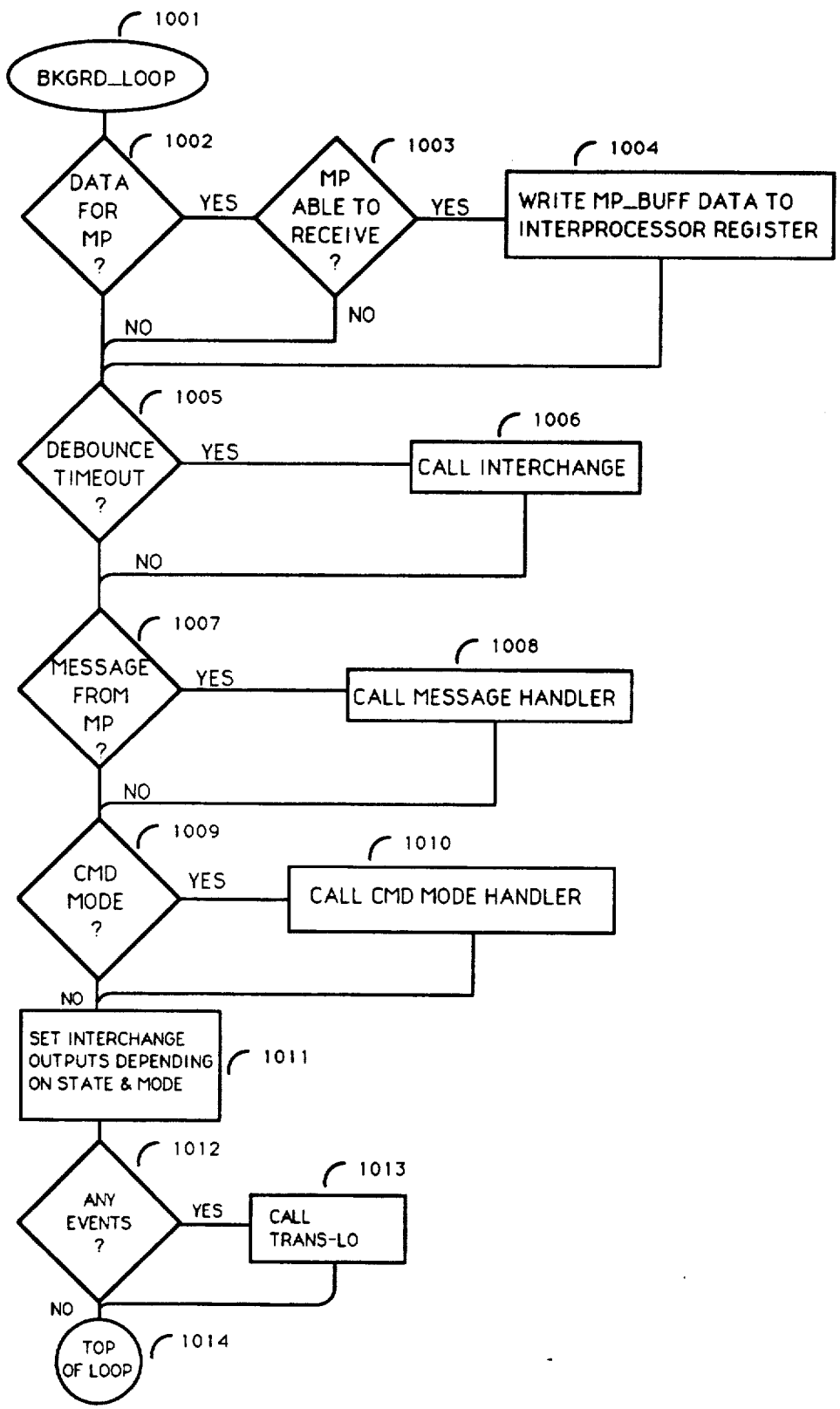
FIG. 10 is a flow diagram for the EXECUTIVE (LOW SPEED) procedure.

The EXEC procedure, as shown in FIG. 10, is the main or background loop when the RA is operating in the low speed mode. It contains the code that monitors the interchange inputs, handles state events, message transmission and reception to the MP, and the setting of the interchange outputs from the received values of the SA, SB, and X bits. Transmission and reception of data and timers are handled by interrupt routines.

> If there are any messages in the buffer to
> send to the MP and the RA is free to
> send, take a message from the buffer and
> send it to the MP;
> If there are any messages from the MP in the
> buffer, then call the message handler;
> If the interchange flag is set, then process
> the change of interchange inputs by
> calling the interchange procedure;
> If the command buffer mode is set and there
> is data in the command buffer, then call
> the command procedure;
> Set the interchange outputs based on the
> received values of SA, SB, and X bits;
> If any events have occurred, then call the
> LO_SPEED_STATE table;
> Return to the top of the loop.

Figure 4:
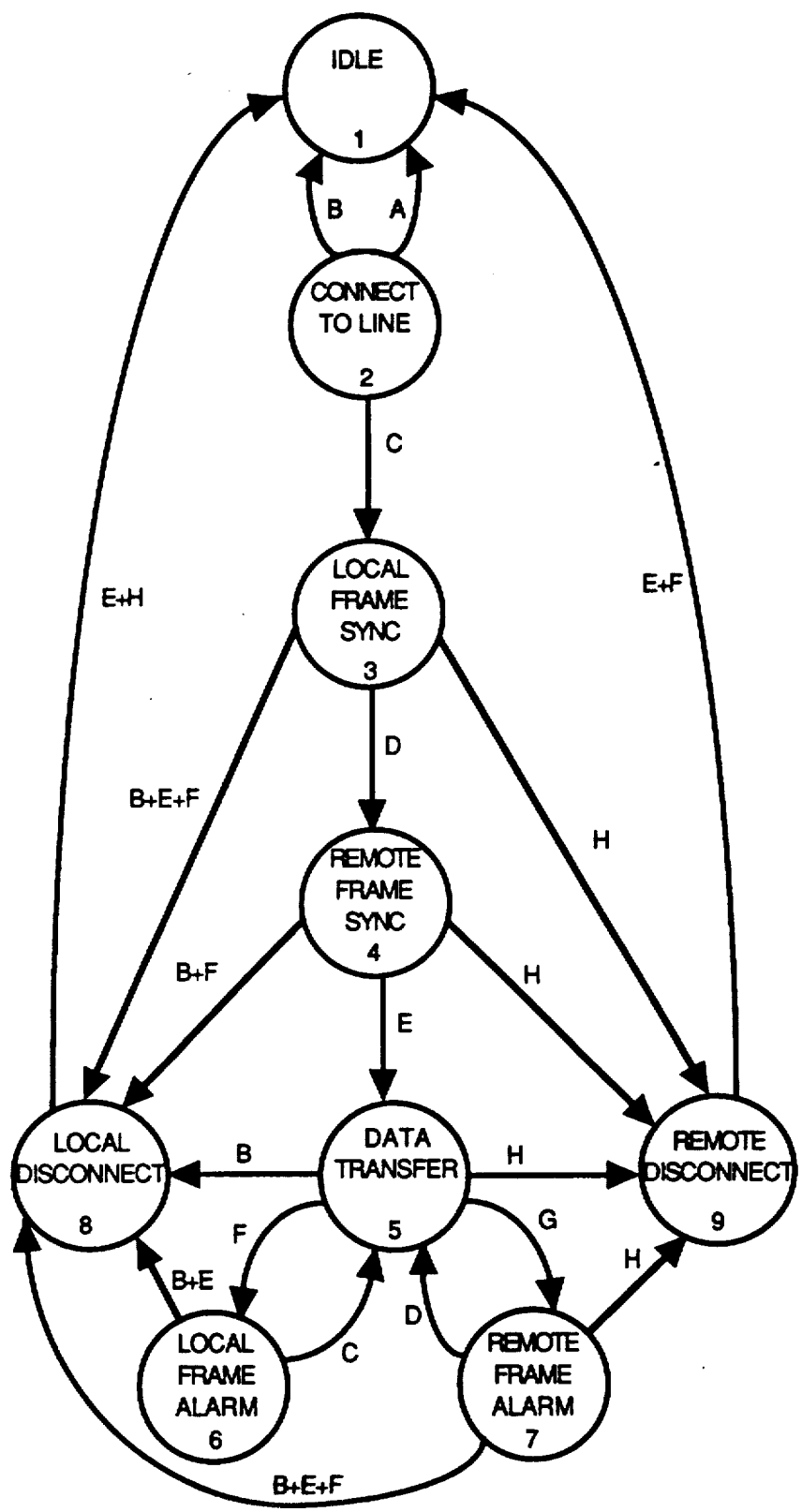
FIG. 4 is a state diagram of the rate adaption process for low speed.

First looking at FIG. 11A, the flowcharts for the LO_SPEED_STATE table procedure are shown. This procedure implements the state diagram of FIG. 4. In addition FIGS. 11B-J show the individual procedures for entering each state. The events are tested and if any event that initiates a state transition for the present state is set, then the new state is made the present state. All setups or initializations required by the new state are performed.

Figure 12:
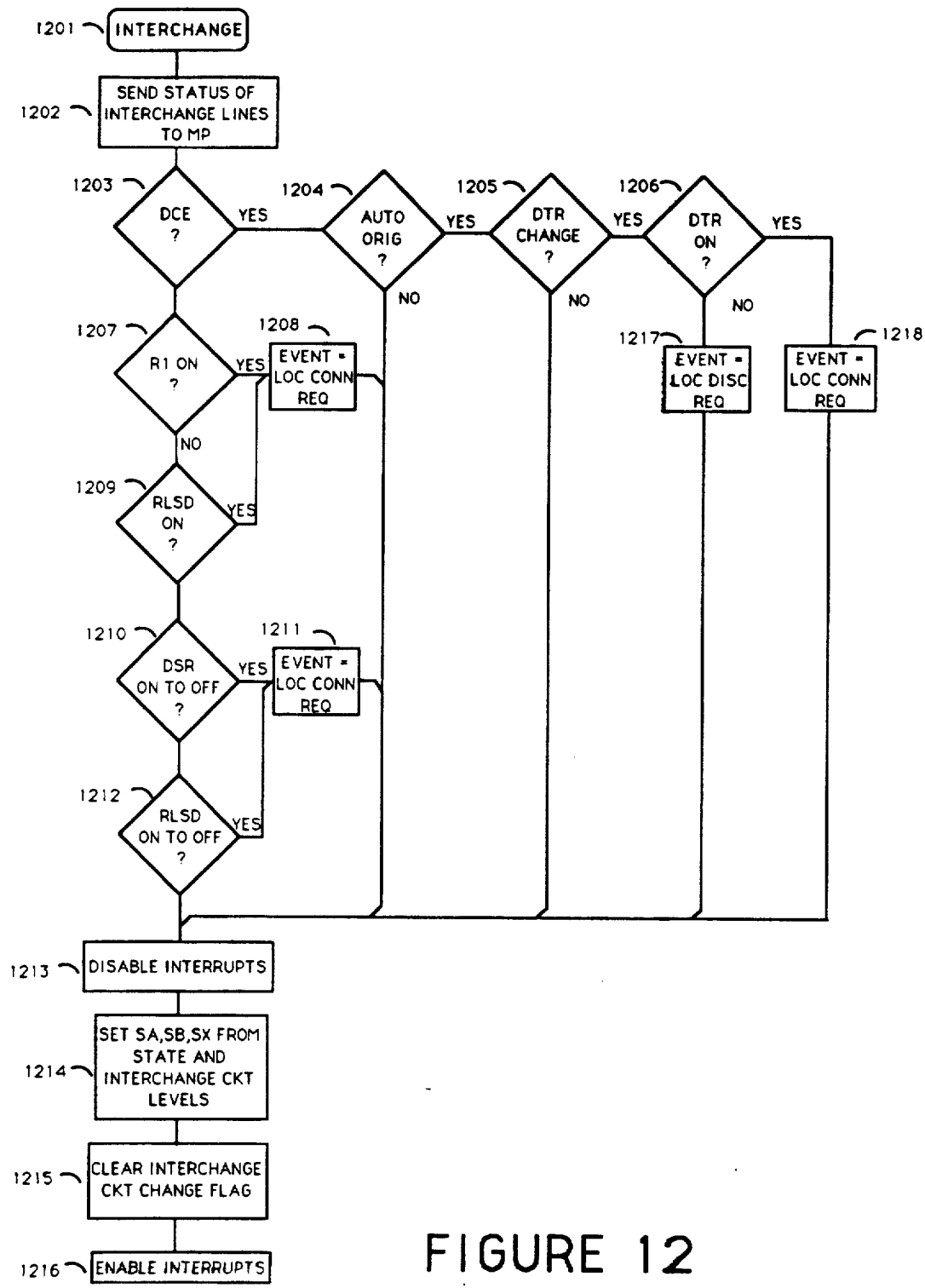
FIG. 12 is a flow diagram for the INTERCHANGE circuit procedure.

The INTERCHANGE module is shown in FIG. 12. This module monitors the interchange circuit input leads and reports any changes to the MP. During certain modes of operation, these inputs leads are checked for an occurrence of an event.

The interchange circuits are monitored by the DEBOUNCE interrupt routine. If a change occurs and is stable for five readings, then a flag is set causing the interchange routine to be executed. Changes must be reported to the MP and will also be checked for the following special events:

> In the Auto Originate DCE mode, a transition
> from OFF to ON on Circuit 108.2 (DTR)
> indicates a LOCAL_CONNECT_REQUEST
> whereas an ON to OFF transition
> indicates a LOCAL_DISCONNECT_REQUEST.
> This also causes a return to the command
> mode if the command option is enabled.
> In the DTE mode, ON condition on either
> Circuit 125 (RI) or 109 (RLSD) indicates
> a LOCAL_CONNECT_REQUEST; a transition
> from ON to OFF on either Circuit 107
> (DSR or 109 (RLSD) indicates a
> LOCAL_DISCONNECT_REQUEST.

The changes of the input circuits also cause the transmitted values of SA, SB, and X to be changed depending on the current state and selected mode of operation. The settings for these bits are shown in, TABLE 15.

Figure 13:
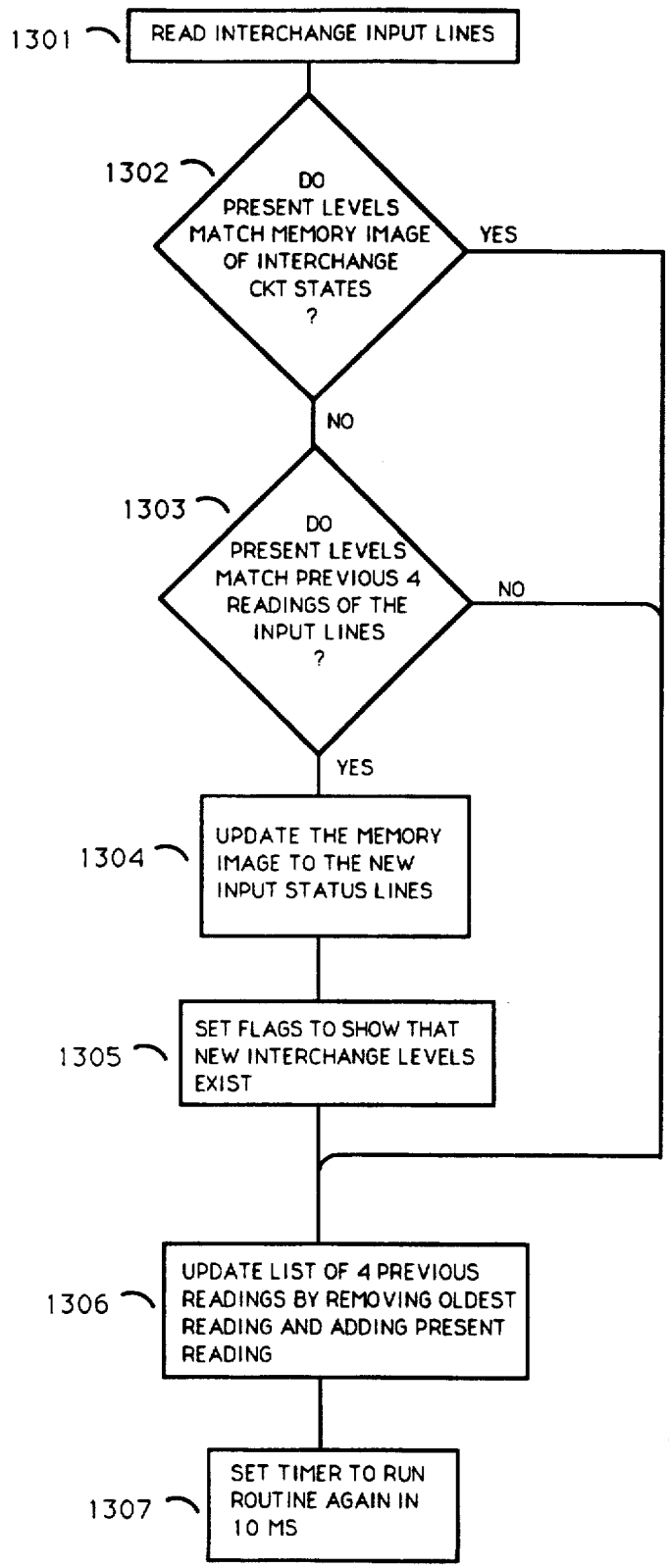
FIG. 13 is a flow diagram for the DEBOUNCE procedure.

The DEBOUNCE (FIG. 13) is invoked by a 10 msec timer interrupt. It monitors the interchange circuits inputs for changes. IF a change of input levels occurs and is constant for 50 msec then a flag is set for the interchange procedure to be executed. Procedure flow is as follows:

> Read the current levels of the interchange
> circuit inputs;
> If the current input levels do not match the
> stored memory image and the present
> input levels match the last four
> readings, then set the interchange
> circuit change flag and updated the
> memory image with the current input
> levels. Otherwise update the list of
> the last four readings.

levels. Otherwise update the list of the last four readings.

Interrupt

The DSP has four sources of interrupts:

| 1. | External Interrupt 0 | INT0 |
|---|---|---|
| 2. | External Interrupt 1 | INT1 |
| 3. | External Interrupt 2 | INT2 |
| 4. | Internal Timer Interrupt | INT3 |

Additional information about the DSP's interrupt structure can be found from its data sheet.

INT0

Figure 14:
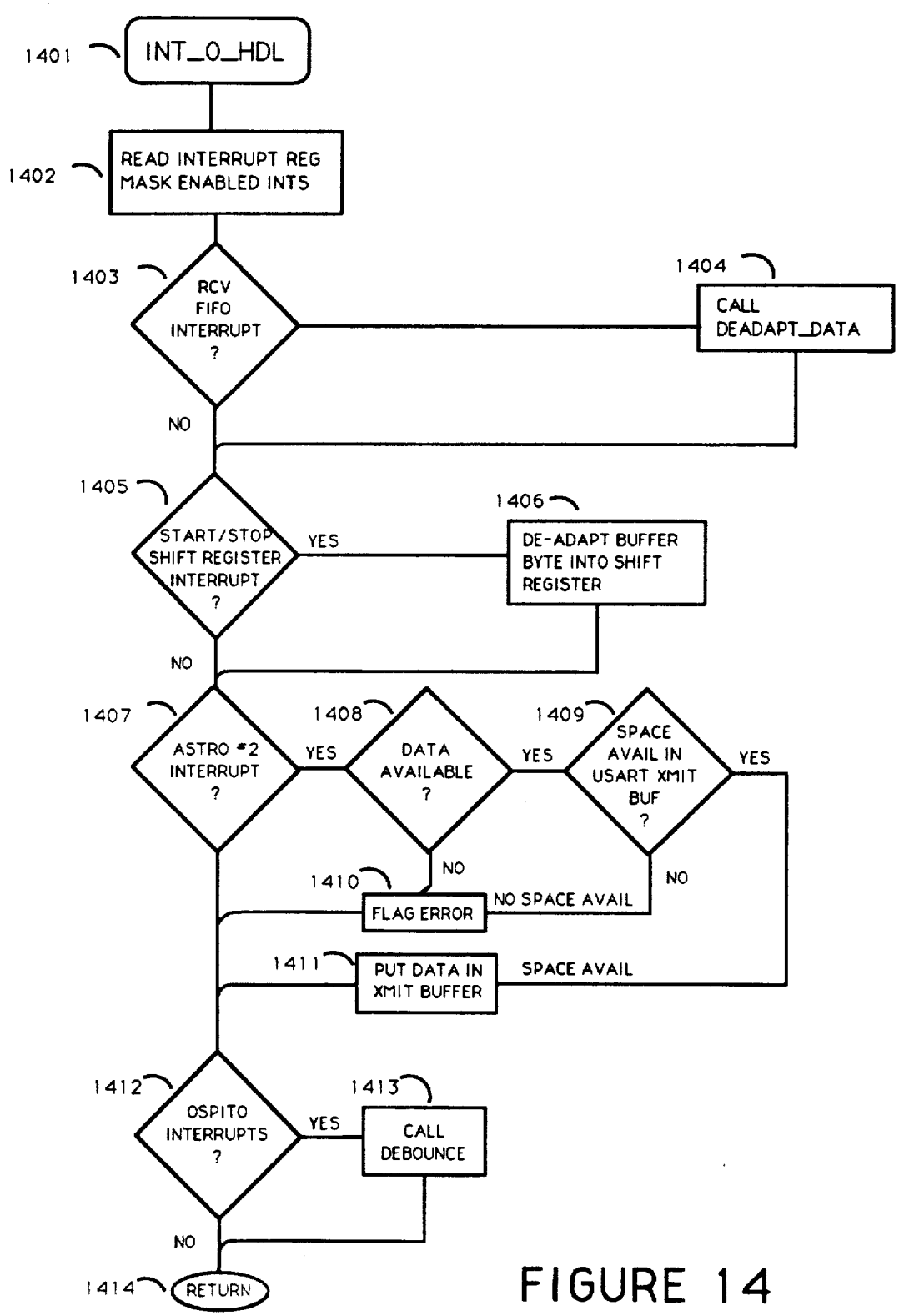
FIG. 14 is a flow diagram for the INTERRUPT 0 HANDLER procedure.

As stated above, the DSP has three sources of interrupts, but each of the above interrupts may have several sources. Looking at External Interrupt 0 first, as shown in FIG. 14, this procedure handles interrupts associated with data transmission from the B-Channel to the User's terminal. This is the highest priority interrupt. Below are the four sources for External Interrupt 0 and the DSP's response, refer to FIG. 14 for more detail.

| INTERRUPT | DESCRIPTION | RESPONSE |
|---|---|---|
| RCV FIFO: | Data byte from the B-Channel is ready in the RCV FIFO. | Call DE-ADAPT procedure. |
| START/STOP BIT DETECTOR SHIFT REGISTER: | Shift register input to the ST/ST bit detector is ready for another byte. | Load byte from DE-ADAPT BUFFER into shift register. |
| ASTRO#2: | ASTRO#2 has stripped off the start and stop bits from the serial data stream and has data ready. | Load byte into the USART XMIT BUFFER. |
| OSPITO: | 50 ms timer interrupt has occurred. | Call the debounce routine, decrement the long period timeout counter if it is non-zero. |

The DE-ADAPT procedure will be discussed in more detail in following sections.

INT1

Figure 15A:
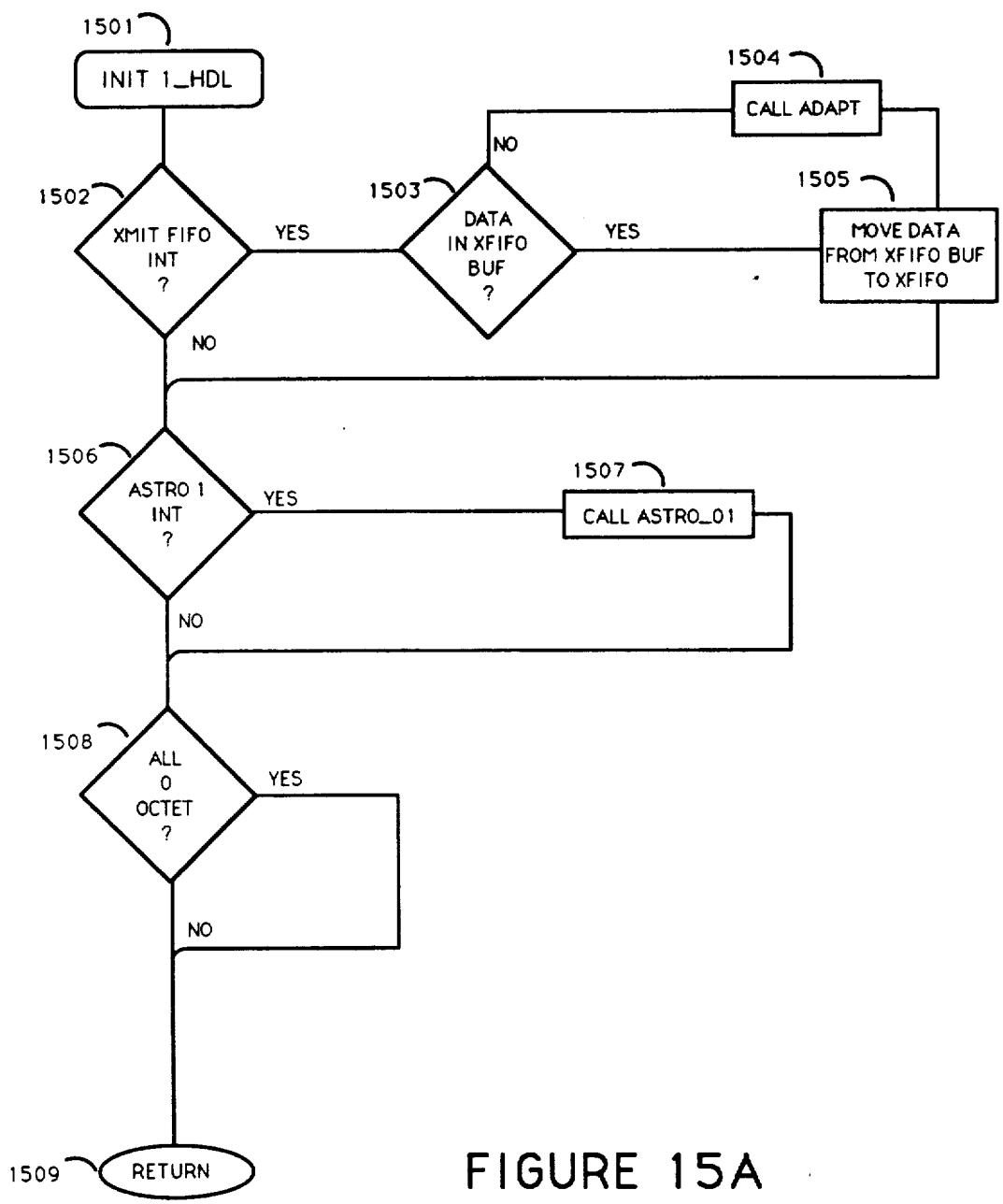
FIG. 15A is a flow diagram for the INTERRUPT 1 HANDLER procedure.

The INT1 (FIG. 15) procedure handles interrupts associated with data transmission from the User's terminal to the B-Channel. This module also handles the interrupt from the all zero octet flag. This the second highest priority interrupt. External Interrupt 1:

| INTERRUPT | DESCRIPTION | RESPONSE |
|---|---|---|
| XMIT FIFO: | XMIT FIFO is ready to accept another byte for transmission on the B-Channel. | Load byte from XFIFO buffer into XMIT FIFO; if no data available, call ADAPT procedure first. |
| ASTRO#1: | ASTRO#1 has received a byte from the terminal. | Load byte into USART RCV BUFFER; If ASYNC/DCE mode, check for near full condition. |
| ALL ZERO OCTET: | An 80 bit frame has been received. | Not used as an interrupt. |

The ADAPT procedure will be discussed in more detail in following sections.

Figure 15B:
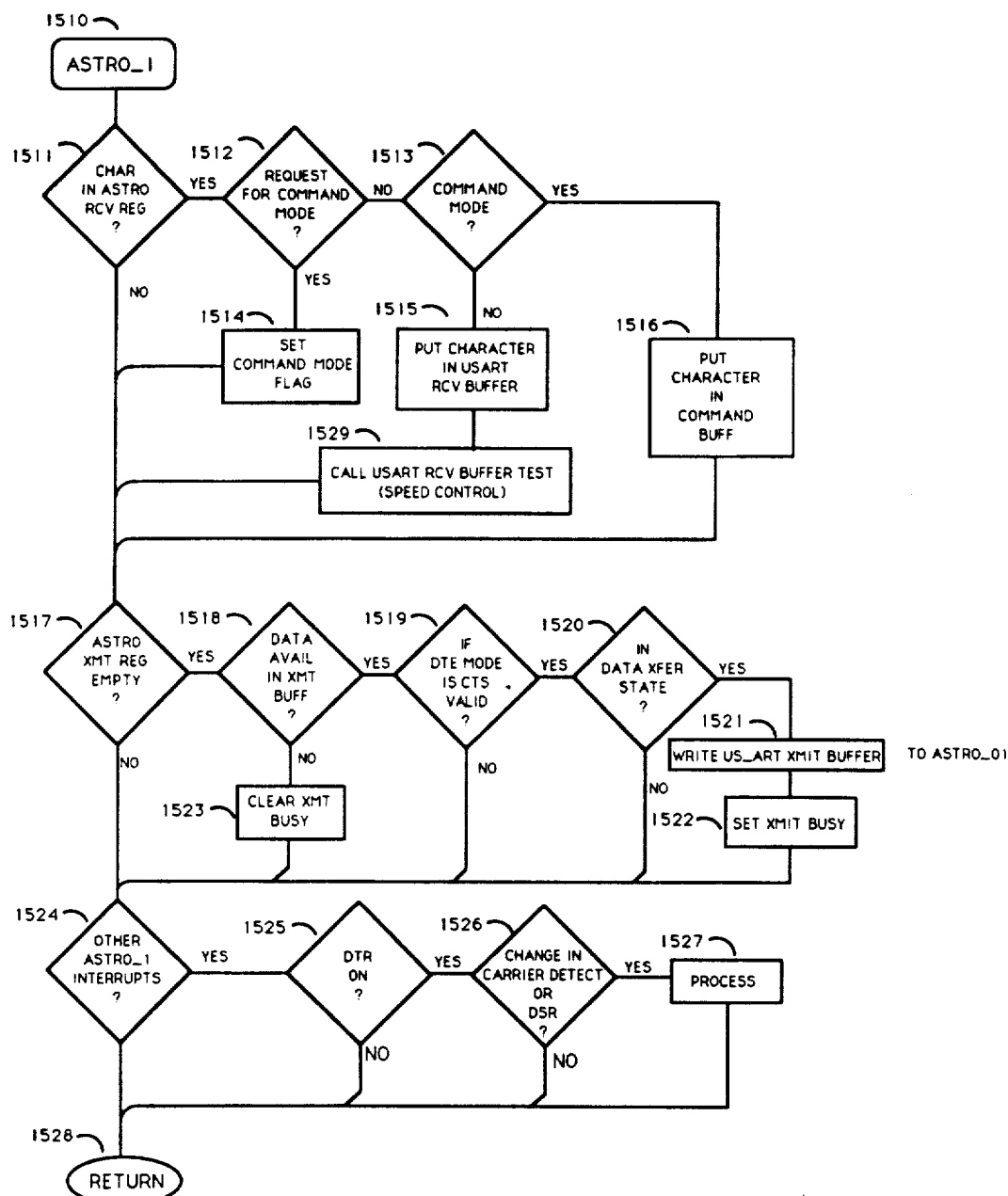
FIG. 15B is a flow diagram for the INT1(ASTRO#1) procedure.

Referring to FIG. 15B, the ASTRO#1 handler is shown. The ASTRO#1 has three events which generate an interrupt request. One, the ASTRO has received a byte from the terminal; two, the ASTRO is ready to send another byte to the terminal; or three, there has been an interchange circuit change.

In the first case (the ASTRO has received a byte from the terminal) it must be determined if the byte received is meant for the near end DA (i.e. a command) or the far end User's terminal. If the byte is a request to enter command mode, then subsequent bytes are part of a command. If it is not a request for command mode and the DA is not already in command mode, then the received byte is meant for the far end User's terminal. The byte is then put into the USART RCV buffer, and the buffer condition is tested. If the buffer is more than 80% full then depending on the mode, either the CTS interchange circuit is turned OFF or the asynchronous overspeed control as described in "A CIRCUIT AND METHOD OF HANDLING ASYNCHRONOUS OVERSPEED", Ser. No. 07/615,525 filed on Nov. 19, 1990, is used. This will continue until the buffer is less than 20% full.

In the second case (the ASTRO is ready to send more data) the flow is straight forward. If there is more to send to the terminal, then the interchange circuits are checked. Also the DA must be in the DATA_TRANSFER state (state 5 of FIG. 4). Data is transferred from the USART XMIT BUFFER into the ASTRO's XMIT REG.

The interchange signals of the ASTRO are not used, therefore the third interrupt will never be generated (unless of course there is a fault in the ASTRO chip).

INT2

External Interrupt 2 handles the interrupt from the interprocessor register. The flow of the procedure is as follows:

Read the message from the interprocessor register;
Clear the interprocessor handshake line;
Save the message in the P2C message buffer;
Return.

INT3

Internal Timer Interrupt is invoked when the internal timer of the DSP counts down to zero. It is used to set a timeout event for use by the state controller procedure. This interrupt sets the TIMEOUT flag to true and then returns.

Adaption

As stated above the ADAPTION module performs the following Bit Rate Adaptation functions:

RA0 - Stop Element Manipulation (Asynchronous Data Only). The start and stop bits of the data characters coming from the terminal are removed by the ASTRO. In this step, ADAPT reinserts the start bit and adds as many stop bits as needed into the bit stream until the next character is ready. The output from the RA0 step is a multiple of 600 bps.

RA1 - Bit Repetition and Frame Addition (Lowspeed Sync and Async). First, data bits are replicated the appropriate number of times to bring the data rate up to 4800, 9600, or 19200 bps. Then the data is built into a frame together with control bits. Some of these control bits are a direct result of the interchange circuit inputs. The resultant frame is sent with a bit rate of 8, 16, or 32 kbps.

Figure 16A:
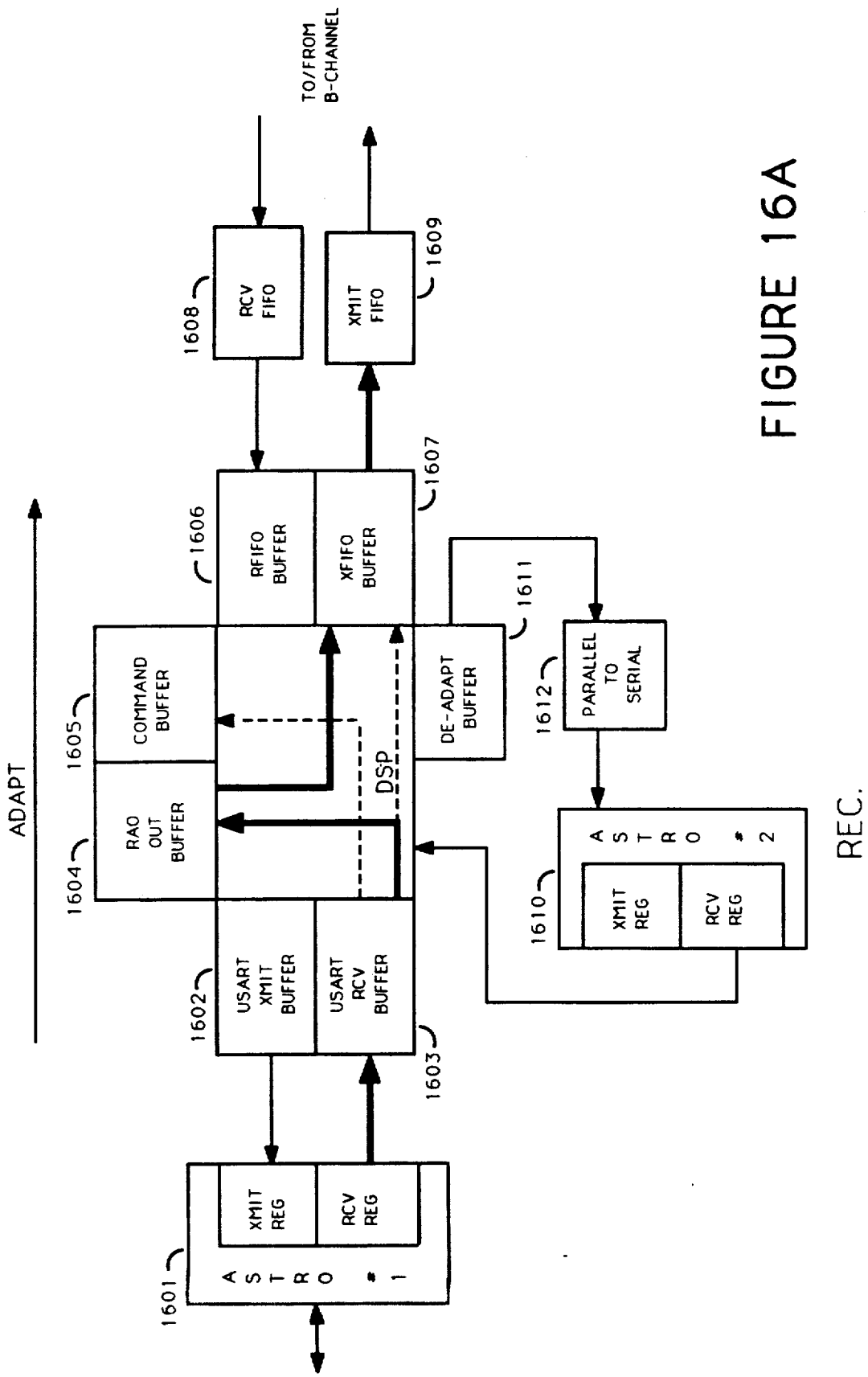
FIG. 16A is a block diagram showing the flow of data during the adaption process.

Referring to FIG. 16A the basic data flow during the adaption process is shown. Shown directly next to the DSP are the various buffers used. These buffer can be either hardware FIFOs or, as in the present invention, firmware FIFOs. A firmware FIFO is a FIFO that is implemented by firmware and uses the DSP's own RAM.

Data is transferred from ASTRO#1 RCV REG into USART RCV BUFFER by INT1(ASTRO#1). During this transfer no data manipulation is performed. When an INT1(XMIT FIFO) is received, data is moved from XFIFO BUFFER into XMIT FIFO but, if XFIFO BUFFER is empty, then ADAPT is called first.

The ADAPT procedure generates data for the XMIT FIFO. First it either moves data from USART RCV BUFFER into RA0 OUT BUFFER, performing the RA0 bit manipulation during the move if in an asynchronous mode, or if USART RCV BUFFER is empty, just writes stop bits into RA0 OUT BUFFER. Next the data is moved from RA0 OUT BUFFER into XFIFO BUFFER with RA1 bit manipulation being performed during the move, completing the ADAPT procedure. Finally the data must be moved from the XFIFO BUFFER into the XMIT FIFO by the calling routine. This process is described in more detail below.

Figure 17:
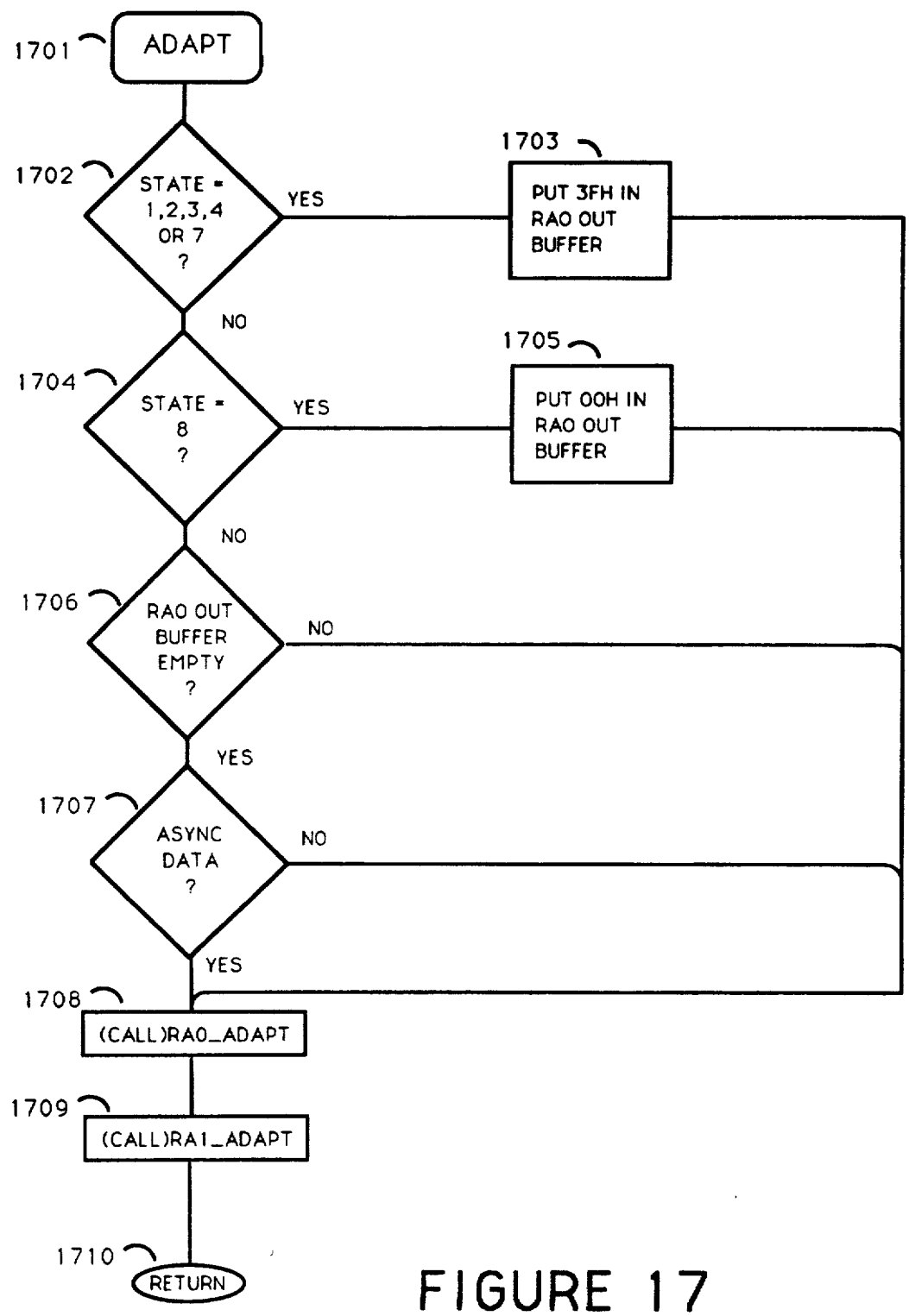
FIG. 17 is a flow diagram for the ADAPTION procedure.
Figure 18A:
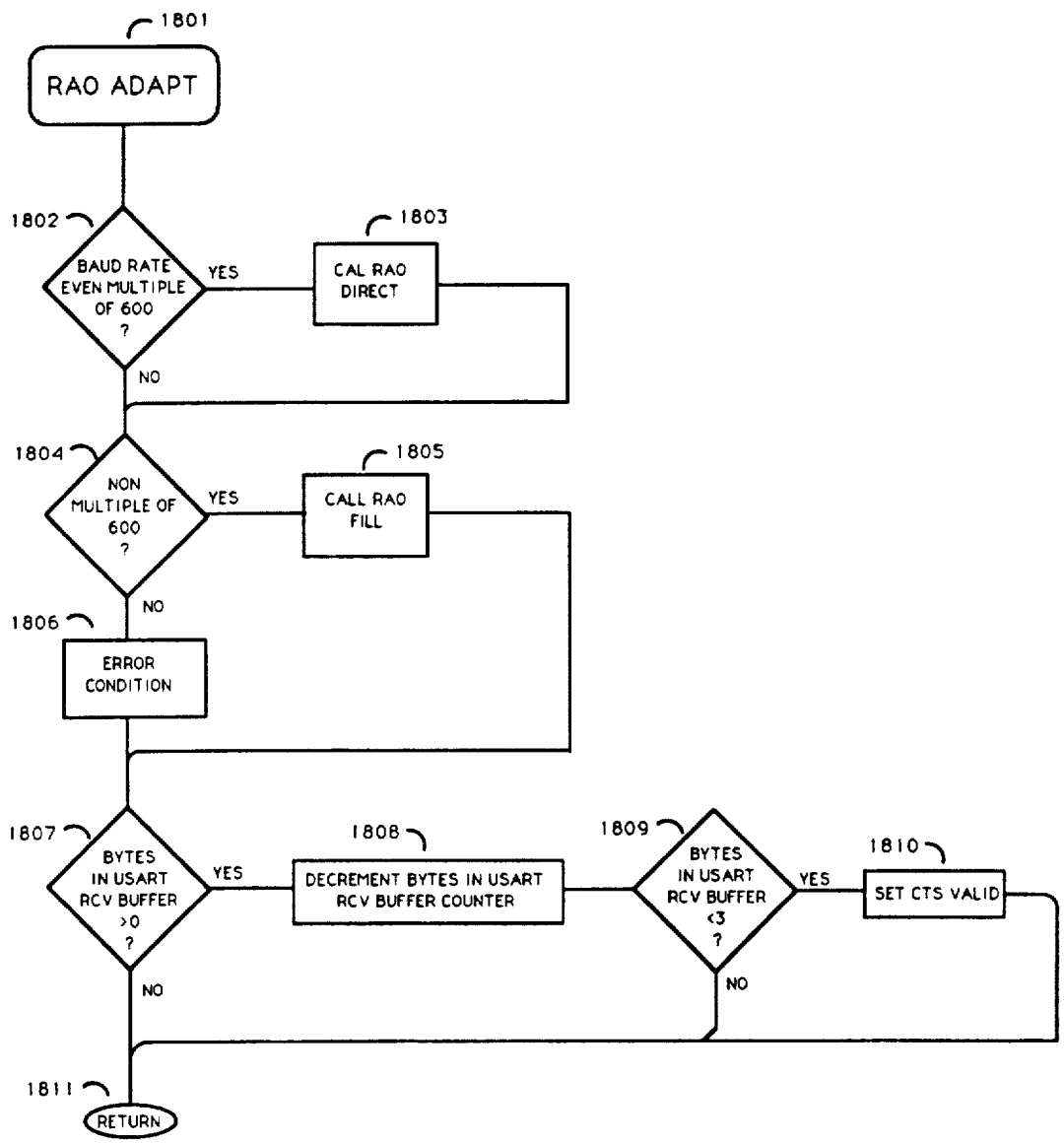
FIG. 18A is a simplified flow diagram for the RA0 procedure.
Figure 18B:
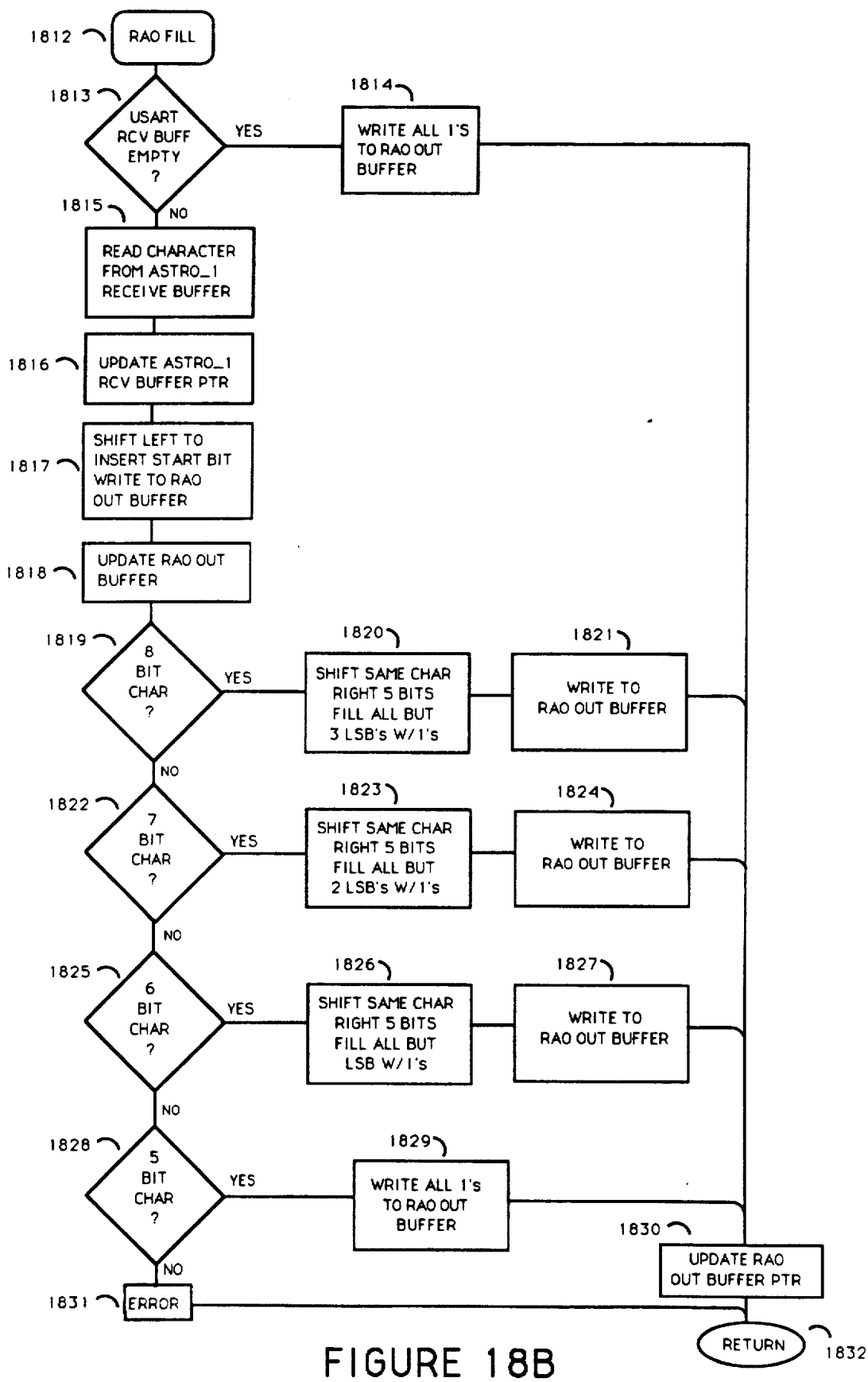
FIGS. 18B-D are flow diagrams for the sub-routines of the RA0 procedure.
Figure 18C:
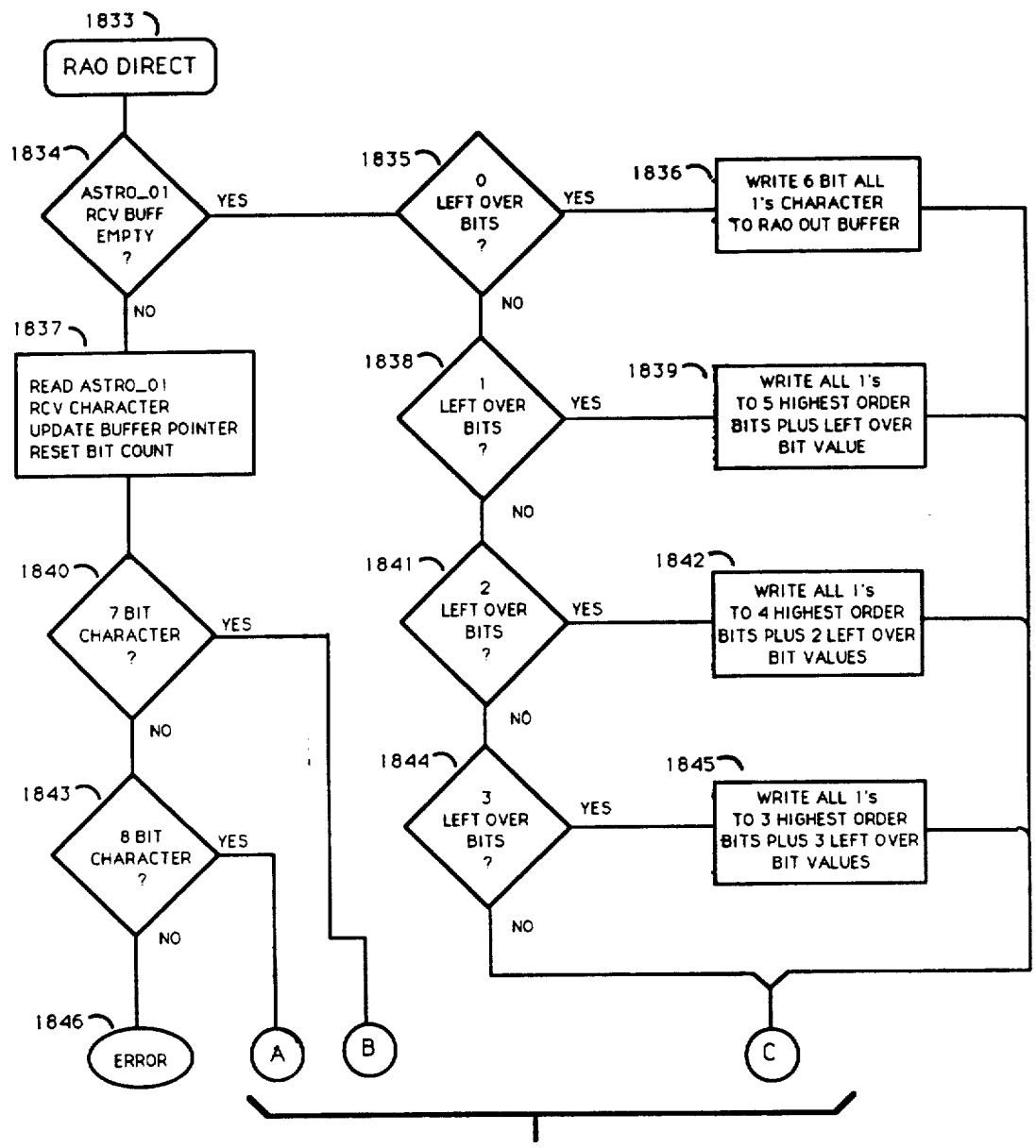
Figure 18D:
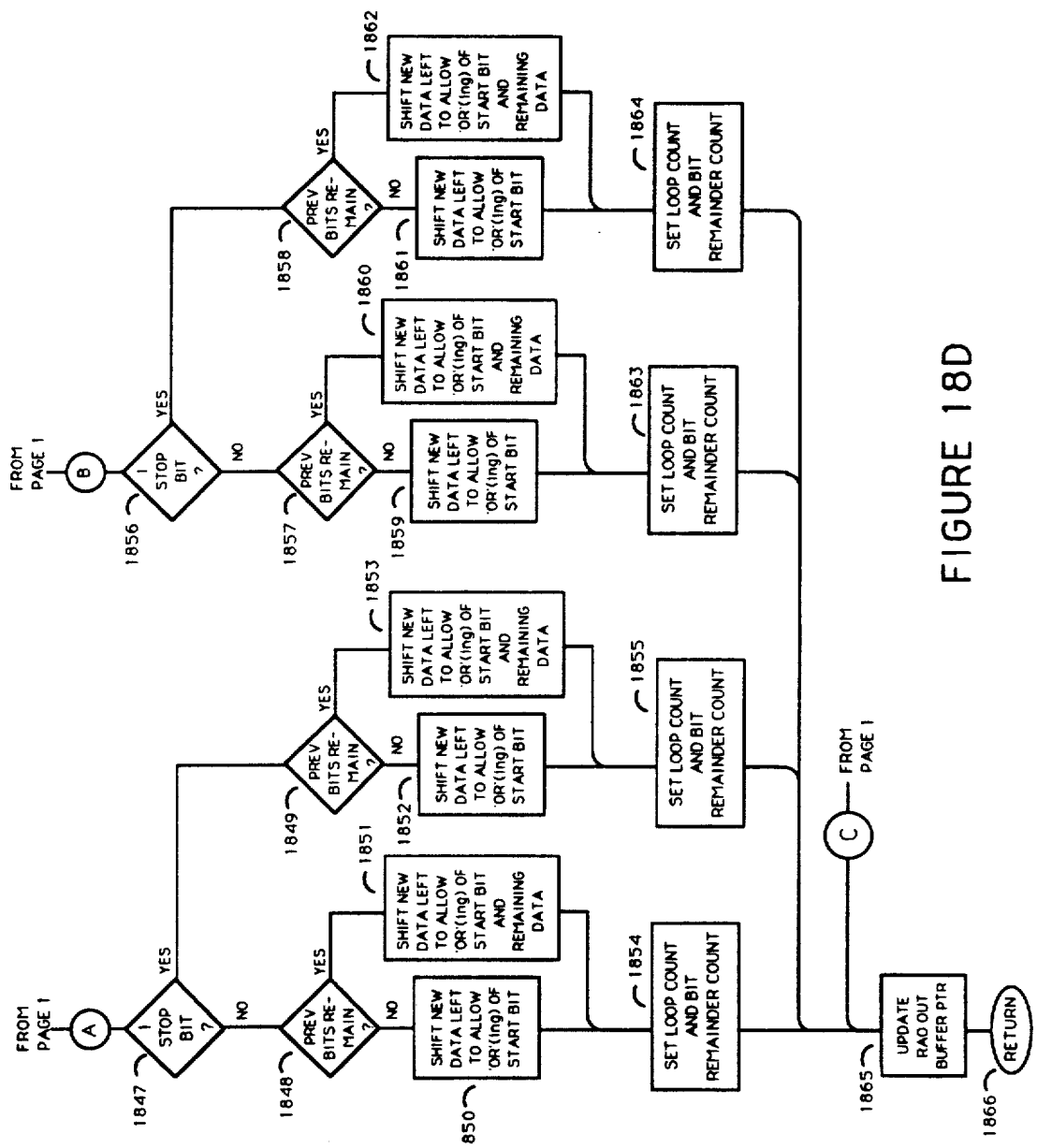

Referring to FIG. 17, the main control procedure for the ADAPT function is shown. It is called whenever the XFIFO BUFFER is out of data, and calls the RA0 and RA1 functions to provide data to the XMIT FIFO. This procedure performs the adapt function in the following steps:

---
The present state is used to determine the
type of data to be saved in the XFIFO
BUFFER.
If the state is a non data transfer state
then the appropriate fill character
(zeros or ones) is placed in the XFIFO
BUFFER for RA1.
Otherwise, if the present state is a data
transfer state then the RA0 procedure is
called.
The RA1 procedure is called to store data in
the XFIFO BUFFER.
Returns to the interrupt routine.
---

RA0

The RA0 function is only used with asynchronous User data and generally converts this asynchronous data to synchronous data. Incoming asynchronous data is padded by the addition of stop bits to fit the nearest channel defined by:

Data rate = $2^n \times 600$ bps, where $n = 0 \ldots 5$

Thus, a 2400 baud user data stream would fit into a 2400 synchronous data rate (n=2). For a 7200 baud user data stream to fit into a 9600 synchronous data rate (n=4), additional stop bits are added to fill in the time. The resultant synchronous data is fed to RA1.

Looking at FIG. 18, the RA0 ADAPT procedure is shown. A test is done on the baud rate of the incoming data and the appropriate RA0 ADAPT sub-routine is called.

If the RA0 ADAPT procedure determine that the baud rate is not an even multiple of 600 bps the RA0 FILL procedure is called. With the aid of FIG. 18, an example will help the understanding of RA0 FILL.

The first step either reads the data from the USART RCV BUFFER or, if the USART RCV BUFFER is empty, fills the RA0 OUT BUFFER with all stop bits (i.e. ones). For this example, assume that the USART RCV BUFFER has an eight bit character ready to be sent and that the eight bit character is represented by "ABCDEFGH". Because the ASTRO will have removed all start and stop bits, the first step involves adding the start bit back in. This is done by shifting the data left by one bit thus shifting in the start bit (S). This can be seen on line 2 below.

Next the proper number of stop bits must be added in. The number of stop bits to be added depends on the character bit size as shown in FIG. 18 and is determined by how many stop bits are required to make the resultant evenly divisible into six bit characters. Here, in the example, a total of three stop bits must be added. The other character sizes can also be shown to obtain the same type results. The division into six bit pieces simplifies the frame generation of the RA1 step discussed later. Finally the six bit pieces are written into RA0 OUT BUFFER.

| 1) | A B C D E F G H |
| 2) | A B C D E F G H S |
| 3) | x x x 1 1 1 A B C D E F G H S |
| 4) | (1 1 1 A B C) (D E F G H S) |

Note: "H" is MSB, "S" is the inserted start bit

If the RA0 ADAPT procedure determine that the baud rate is an even multiple of 600 bps the RA0 DIRECT procedure is called. Referring to FIG. 18, the RA0 DIRECT procedure is shown. Data is stored in RA0 OUT BUFFER as six bit pieces to speed the generation of frames. This results in leftover bits because the number of bits after adding start and stop bits is not an even multiple of six. These extra bits are saved and added in with the next char to be received. Program flow is as follows:

---
If no data is available in USART RCV BUFFER
and any bits are left over from previous
characters, add enough stop bits to the
leftover data to make a six bit piece
otherwise, use six stop bits. Save the
resulting six bit piece in the RA0 OUT
BUFFER and exit.
If the USART RCV BUFFER is not empty, read a
byte from USART RCV BUFFER, add start
and stop bits to the byte.
If any bits are leftover from previous
character then add enough of the new bit
to make a six bit piece.
Save any bits that remain for the next time
the routine is called.
Save the six bit pieces in RA0 OUT BUFFER
and exit.
---

RA1

The RA1 function takes either the output of RA0, or User synchronous data (Herein: also called an RA0 rate), and preforms a bit repetition and framing function to fill an intermediate data channel of 8, 16, or 32 kbps. An 80-bit frame is used, as shown in TABLE 5. The adaptation of the 600, 1200, and 2400 bps RA0 rates to the 8 kbps intermediate rate, including bit repetition is shown in TABLES 6, 7, and 8 respectively. The adaptation of 7200 and 14400 bps RA0 rates to the 16 and 32 kbps intermediate rates respectively is shown in TABLE 9. While, the adaptation of 4800, 9600 and 19200 bps RA0 rates to the 8, 16, and 32 kbps intermediate rates, respectively, are shown in TABLE 10. Adaptation of 48 kbps uses TABLE 12, 56 kbps uses TABLE 11, and 64 kbps uses TABLE 13. The definition of the S and X bits is shown in TABLE 15, and the definition of the E bits is given in TABLE 14.

Figure 19A:
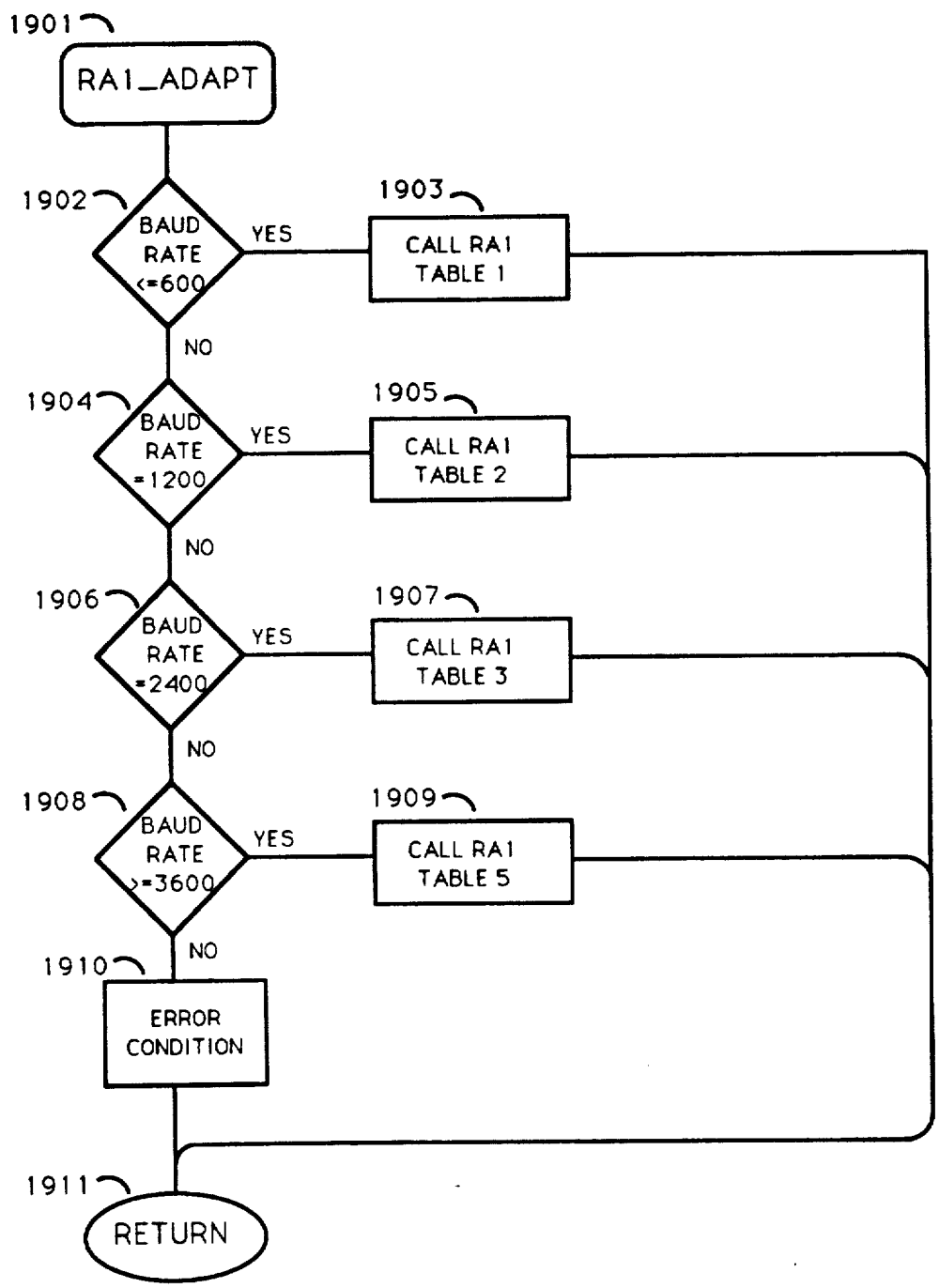
FIG. 19A is a flow diagram for the RA1 procedure.

FIG. 19A shows the overall flow for the RA1 ADAPT procedure. The baud rate is tested and the appropriate table is called. If the baud rate is below 600, then RA1-TABLE-1 is used. This sub routine converts the RA0 data into the frame structure of TABLE 6. Whereas, baud rates of 1200, 2400, and ≧3600 use RA1-TABLE-2, RA1-TABLE-3, and RA1l-TABLE-5, to convert the RA0 data into the frame structures of TABLES 7, 8, and 10, respectively.

Figure 19B:
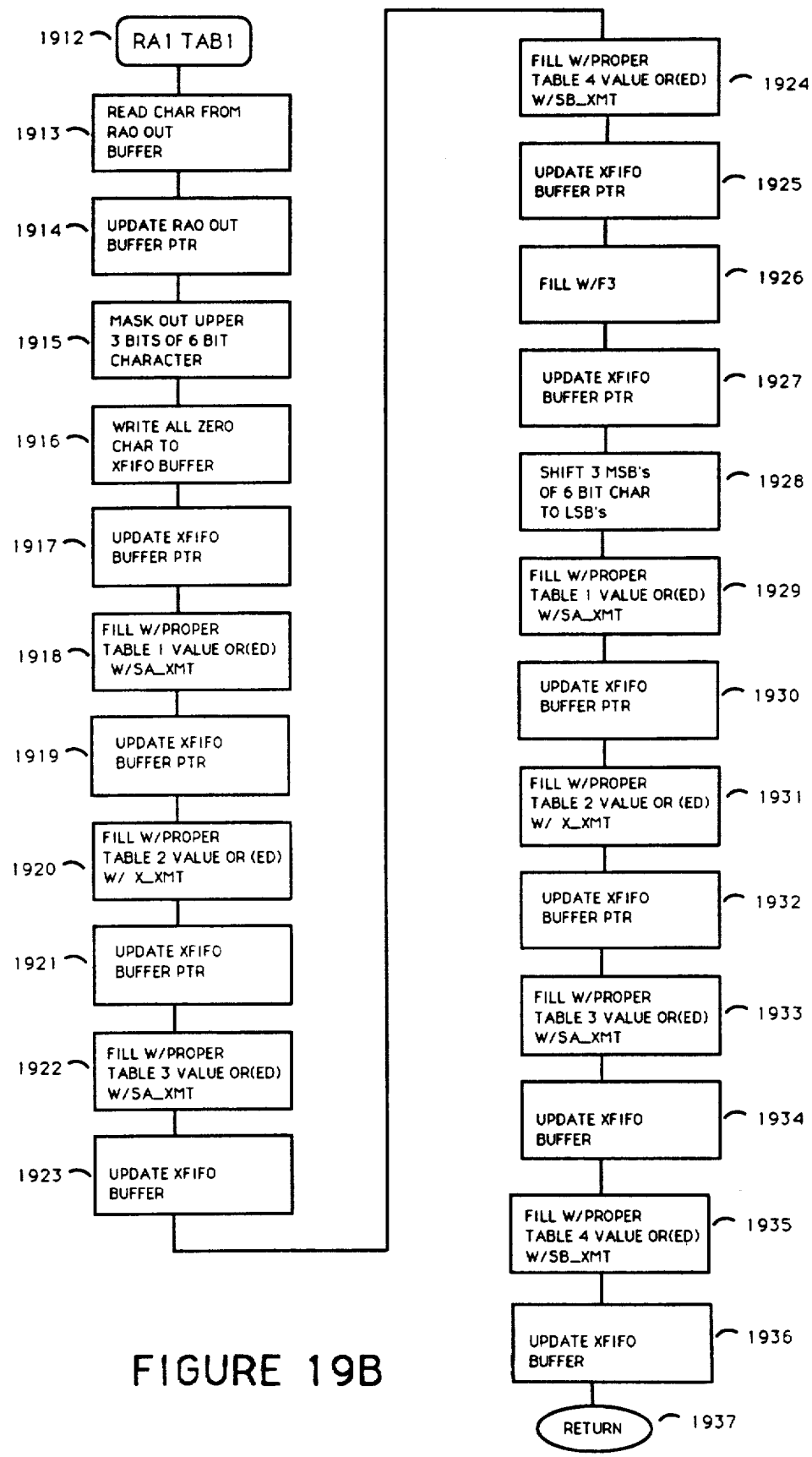
FIGS. 19B-E are flow diagrams for the sub-routines of the RA1 procedure.

With the aid of FIGS. 19B, and 16A and TABLES 2 and 6, an example for RA1-TABLE-1 will be given. First a six bit piece is retrieved from RA0 OUT BUFFER and the upper three bits are temporarily masked out. Next the SYNC byte (Octet Zero in TABLE 6) is written into the XFIFO BUFFER. The three bit piece is used as an index to TABLE 2 to generate the data. As an example, assume that the six bit piece retrieved in binary is: 011101. Therefore, if the three upper bit are masked out, the number is 101. Using this as an index in TABLE 2, (#=5, TBL#1) the resultant value is 7F. This byte is then ORed with S1 and then stored into XFIFO BUFFER as octet one. The three bit piece is used to generate octets two, three, and four using TBL#2, TBL#3, and TBL#4 rows respectively. For the present example then:

```
Octet 0 = 0
Octet 1 = 7F ORed with S1
Octet 2 = 7 ORed with X
Octet 3 = 61 ORed with S3
Octet 4 = 7F ORed with S4
```

Next octet five is written into XFIFO BUFFER. The three previously masked out bits are now shifted into the lower bit position. The new three bit piece is again used to index into TABLE 2 to generate the framed data of TABLE 6. To continue with the example, the decimal value of the new three bit piece is 3 (i.e. 011(b)=3(d)). From TABLE 2:

```
Octet 6 = 7F ORed with S6
Octet 7 = 7F ORed with X
Octet 8 = 1F ORed with S8
Octet 9 = 1 ORed with S9
```

As shown above, each call to this routine generates a complete RA1 frame.

TABLE 2

| | Look-up Table for RA1-Table-1 | | | | | | |
|---|---|---|---|---|---|---|---|
| DEC# | 0, | 1, | 2, | 3, | 4, | 5, | 6, | 7 |
| TBL#1 | 1, | 7F, | 1, | 7F, | 1, | 7F, | 1, | 7F |
| TBL#2 | 1, | 7, | 79, | 7F, | 1, | 7, | 79, | 7F |
| TBL#3 | 1, | 1, | 1F, | 1F, | 61, | 61, | 7F, | 7F |
| TBL#4 | 1, | 1, | 1, | 1, | 7F, | 7F, | 7F, | 7F |

Figure 19C:
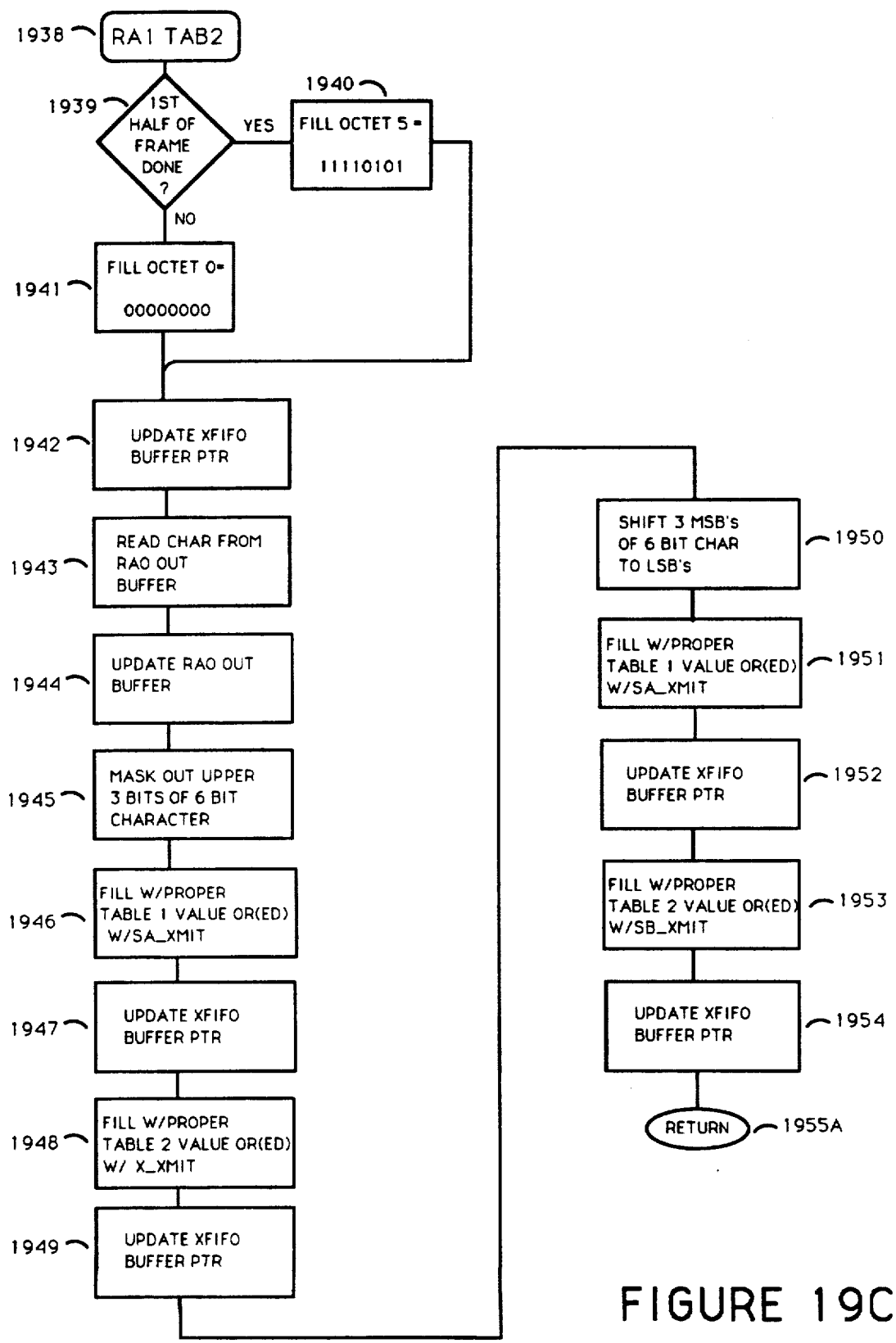

For a baud rate of 1200, the RA1-TABLE-2 sub-routine is called. Looking at FIG. 19C and TABLES 3 and 7, it can be seen that the RA1-TABLE-2 subroutine functions in a similar manner as the previously described RA1-TABLE-1 subroutine. However, the RA1-TABLE-2 subroutine generates only one-half of a frame each time it is called. This is because one six bit piece from the RA0 BUFFER occupies one-half of the frame. Because of the similarities, a detailed example will not be given.

TABLE 3

| | Look-up Table for RA1-Table-2 | | | | | | |
|---|---|---|---|---|---|---|---|
| DEC# | 0, | 1, | 2, | 3, | 4, | 5, | 6, | 7 |
| TBL#1 | 1, | 1F, | 61, | 7F, | 1, | 1F, | 61, | 7F |

TABLE 3-continued

| | Look-up Table for RA1-Table-2 | | | | | | |
|---|---|---|---|---|---|---|---|
| DEC# | 0, | 1, | 2, | 3, | 4, | 5, | 6, | 7 |
| TBL#2 | 1, | 1, | 7, | 7, | 79, | 79, | 7F, | 7F |

Figure 19D:
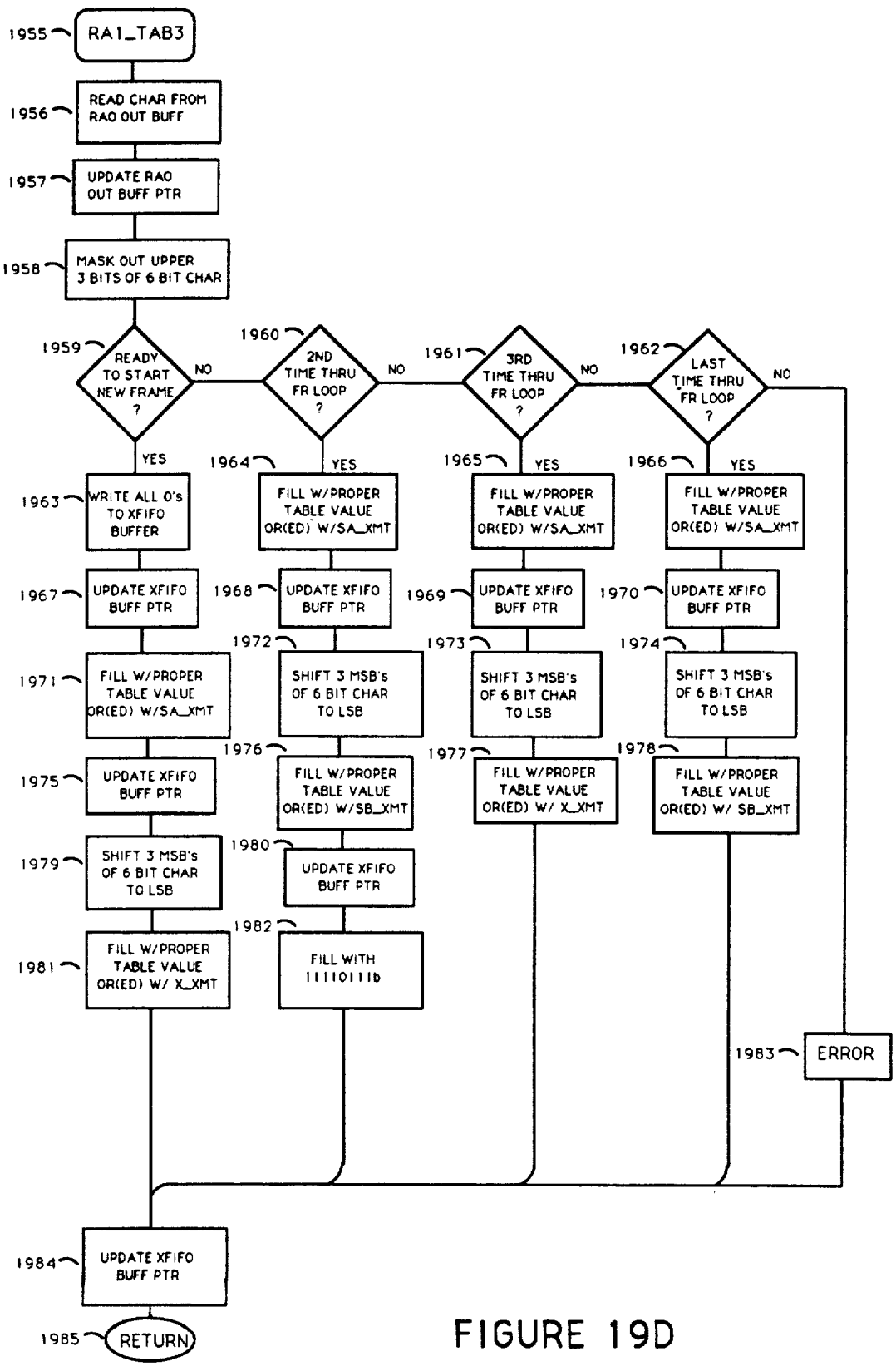

For a baud rate of 2400, the RA1-TABLE-3 sub-routine is called. Looking at FIG. 19d and TABLES 4 and 8, it can be seen that the RA1-TABLE-3 subroutine functions in a similar manner as the previously described RA1-TABLE-1 subroutine. However, the RA1-TABLE-3 subroutine generates only one-fourth of a frame each time it is called. This is because one six bit piece from the RA0 BUFFER occupies one-fourth of the frame. Because of the similarities, a detailed example will not be given.

TABLE 4

| | Look-up Table for RA1-Table-3 | | | | | | |
|---|---|---|---|---|---|---|---|
| DEC# | 0, | 1, | 2, | 3, | 4, | 5, | 6, | 7 |
| TBL#1 | 1, | 7, | 19, | 1F, | 61, | 67, | 79, | 7F |

Figure 19E:
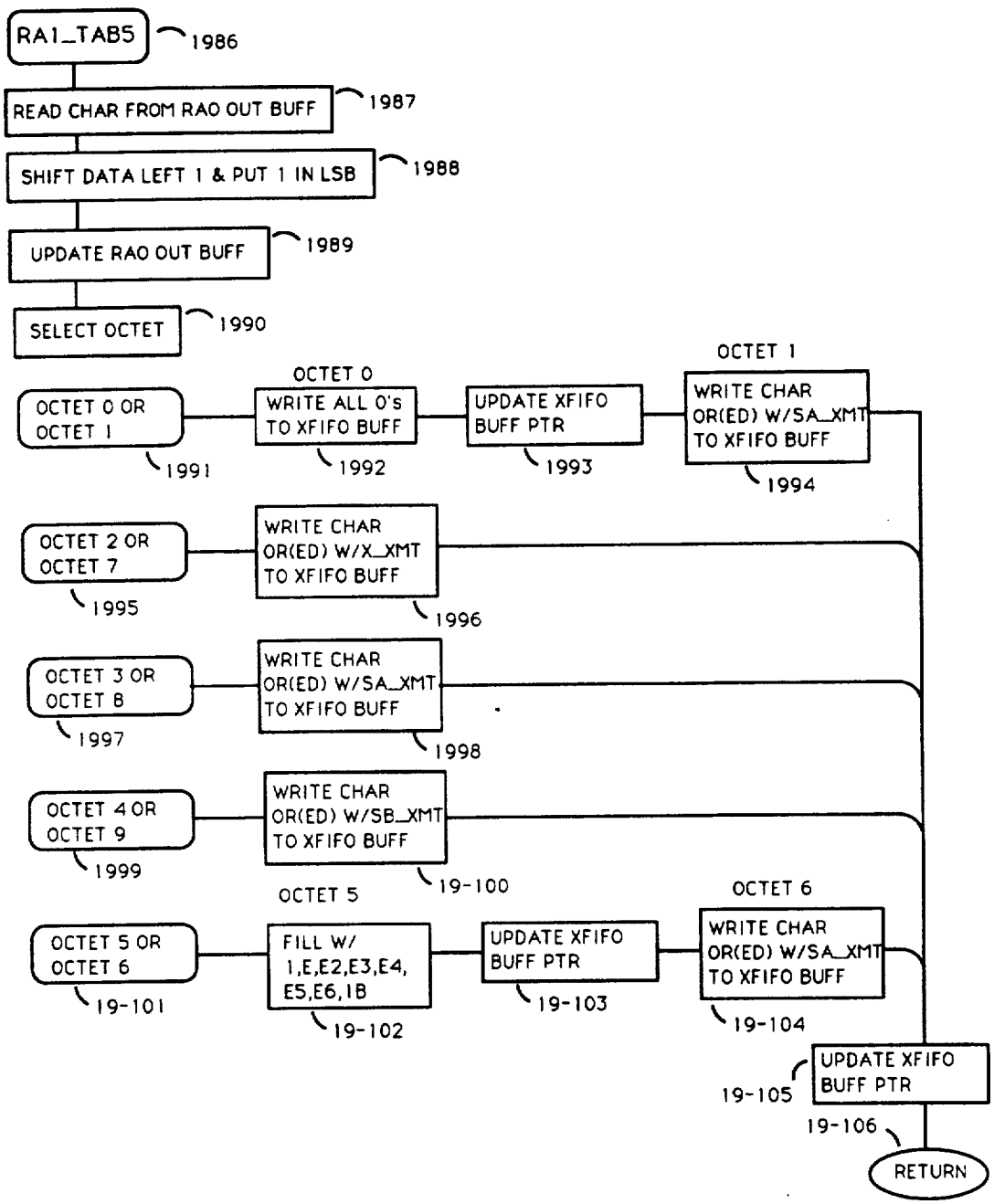

For baud rates greater than or equal to 3600, the RA1-TABLE-5 subroutine is used. Referring now to FIG. 19E, and TABLE 10 the RA1-TABLE-5 subroutine will be examined. Because the six bit pieces from RA0 BUFFER have a one-to-one translation into this frame, no table conversion is needed. The six bit piece must have the LSB set to a one and, based on the octet number, the proper interchange bit ORed in. In addition, the SYNC byte (octet zero) must be sent as well as the CONTROL byte (octet five). Because there is this one-to-one conversion, RA1-TABLE-5 only generates one-eighth of a frame each time it is called.

RA2

RA2 - Conversion to Bearer Rate (Low-speed Sync and Async). This step is performed in hardware by clocking the data out at 1, 2, or 4 clocks for every 8 clocks in. More detail can be found in co-application: "A SIMULTANEOUS VOICE AND DATA SYSTEM USING THE EXISTING TWO-WIRE INTERFACE", Ser. No. 07/615,679 filed on Nov. 19, 1990.

De-Adaption

Figure 16B:
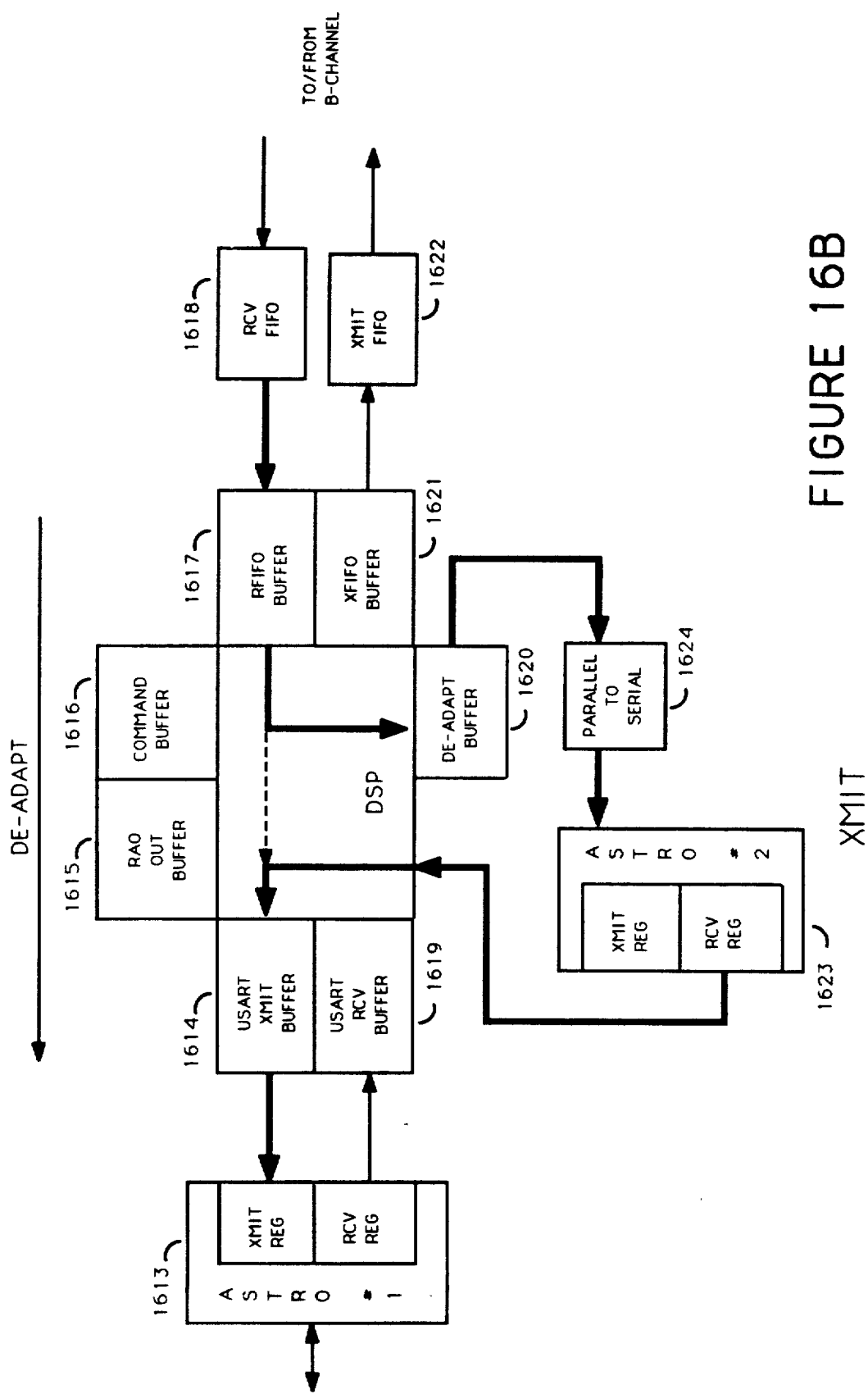
FIG. 16B is a block diagram showing the flow of data during the de-adaption process.

As stated above the DE-ADAPTION module performs the inverse function of ADAPT and is responsible for removing data bits from the transmitted frame protocol. Depending on the mode of operation the extracted data is stored in the DE-ADAPT BUFFER to be used by the START-STOP detector (async) or sent to the USART XMIT BUFFER for transmission (sync), see FIG. 16B. It extracts the control bits (SA, SB, and X) from the transmitted frames. Also, if frame sync is not maintained or the control bits are set in the correct pattern then events will be generated to change the state of the RA. If an asynchronous mode is selected, then the RA0 function is performed by the START/STOP detector.

RA2

RA2 - Conversion from Bearer Rate (Low-speed Sync and Async). This step is performed in hardware by clocking the data in at 1, 2, or 4 clocks for every 8 clocks in. More detail can be found in co-application:

"A SIMULTANEOUS VOICE AND DATA SYSTEM USING THE EXISTING TWO-WIRE INTERFACE", Ser. No. 07/615,679 filed on Nov. 19, 1990.

RA1

RA1 - Bit Repetition and Frame Addition (Low-speed Sync and Async). First, data is extracted from the frame together with control bits. Some of the control bits are used to update the interchange circuit outputs.

Figure 20A:
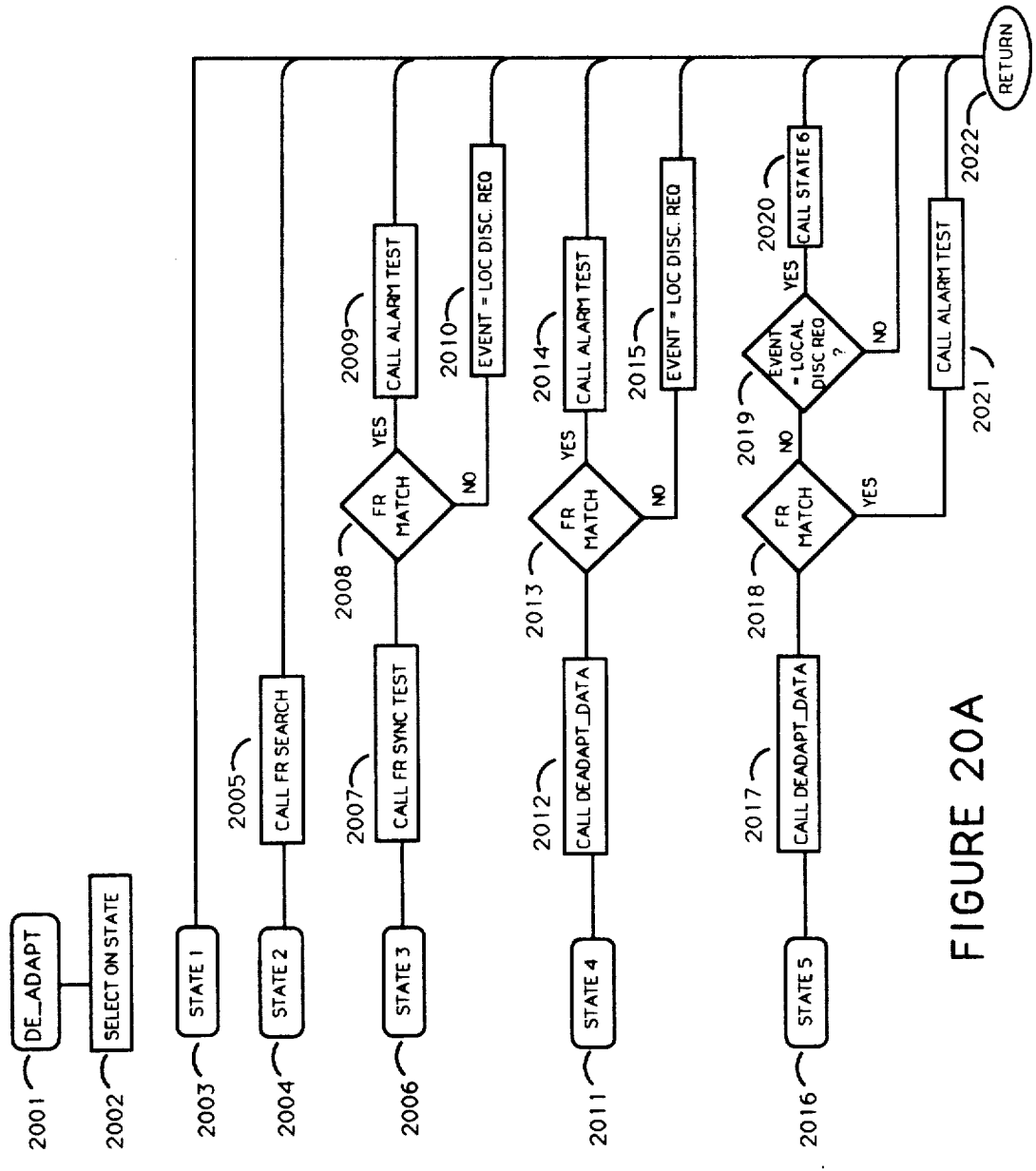
FIG. 20 is a flow diagram for the DE-ADAPTION procedure.
Figure 20B:
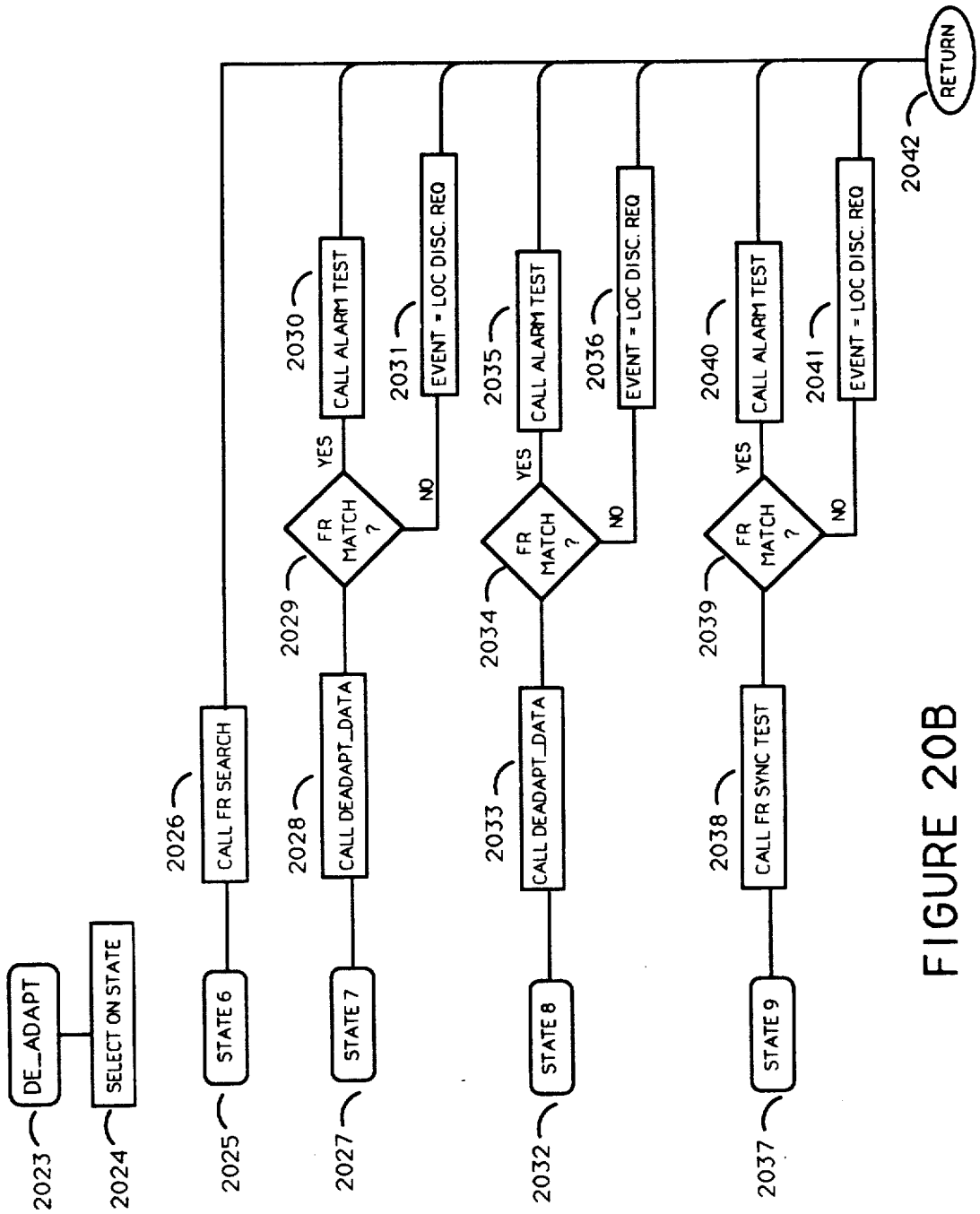

Referring to FIG. 20, the main control procedure is shown. The appropriate action is performed based on the present state (See the discussion on FIG. 5). The flow of the DE-ADAPT procedure is shown below:

Read data byte from RFIFO BUFFER.
Select action based on state.
1 (IDLE)           No action.
2 (CONN_TO_LINE)   Establish correct framing.
3 (LOC_FR_SYNC)    Verify correct frame sync.
4 (REM_FR_SYNC)    Wait for remote to
                   establish sync.
5 (DATA_XFER)      De-adapt the data.
6 (LOC_FR_ALARM)   Reestablish framing.
7 (REM_FR_ALARM)   Wait for remote to
                   Reestablish framing.
8 (LOC_DISC)       Shut down link.
9 (REM_DISC)       Remote shut down link.

Figure 22:
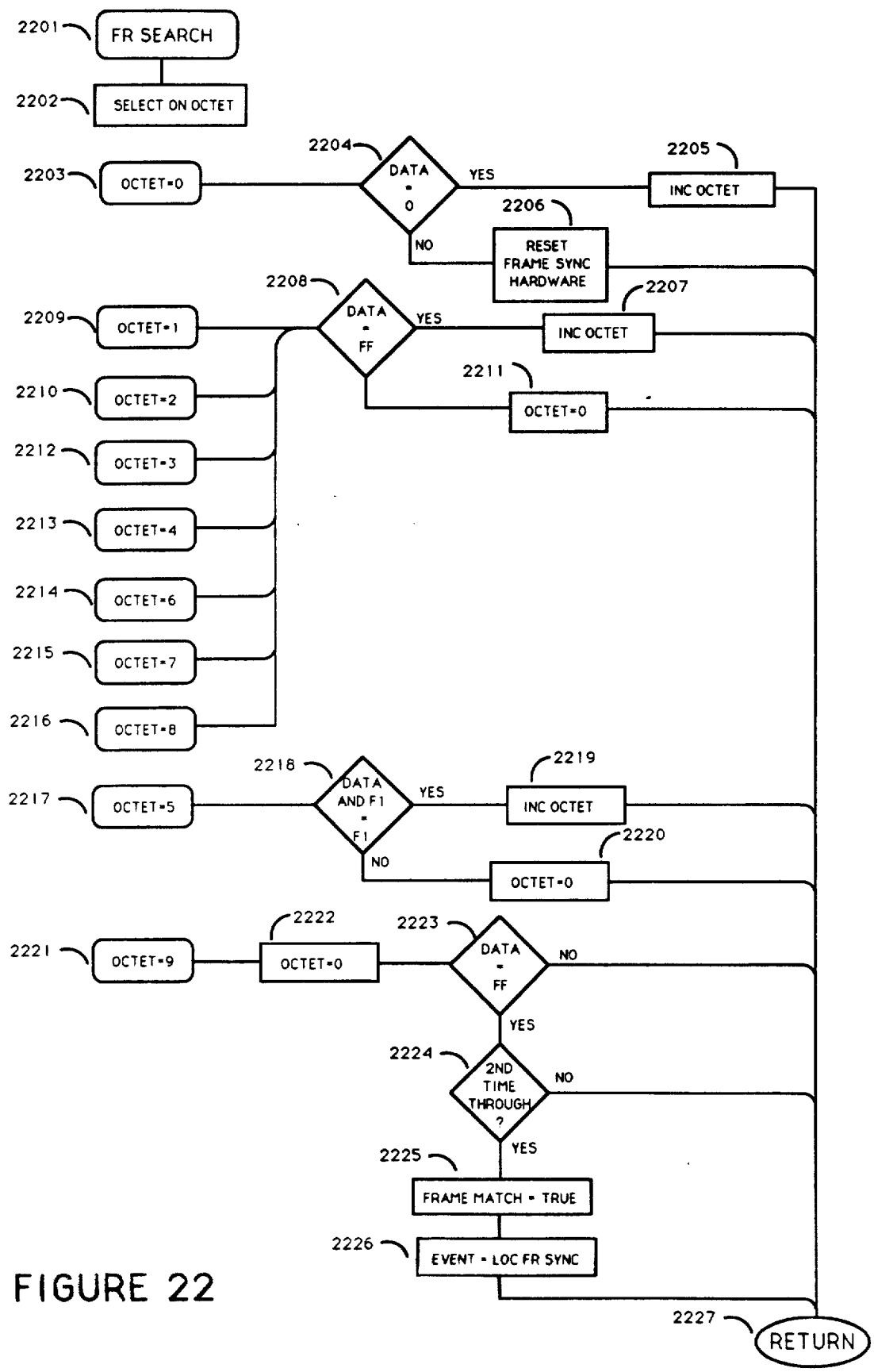
FIG. 22 is a flow diagram for the FRAME SEARCH procedure.

For states two and six, the FRAME-SEARCH procedure is executed (See FIG. 22). This procedure is used to synchronize the hardware that reads the incoming data stream with the transmitting end.

Upon entry to this procedure the frame latch
  signal is read from the hardware. (See
  application "A SINGLE CIRCUIT FOR
  DETECTING A FRAME SYNCHRONIZATION
  PATTER AND GENERATING CONTROL SIGNALS",
  U.S. Pat. No. 5,058,141. If it is valid then the data is
  checked for an all zero octet.
If the all zero octet has not been detected
  after 11 bytes it is assumed that the
  incoming data is not in sync and the
  hardware is reset.
This continues until an all zero octet has
  been received.
After an all zero octet has been received
  the next four octet must contain all
  ones. If not, the octet counter is
  reset.
Octet five is checked for the proper control
  bits being set.
Again, the next four octets must contain all
  ones.
When octet nine is received, If the previous
  nine octets were properly received, then
  it is checked for all ones. If still
  ok, and this is the second time that all
  ten octets were correctly received, a
  FRAME-MATCH-EVENT is indicated.

Note: this procedure is not called, but is inline due to speed considerations.

Figure 23A:
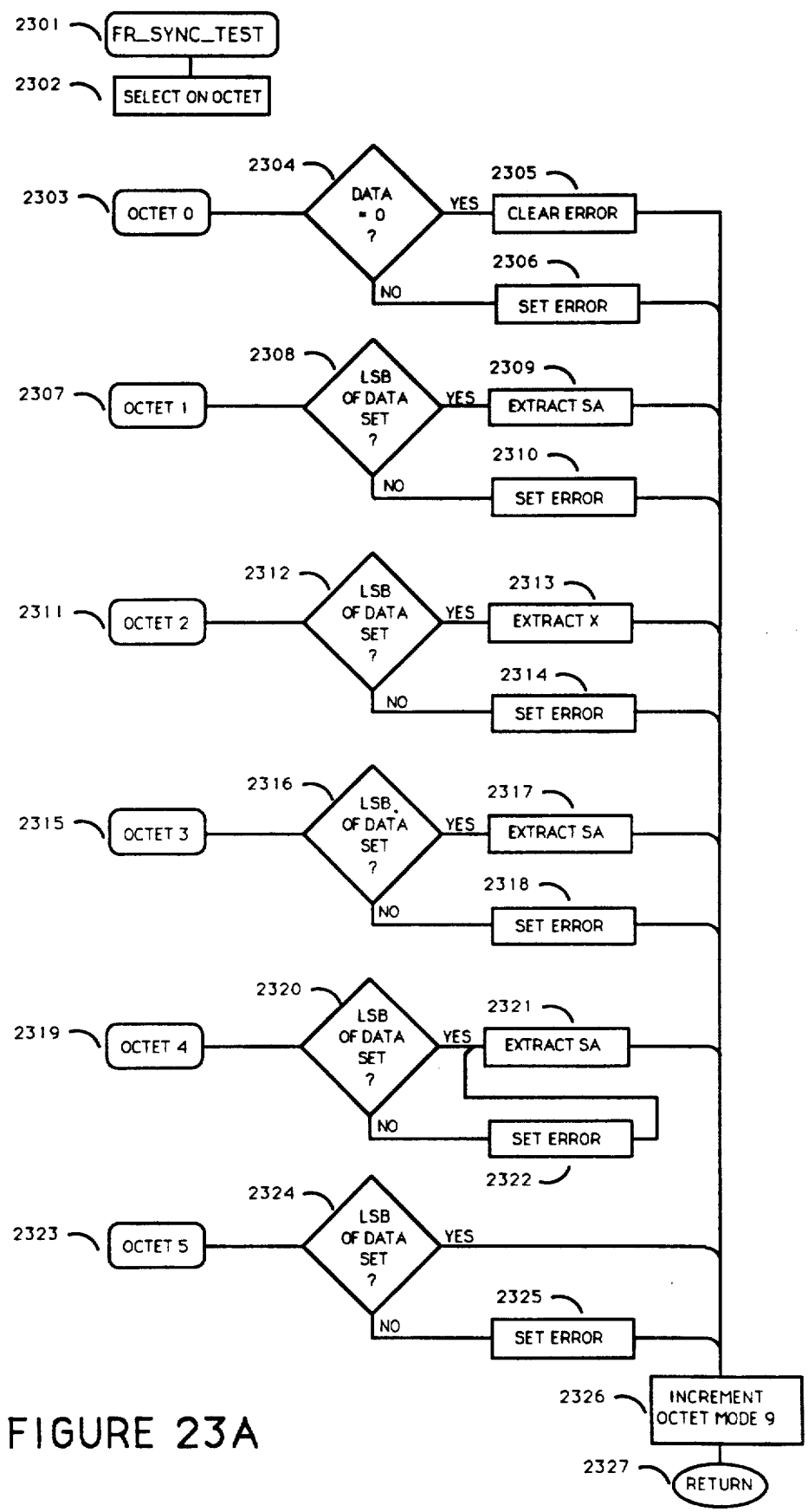
FIG. 23 is a flow diagram for the FRAME SYNC TEST procedure.
Figure 23B:
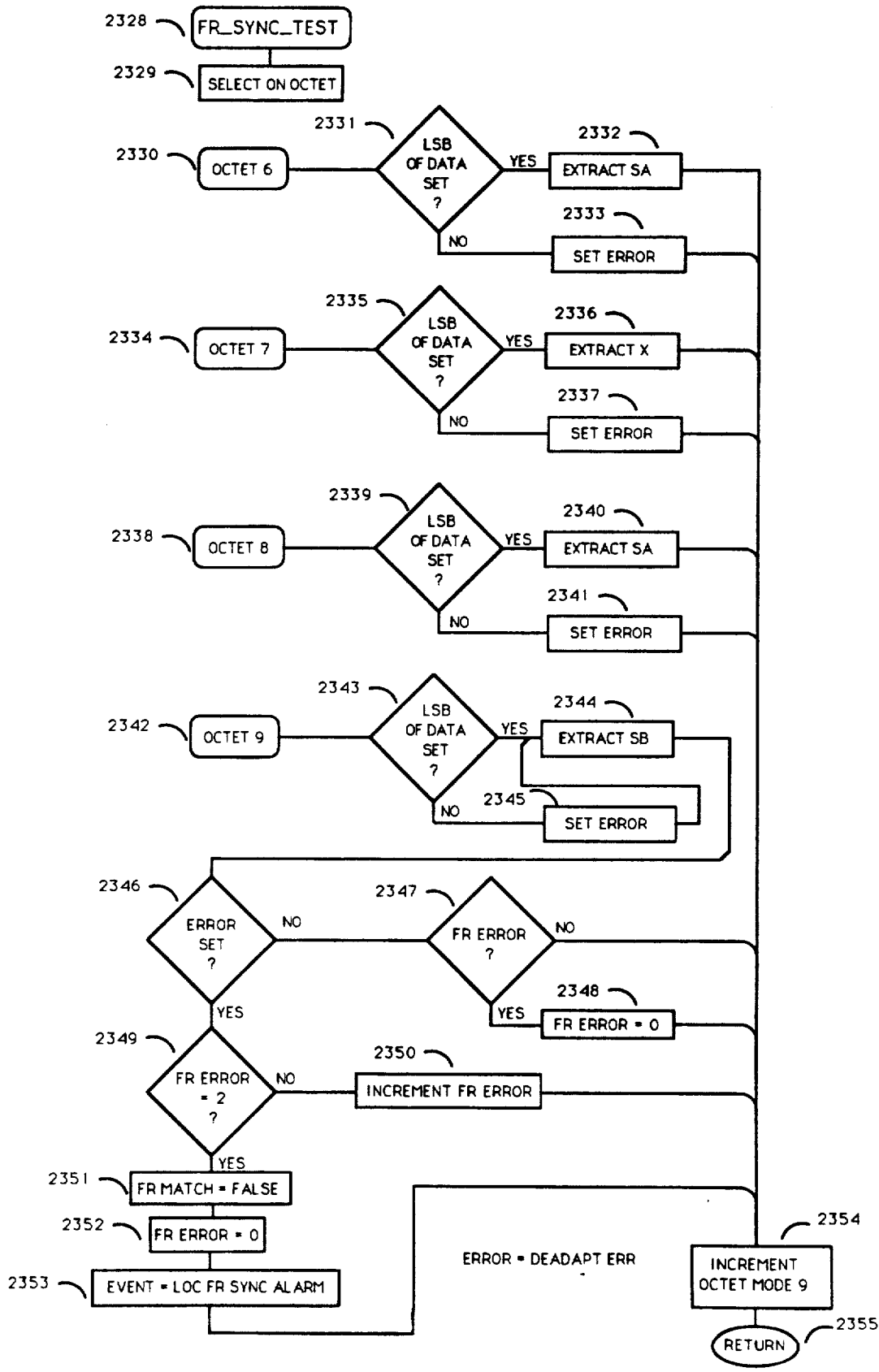

For states three and nine, the FRAME-SYNC-TEST procedure is executed (See FIG. 23). The FRAME-SYNC-TEST procedure is preformed each time a data byte is received from the B-Channel. It verifies that the received data is still in synch and extracts a control bit from the data depending on which octet is being received. The procedure consists of the following four cases:

If the data is for octet zero then it is
  checked to make sure that it is equal to
  zero and then the procedure returns. If
  it is not zero then an error is flagged
  for use by octet nine.
If the data is for octet five it is compared
  with the proper value of the control
  octet for the selected rate and the
  procedure returns. If the test fails
  then an error is flagged for use by
  octet nine.
If the data is a data octet (1, 2, 3, 4, 6,
  7, 8, or 9) then the LSB of the octet is
  tested to make sure that it is one. If
  this test fails then an error is flagged
  for use by octet nine. The appropriate
  control bit is extracted from the octet.
If the current octet is nine then a test is
  made to see if any errors where flagged
  by previous octets. If the error flag
  is set then a frame error counter is
  incremented and tested. If it is equal
  to two then this is the third
  consecutive frame with errors and the
  LOCAL_FRAME_SYNC_ALARM event is set.

Note: this procedure is not called, but is inline due to speed considerations.

Figure 21A:
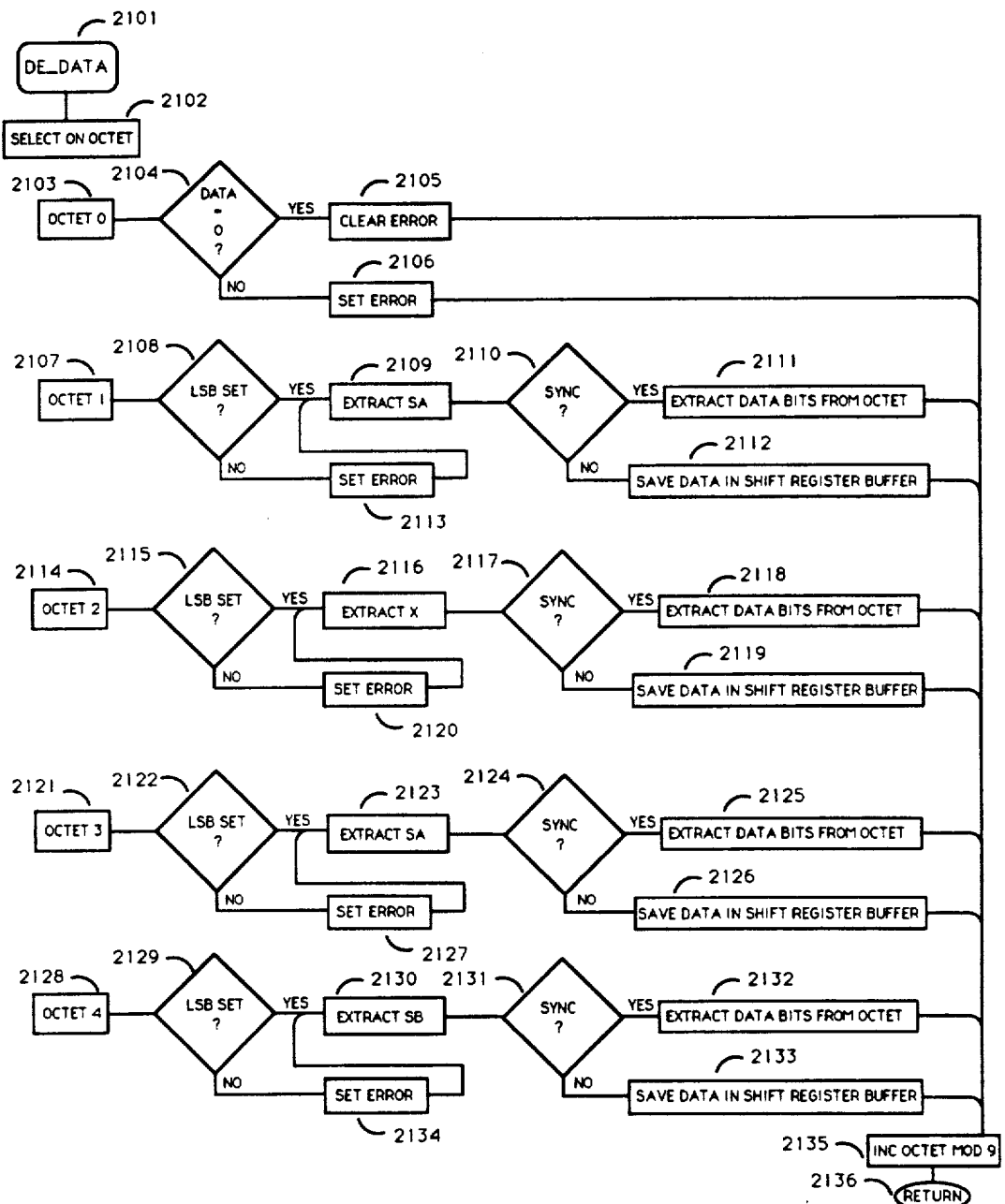
FIG. 21 is a flow diagram for the DEADAPT-DATA procedure.
Figure 21B:
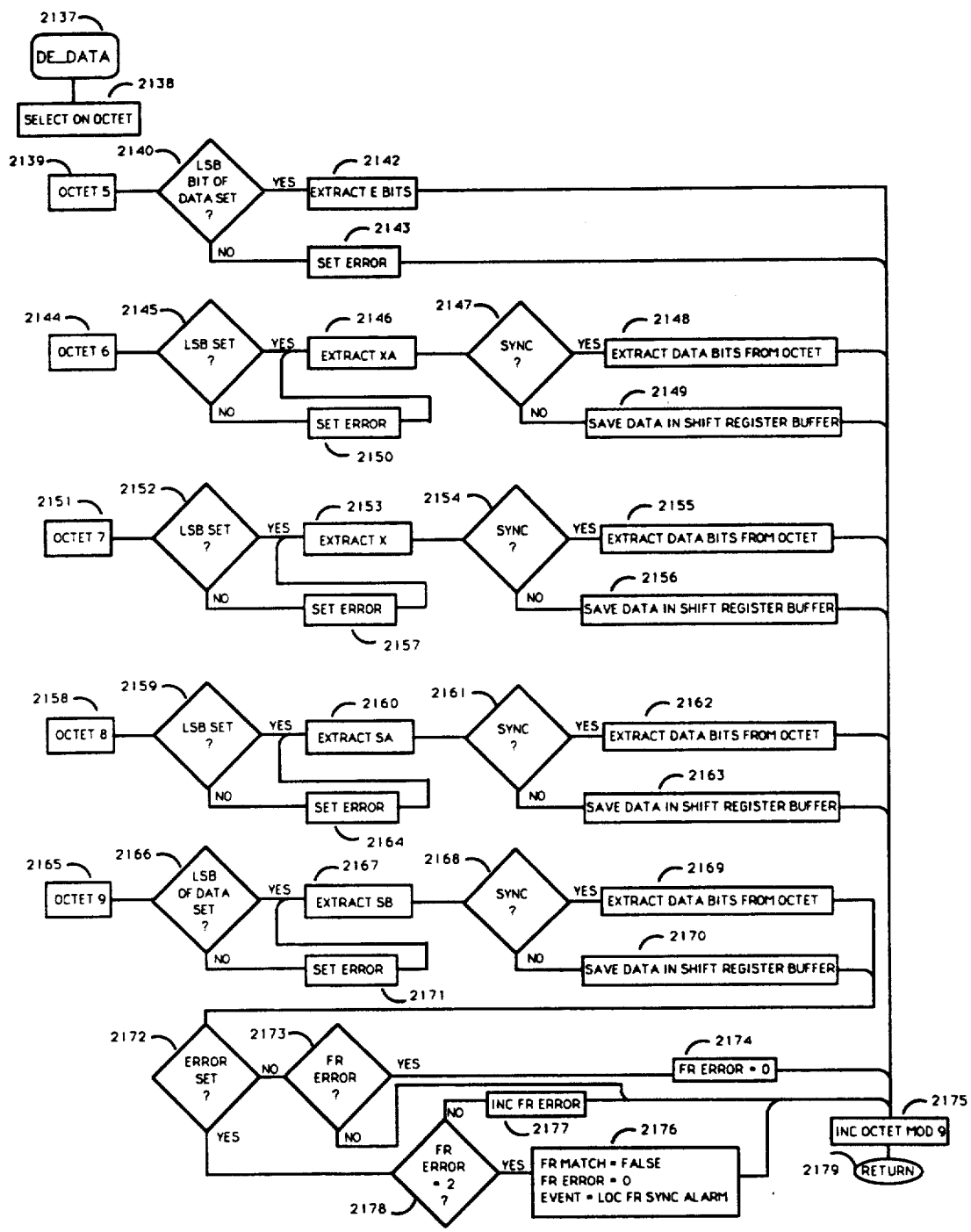

The DE-ADAPT procedure calls DEADAPT-DATA to perform RA1 level de-adaption on the received byte. Referring to FIG. 21, the DEADAPT-DATA procedure is responsible for verifying correct frame sync and extracting data from the octets. For asynchronous baud rates, the data from the octet is placed in the DE-ADAPT BUFFER for the START/-STOP bit detector. If a synchronous mode is selected, the data bits are extracted from the octet and used to build a six bit character. This six bit character is then stored in the USART XMIT BUFFER. Its function breaks down as follows:

If the data is for octet zero then it is
  checked to make sure that it is equal to
  zero and then the procedure returns. If
  it is not zero then an error is flagged
  for use by octet nine.
If the data is for octet five it is compared
  with the proper value of the control
  octet for the selected rate and the
  procedure returns. If the test fails
  then an error is flagged for use by
  octet nine.
If the data is a data octet (1, 2, 3, 4, 6,
  7, 8, or 9) then the LSB of the octet is
  tested to make sure that it is one. If
  this test fails then an error is flagged
  for use by octet nine. The appropriate
  control bit is extracted from the octet.
If async is selected then the six bits of
  data in the octet are stored in the
  DE-ADAPT BUFFER for use by the
  start/stop interrupt handler (INT0 in
  FIG. 14).
If sync is selected then a six bit sync char
  is built from the bits in the octet
  based on the selected frame rate. The
  six bit sync char is then stored in the
  USART XMIT BUFFER.
If the current octet is nine then a test is
  made to see if any errors where flagged
  by previous octets. If the error flag
  is set then a frame error counter is
  incremented and tested. If it is equal
  to two then this is the third
  consecutive frame with errors and the
  LOCAL_FRAME_SYNC_ALARM event is set.

Figure 24:
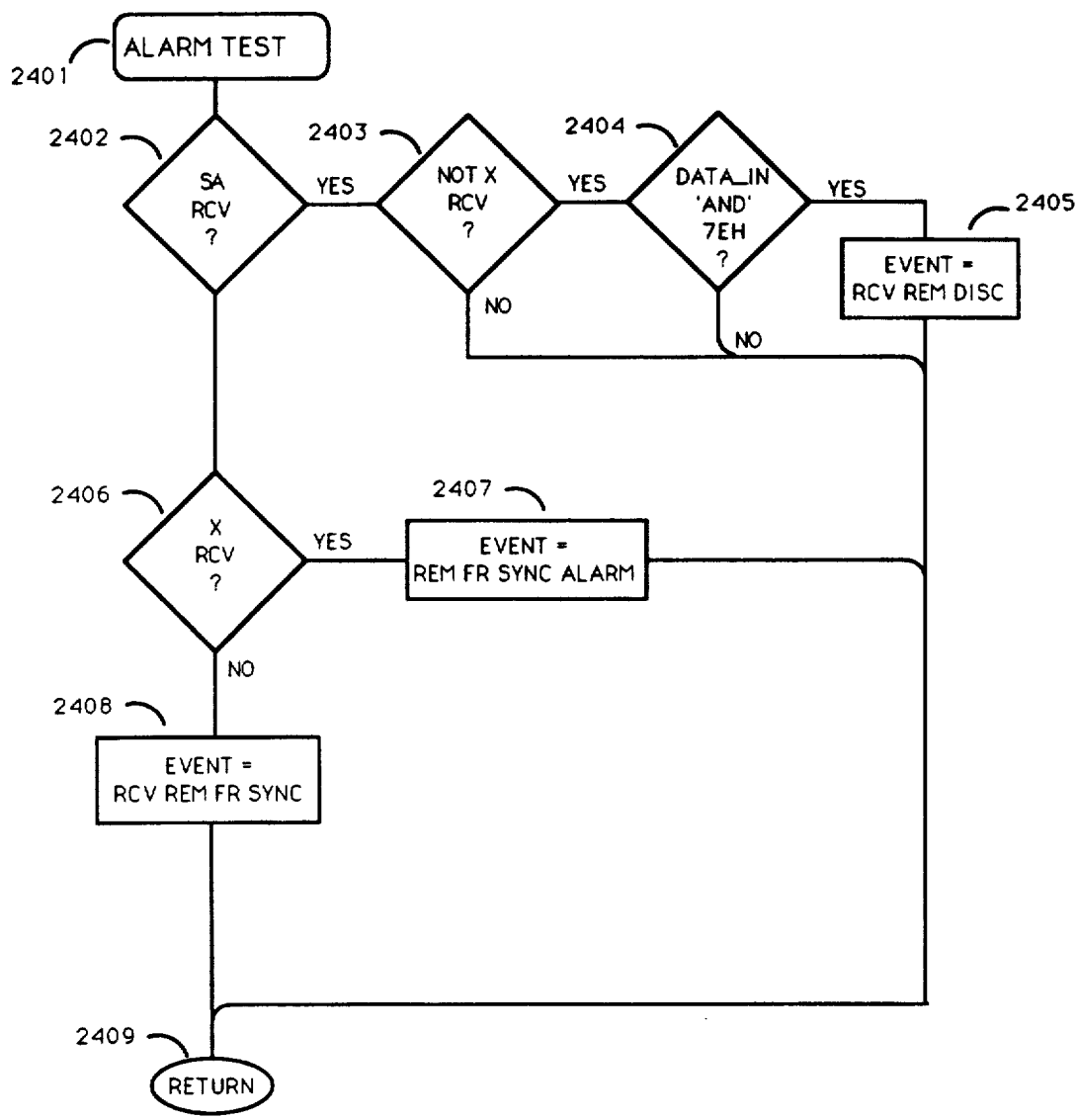
FIG. 24 is a flow diagram for the ALARM procedure.

Finally, the ALARM-TEST procedure is executed, see FIG. 24. This procedure tests the received values of the control bits SA, SB, and X and the received data for remote events. If the remote requests a disconnect or reports loss of sync, then the appropriate events are set for action by the LOW SPEED STATE TRANSITION procedure (FIG. 11). The flow is as follows:

```
If SA is off and X is off then set
    REMOTE_FRAME_SYNC_ALARM_EVENT.
If SA is off and X is on then set
    RECEIVED_REMOTE_FRAME_EVENT.
If SA is on and SB is off and X is on and
    the incoming data is zero, then set the
    RECEIVED_REMOTE_DISCONNECT_EVENT.
```

Note: this procedure is not called, but is inline due to speed considerations.

RA0

This step, which is only necessary for asynchronous modes, requires that the start and stop bits be removed. This is preformed by the START/STOP bit detection hardware and INT0(START/STOP BIT DETECTOR SHIFT REGISTER). When this interrupt occurs a byte is transferred from DE-ADAPT BUFFER into the parallel-to-serial (P/S) converter (24 of FIG. 2). This data is shifted out of the P/S Converter into ASTRO#2. The ASTRO removes the start bit and all stop bits. Also, when an overspeed condition is detected, the data may not have any stop bits, see co-application: "A CIRCUIT AND METHOD OF HANDLING ASYNCHRONOUS OVERSPEED", Ser. No. 07/615,525 filed on Nov. 19, 1990. Once the ASTRO has reconstructed a data byte, INT0(ASTRO#2) is generated. This interrupt transfers the byte from the ASTRO to the USART XMIT BUFFER. When ASTRO#1 is ready for more data, the DSP will receive an INT1(ASTRO#1) interrupt. This causes the DSP to transfer a byte from the USART XMIT BUFFER into the ASTRO's XMIT REGISTER. The ASTRO#1 then transmits the data byte to the user, completing the RA0 function.

Although the preferred embodiment of the invention has been illustrated, and that form described, it is readily apparent to those skilled in the art that various modifications may be made therein without departing from the spirit of the invention or from the scope of the appended claims.

TABLE 5

Ra1 Frame Structure

| Octet Number | Bit Position Number | | | | | | | |
|---|---|---|---|---|---|---|---|---|
| | One | Two | Three | Four | Five | Six | Seven | (MSB) Eight |
| Zero | 0 | 0 | 0 | 0 | 0 | 0 | 0 | 0 |
| One | 1 | D1 | D2 | D3 | D4 | D5 | D6 | S1 |
| Two | 1 | D7 | D8 | D9 | D10 | D11 | D12 | X |
| Three | 1 | D13 | D14 | D15 | D16 | D17 | D18 | S3 |
| Four | 1 | D19 | D20 | D21 | D22 | D23 | D24 | S4 |
| Five | 1 | E1 | E2 | E3 | E4 | E5 | E6 | E7 |
| Six | 1 | D25 | D26 | D27 | D28 | D29 | D30 | S6 |
| Seven | 1 | D31 | D32 | D33 | D34 | D35 | D36 | X |
| Eight | 1 | D37 | D38 | D39 | D40 | D41 | D42 | S8 |
| Nine | 1 | D43 | D44 | D45 | D46 | D47 | D48 | S9 |

TABLE 6

600 bps to 8000 bps

| Octet Number | Bit Position Number | | | | | | | |
|---|---|---|---|---|---|---|---|---|
| | One | Two | Three | Four | Five | Six | Seven | (MSB) Eight |
| Zero | 0 | 0 | 0 | 0 | 0 | 0 | 0 | 0 |
| One | 1 | D1 | D1 | D1 | D1 | D1 | D1 | S1 |
| Two | 1 | D1 | D1 | D2 | D2 | D2 | D2 | X |
| Three | 1 | D2 | D2 | D2 | D2 | D3 | D3 | S3 |
| Four | 1 | D3 | D3 | D3 | D3 | D3 | D3 | S4 |
| Five | 1 | 1 | 0 | 0 | E4 | E5 | E6 | M |
| Six | 1 | D4 | D4 | D4 | D4 | D4 | D4 | S6 |
| Seven | 1 | D4 | D4 | D5 | D5 | D5 | D5 | X |
| Eight | 1 | D5 | D5 | D5 | D5 | D6 | D6 | S8 |
| Nine | 1 | D6 | D6 | D6 | D6 | D6 | D6 | S9 |

TABLE 7

1200 bps to 8000 bps

| Octet Number | Bit Position Number | | | | | | | |
|---|---|---|---|---|---|---|---|---|
| | One | Two | Three | Four | Five | Six | Seven | (MSB) Eight |
| Zero | 0 | 0 | 0 | 0 | 0 | 0 | 0 | 0 |
| One | 1 | D1 | D1 | D1 | D1 | D2 | D2 | S1 |
| Two | 1 | D2 | D2 | D3 | D3 | D3 | D3 | X |
| Three | 1 | D4 | D4 | D4 | D4 | D5 | D5 | S3 |
| Four | 1 | D5 | D5 | D6 | D6 | D6 | D6 | S4 |
| Five | 1 | 0 | 1 | 0 | E4 | E5 | E6 | 1 |
| Six | 1 | D7 | D7 | D7 | D7 | D8 | D8 | S6 |
| Seven | 1 | D8 | D8 | D9 | D9 | D9 | D9 | X |
| Eight | 1 | D10 | D10 | D10 | D10 | D11 | D11 | S8 |
| Nine | 1 | D11 | D11 | D12 | D12 | D12 | D12 | S9 |

TABLE 8

2400 bps to 8000 bps

| Octet Number | Bit Position Number | | | | | | | |
|---|---|---|---|---|---|---|---|---|
| | One | Two | Three | Four | Five | Six | Seven | (MSB) Eight |
| Zero | 0 | 0 | 0 | 0 | 0 | 0 | 0 | 0 |
| One | 1 | D1 | D1 | D2 | D2 | D3 | D3 | S1 |
| Two | 1 | D4 | D4 | D5 | D5 | D6 | D6 | X |
| Three | 1 | D7 | D7 | D8 | D8 | D9 | D9 | S3 |
| Four | 1 | D10 | D10 | D11 | D11 | D12 | D12 | S4 |
| Five | 1 | 1 | 1 | 0 | E4 | E5 | E6 | 1 |
| Six | 1 | D13 | D13 | D14 | D14 | D15 | D15 | S6 |
| Seven | 1 | D16 | D16 | D17 | D17 | D18 | D18 | X |
| Eight | 1 | D19 | D19 | D20 | D20 | D21 | D21 | S8 |
| Nine | 1 | D22 | D22 | D23 | D23 | D24 | D24 | S9 |

TABLE 9

7200 bps to 16000 bps
14400 bps to 32000 bps

| Octet Number | Bit Position Number | | | | | | | |
|---|---|---|---|---|---|---|---|---|
| | One | Two | Three | Four | Five | Six | Seven | (MSB) Eight |
| Zero | 0 | 0 | 0 | 0 | 0 | 0 | 0 | 0 |
| One | 1 | D1 | D2 | D3 | D4 | D5 | D6 | S1 |
| Two | 1 | D7 | D8 | D9 | D10 | F | F | X |
| Three | 1 | D11 | D12 | F | F | D13 | D14 | S3 |
| Four | 1 | F | F | D15 | D16 | D17 | D18 | S4 |
| Five | 1 | 1 | 0 | 1 | E4 | E5 | E6 | 1 |
| Six | 1 | D19 | D20 | D21 | D22 | D23 | D24 | S6 |
| Seven | 1 | D25 | D26 | D27 | D28 | F | F | X |
| Eight | 1 | D29 | D30 | F | F | D31 | D32 | S8 |
| Nine | 1 | F | F | D33 | D34 | D35 | D36 | S9 |

TABLE 10

4800 bps to 8000 bps  
9600 bps to 16000 bps  
19200 bps to 32000 bps

| Octet Number | \ | \ | Bit Position Number | \ | \ | \ | \ | \ |
|---|---|---|---|---|---|---|---|---|
| | One | Two | Three | Four | Five | Six | Seven | (MSB) Eight |
| Zero | 0 | 0 | 0 | 0 | 0 | 0 | 0 | 0 |
| One | 1 | D1 | D2 | D3 | D4 | D5 | D6 | S1 |
| Two | 1 | D7 | D8 | D9 | D10 | D11 | D12 | X |
| Three | 1 | D13 | D14 | D15 | D16 | D17 | D18 | S3 |
| Four | 1 | D19 | D20 | D21 | D22 | D23 | D24 | S4 |
| Five | 1 | 0 | 1 | 1 | E4 | E5 | E6 | 1 |
| Six | 1 | D25 | D26 | D27 | D28 | D29 | D30 | S6 |
| Seven | 1 | D31 | D32 | D33 | D34 | D35 | D36 | X |
| Eight | 1 | D37 | D38 | D39 | D40 | D41 | D42 | S8 |
| Nine | 1 | D43 | D44 | D45 | D46 | D47 | D48 | S9 |

TABLE 11

Frame Structure  
Direct Adaption of 56 kbps to 64 kbps

| Octet Number | Bit Position Number | | | | | | | |
|---|---|---|---|---|---|---|---|---|
| | One | Two | Three | Four | Five | Six | Seven | (MSB) Eight |
| One | D1 | D2 | D3 | D4 | D5 | D6 | D7 | 1 |
| Two | D8 | D9 | D10 | D11 | D12 | D13 | D14 | 1 |
| Three | D15 | F16 | F17 | D18 | D19 | D20 | D21 | 1 |
| Four | D22 | D23 | D24 | D25 | D26 | D27 | D28 | 1 |
| Five | D29 | D30 | D31 | D32 | D33 | D34 | D35 | 1 |
| Six | D36 | D37 | D38 | D39 | D40 | D41 | D42 | 1 |
| Seven | D43 | D44 | D45 | D46 | D47 | D48 | D49 | 1 |
| Eight | D50 | D51 | D52 | D53 | D54 | D55 | D56 | 1 |

TABLE 12

Frame Structure  
Direct Adaption of 48 kbps to 64 kbps

| Octet Number | Bit Position Number | | | | | | | |
|---|---|---|---|---|---|---|---|---|
| | One | Two | Three | Four | Five | Six | Seven | (MSB) Eight |
| One | 1 | D1 | D2 | D3 | D4 | D5 | D6 | S1 |
| Two | 0 | D7 | D8 | D9 | D10 | D11 | D12 | X |
| Three | 1 | D13 | D14 | D15 | D16 | D17 | D18 | S3 |
| Four | 1 | D19 | D20 | D21 | D22 | D23 | D24 | S4 |

1) Because there is no guarantee of having a 64 kbps clear Channel, the S and X bits above will always be set to a 1.

TABLE 13

Frame Structure  
Direct Adaption of 64 kbps to 64 kbps

| Octet Number | Bit Position Number | | | | | | | |
|---|---|---|---|---|---|---|---|---|
| | One | Two | Three | Four | Five | Six | Seven | (MSB) Eight |
| One | D1 | D2 | D3 | D4 | D5 | D6 | D7 | D8 |

TABLE 14

E-Bit Usage vs. User Data Rate

| Intermediate Rates kbps | | | E-Bits | | | | | | |
|---|---|---|---|---|---|---|---|---|---|
| 8 bps | 16 bps | 32 bps | E1 | E2 | E3 | E4 | E5 | E6 | E7 |
| 600 | | | 1 | 0 | 0 | C | C | C | M |
| 1200 | | | 0 | 1 | 0 | C | C | C | 1 |
| 2400 | | | 1 | 1 | 0 | C | C | C | 1 |
| | 7200 | 14400 | 1 | 0 | 1 | C | C | C | 1 |
| 4800 | 9600 | 19200 | 0 | 1 | 1 | C | C | C | 1 |

1) The M bit is used for multiframe synchronization as recommended by CCITT I.460.  
2) The C bits transport the Network Independent Clocking information.

TABLE 15

| Interchange Circuit Mapping Scheme | | |
|---|---|---|
| Interchange Circuit at Transmitter | Control Bits | Interchange Circuit at Receiver |
| 108 | S1, S3, S6, S8 (= SA) | 107 |
| 105 | S4, S9 (= SB) | 109 |
| Frame Sync | X | 106 |

What is claimed is:

1. A method of converting user data to rate adapted data where said user data being received by a data adapter means from a user terminal at a first data rate, said rate adapted data being transmitted by said data adapter means at a second data rate, and said second data rate being greater than said first data rate, said user data being either in a first or a second format, said user data containing a start element and at least one stop element, said method being performed by said data adapter means, said method comprising the steps of:

(1) receiving said user data at said first data rate;

(2) converting said user data into an intermediate data;

(3) storing said intermediate data in a receive buffer means;

(4) only if said user data is in said first data format, adding new stop elements to said intermediate data;

(5) transferring said intermediate data in said receive buffer means to an intermediate buffer means;

(6) constructing a frame means using data from said intermediate buffer means;

(7) transmitting said frame means where said step of transmitting changes said frame means into said rate adapted data.

2. The method of claim 1 where said step of converting said user data into an intermediate data further includes:

(1) changing said user data from a serial format to a parallel format; and (2) removing said at least one stop element from said user data.

3. The method of claim 1 where said step of adding new stop elements further includes:

(1) calculating a number of said new stop elements that must be added to said intermediate data; and (2) adding said calculated number of new stop elements to said intermediate data.

4. The method of claim 1 where said step of transferring said intermediate data further includes:

(1) dividing said intermediate data into six bit pieces; and (2) storing said six bit pieces in said intermediate buffer means.

5. The method of claim 1 where said step of constructing a frame means further includes:

(1) reading said intermediate data from said intermediate buffer means;

(2) if said first data rate is less than or equal to a third data rate, said third data rate being less than said second data rate, then:

(i) first using said intermediate data to retrieve said frame means from a first table means;

(3) if said first data rate is equal to a fourth data rate, said fourth data rate being less than said second data rate, then:

(i) second using said intermediate data to retrieve a half frame means from a second table means; and (ii) repeating previous steps of reading and second using, thereby generating said frame means;

(4) if said first data rate is equal to a fifth data rate, said fifth data rate being less than said second data rate, then:
 (i) third using said intermediate data to retrieve a one-fourth frame means from a third table means; and
 (ii) repeating previous steps of reading and third using, three times, thereby generating said frame means;

(5) if said first data rate is greater than or equal to a sixth data rate, said sixth data rate being less than said second data rate, then:
 (i) fourth using said intermediate data to retrieve a one-eighth frame means; and
 (ii) repeating previous steps of reading and fourth using, seven times, thereby generating said frame means.

6. The method of claim 1 where said step of transmitting said frame means is performed by allowing only a subset of said second data rate to be occupied by said frame means.

7. The method of claim 2 where said steps of changing said user data and removing said at least one stop element are both performed by an serial receiver means.

8. A method of converting user data to rate adapted data where said user data being received by a data adapter means from a user terminal at a first data rate, said rate adapted data being transmitted by said data adapter means at a second data rate, and said second data rate being greater than said first data rate, said user data being either in a first or a second format, said user data containing a start element and at least one stop element, said method being performed by said data adapter means, said method comprising the steps of:
 (1) receiving said user data at said first data rate;
 (2) changing said user data from a serial format to a parallel format;
 (3) removing said at least one stop element from said user data thereby changing said user data into an intermediate data;
 (4) only if said user data is in said first format then:
  (i) calculating a number of new stop elements that must be added to said intermediate data; and
  (ii) adding said calculated number of new stop elements to said intermediate data;
 (5) transferring said intermediate data in said receive buffer means to an intermediate buffer means;
 (6) reading said intermediate data from said intermediate buffer means;
 (7) if said first data rate is less than or equal to a third data rate, said third data rate being less than said second data rate, then:
  (i) first using said intermediate data to retrieve a frame means from a first table means;
 (8) if said first data rate is equal to a fourth data rate, said fourth data rate being less than said second data rate, then:
  (i) second using said intermediate data to retrieve a one half-frame from a second table means; and
  (ii) repeating previous steps of reading and second using, thereby generating said frame means;
 (9) if said first data rate is equal to a fifth data rate, said fifth data rate being less than said second data rate, then:
  (i) third using said intermediate data to retrieve a one-fourth frame means from a third table means; and
  (ii) repeating previous steps of reading and third using, three times, thereby generating said frame means;
 (10) if said first data rate is greater than or equal to a sixth data rate, said sixth data rate being less than said second data rate, then:
  (i) fourth using said intermediate data to retrieve a one-eighth frame means; and
  (ii) repeating previous steps of reading and fourth using, seven times, thereby generating said frame means;
 (11) transmitting said frame means where said step of transmitting changes said frame means into said rate adapted data.

9. The method of claim 8 where said step of transmitting said frame means is performed by allowing only a subset of said second data rate to be occupied by said frame means.

10. A method of adapting user data to rate adapted data where said user data is received from a user terminal at a first data rate, said rate adapted data is transmitted at a second data rate, and said second data rate is greater than or equal to said first data rate, said user data is either in a first or a second format, said user data contains a start element, and at least one stop element, said method is performed by a data adapter means, said data adapter means is in a present state out of a plurality of states, said method comprising the steps of:
 (1) executing an initialization means which tests and places said present state of said data adapter means in a predefine state of said plurality of states;
 (2) executing a background task means which checks for an event that would cause said data adapter means to change to a new state of said plurality of states, and if said event has occurred changing said present state of said data adapter means to said new state;
 (3) receiving a first interrupt when a rate adapted data byte is ready to be transmitted;
 (4) receiving a second interrupt when a user data byte has been received.

11. The method of claim 10 where said step of receiving a second interrupt further includes:
 (1) converting said user data into an intermediate data; and
 (2) storing said intermediate data in a receive buffer means.

12. The method of claim 10 where said step of receiving a second interrupt further includes:
 (1) if said present state allows said rate adapted data to be transmitted then:
  (i) converting said user data into an intermediate data; and
  (ii) storing said intermediate data in a receive buffer means;
  (iii) if said receive buffer means has more data than a predefined number, signaling said user terminal to stop transmitting said user data until said receive buffer means has less data than a predefined number;
 (2) if said present state allows said user terminal to control said data adapter means then, passing said user data to said data adapter means.

13. The method of claim 11 where said step of receiving a first interrupt further includes:

(1) if said present state allows said rate adapted data to be transmitted then:
  (a) transferring said intermediate data in said receive buffer means to an intermediate buffer means;
  (b) if said user data is in said first data format, adding new stop elements to said intermediate data during said transferring;
  (c) constructing a frame means using data from said intermediate buffer means;
  (d) storing said frame means in a transmit buffer means;
  (e) transmitting said frame means where said step of transmitting changes said frame means into said rate adapted data; and
(2) alternatively, transmitting a fill byte.

14. The method of claim 13 where said step of constructing a frame means further includes:
  (1) reading said intermediate data from said intermediate buffer means;
  (2) if said first data rate is less than or equal to a third data rate, said third data rate being less than said second data rate, then:
    (i) first using said intermediate data to retrieve said frame means from a first table means;
  (3) if said first data rate is equal to a fourth data rate, said fourth data rate being less than said second data rate, then:
    (i) second using said intermediate data to retrieve a half frame means from a second table means; and
    (ii) repeating previous steps of reading and second using, thereby generating said frame means;
  (4) if said first data rate is equal to a fifth data rate, said fifth data rate being less than said second data rate, then:
    (i) third using said intermediate data to retrieve a one-fourth frame means from a third table means; and
    (ii) repeating previous steps of reading and third using, three times, thereby generating said frame means;
  (5) if said first data rate is greater than or equal to a sixth data rate, said sixth data rate being less than said second data rate, then:
    (i) fourth using said intermediate data to retrieve a one-eighth frame means; and
    (ii) repeating previous steps of reading and fourth using, seven times, thereby generating said frame means.

* * * * *